United States Patent
Watanabe

(10) Patent No.: US 12,471,399 B2
(45) Date of Patent: Nov. 11, 2025

(54) LIGHT RECEIVING DEVICE, METHOD FOR MANUFACTURING LIGHT RECEIVING DEVICE, AND DISTANCE MEASURING MODULE

(71) Applicant: SONY SEMICONDUCTOR SOLUTIONS CORPORATION, Kanagawa (JP)

(72) Inventor: Ryota Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 505 days.

(21) Appl. No.: 17/760,425

(22) PCT Filed: Feb. 5, 2021

(86) PCT No.: PCT/JP2021/004354
§ 371 (c)(1),
(2) Date: Aug. 9, 2022

(87) PCT Pub. No.: WO2021/166689
PCT Pub. Date: Aug. 26, 2021

(65) Prior Publication Data
US 2023/0071795 A1   Mar. 9, 2023

(30) Foreign Application Priority Data
Feb. 18, 2020   (JP) ................. 2020-025411

(51) Int. Cl.
*H10F 39/00* (2025.01)
(52) U.S. Cl.
CPC ....... *H10F 39/8063* (2025.01); *H10F 39/011* (2025.01); *H10F 39/80373* (2025.01); *H10F 39/8067* (2025.01); *H10F 39/807* (2025.01)

(58) Field of Classification Search
CPC ............... H10F 39/807; H10F 39/8063; H10F 39/8067; H10F 39/011; H10F 39/80373; H10F 39/12
See application file for complete search history.

(56) References Cited

U.S. PATENT DOCUMENTS

2012/0147208 A1*   6/2012   Otsuka ............... H10F 39/8053
                                                    257/E31.127
2012/0300102 A1    11/2012  Tamura
                                (Continued)

FOREIGN PATENT DOCUMENTS

| CN | 104347660 A | 2/2015 |
| CN | 106952932 A | 7/2017 |

(Continued)

OTHER PUBLICATIONS

International Search Report and Written Opinion of PCT Application No. PCT/JP2021/004354, issued on Apr. 27, 2021, 09 pages of ISRWO.

*Primary Examiner* — Changhyun Yi
(74) *Attorney, Agent, or Firm* — CHIP LAW GROUP

(57) ABSTRACT

Provided is a light receiving device that includes a pixel array unit in which pixels each including a first tap that detects charges photoelectrically converted by a photoelectric conversion unit and a second tap that detects charges photoelectrically converted by the photoelectric conversion unit are two-dimensionally arranged in a matrix. The light receiving device further includes an on-chip lens disposed for each pixel on a light incident surface side of a substrate, and a lens isolation portion that is formed in the same layer as the on-chip lens and isolates the on-chip lenses from each other.

13 Claims, 53 Drawing Sheets

(56) References Cited

U.S. PATENT DOCUMENTS

2018/0182806 A1* 6/2018 Jin ..................... H10F 39/805
2021/0193720 A1* 6/2021 Seo ..................... H10F 39/805

FOREIGN PATENT DOCUMENTS

| CN | 110383479 | A | 10/2019 |
| CN | 110739321 | A | 1/2020 |
| EP | 3573104 | A1 | 11/2019 |
| JP | 2015-035555 | A | 2/2015 |
| JP | 2018-201015 | A | 12/2018 |
| WO | 2013/057905 | A1 | 4/2013 |
| WO | 2017/073321 | A1 | 5/2017 |
| WO | 2018/135320 | A1 | 7/2018 |

* cited by examiner

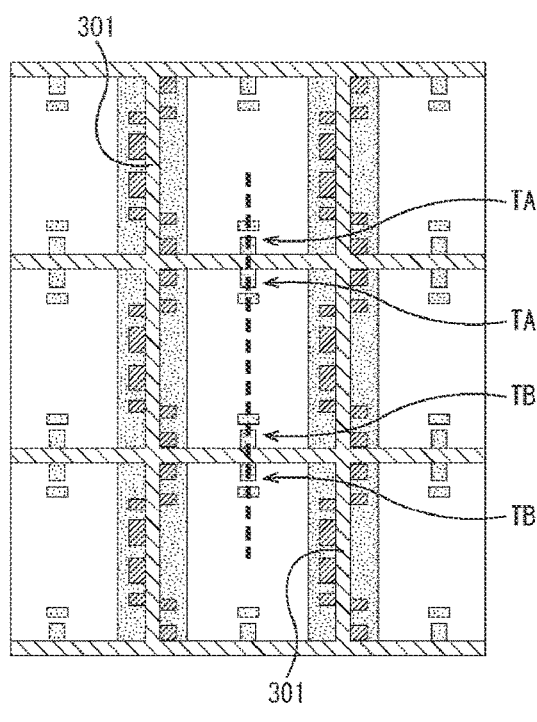
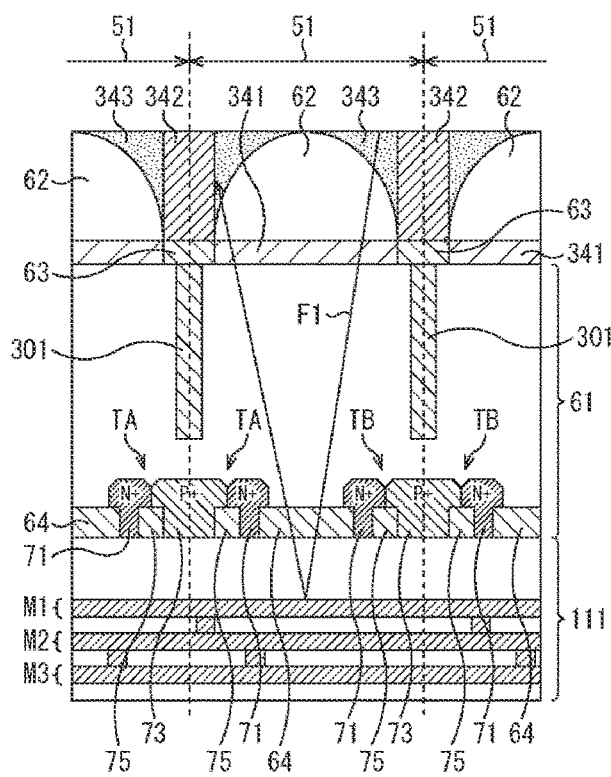
FIG. 33A
FIG. 33B

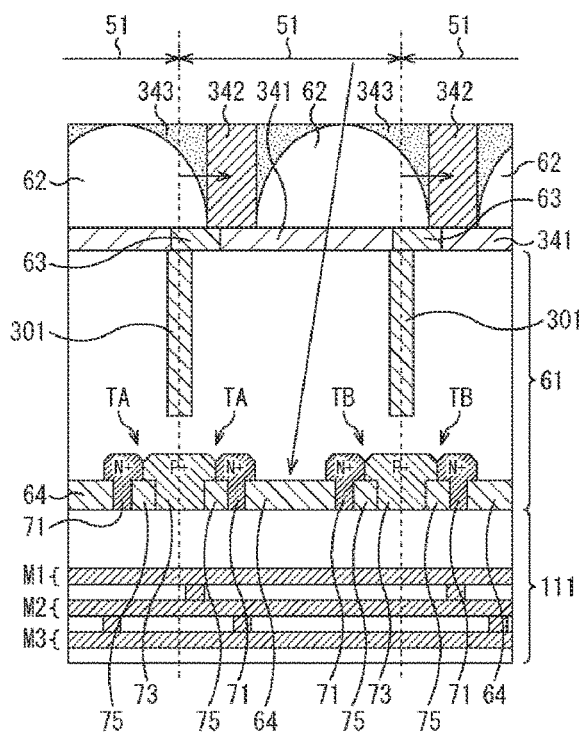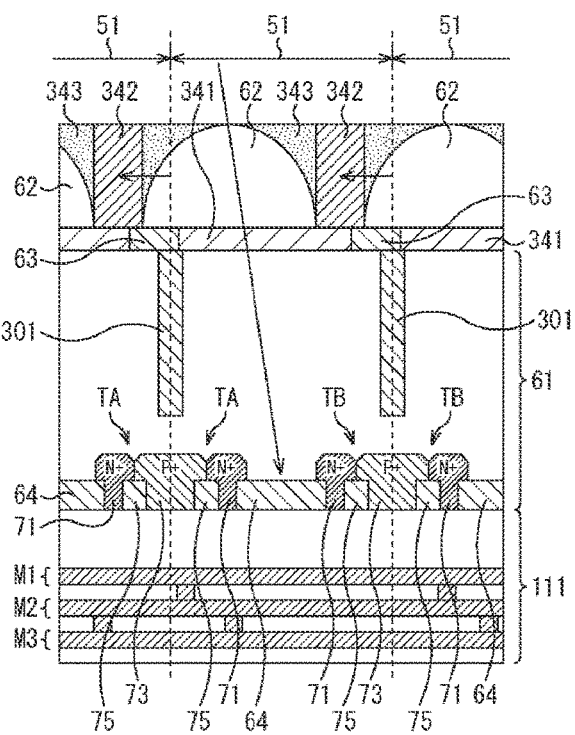

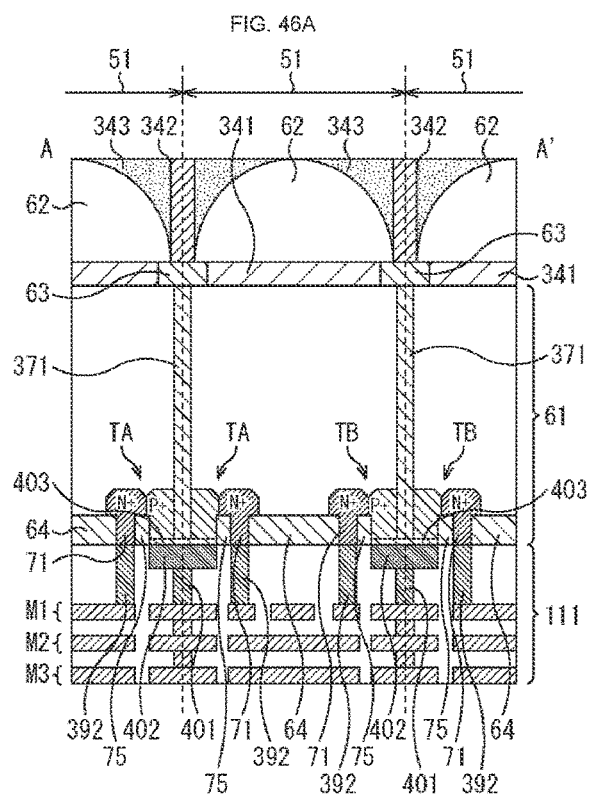
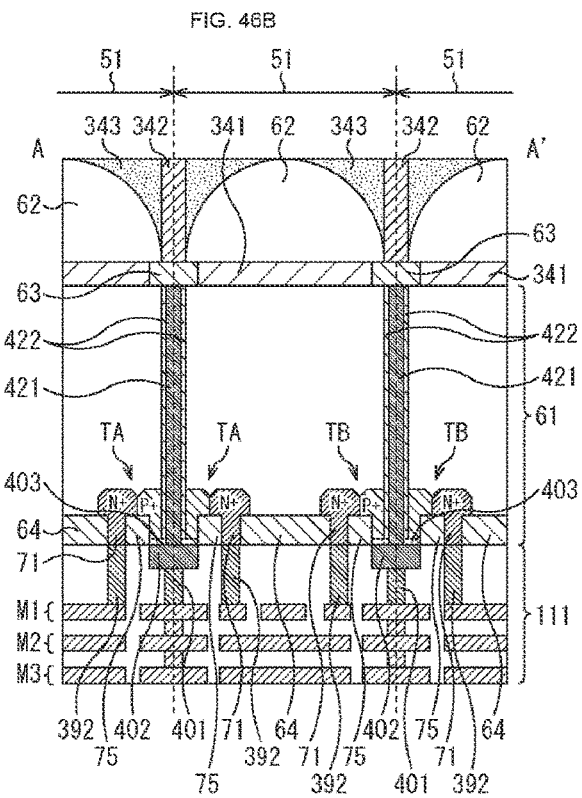

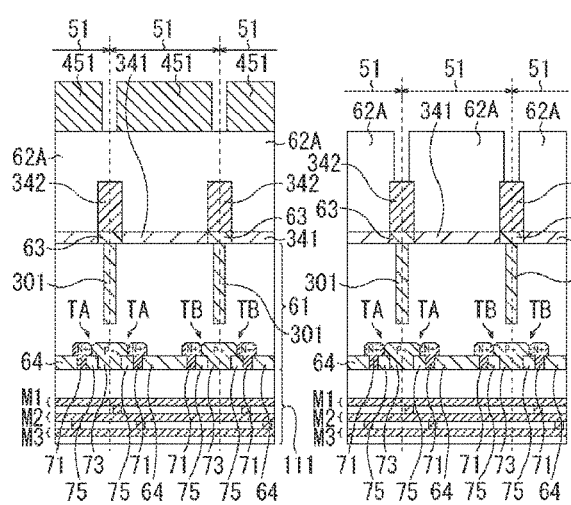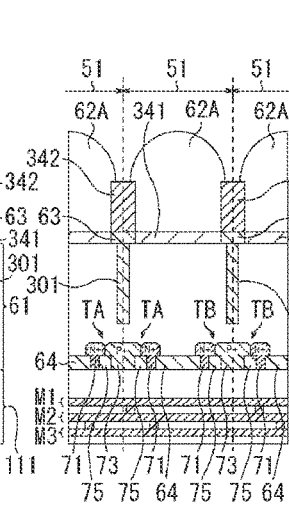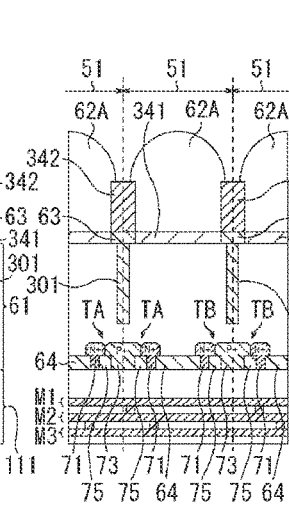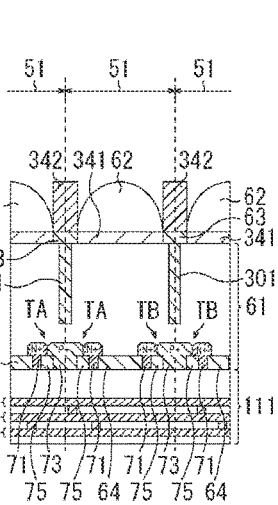

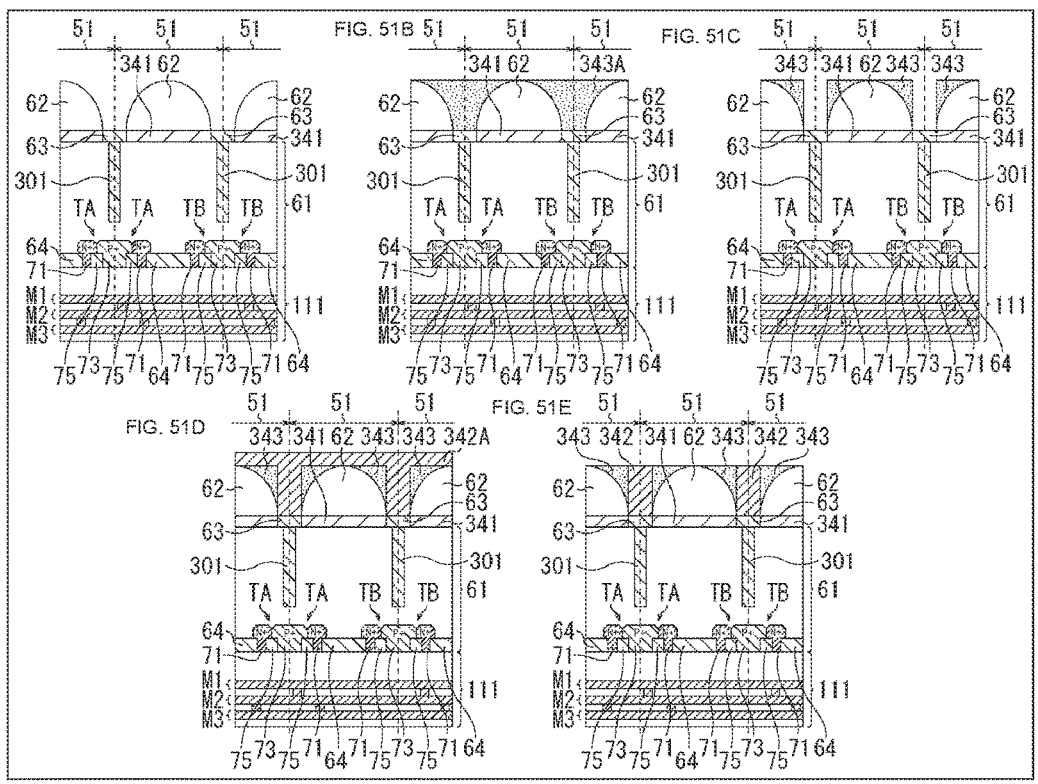

LIGHT RECEIVING DEVICE, METHOD FOR MANUFACTURING LIGHT RECEIVING DEVICE, AND DISTANCE MEASURING MODULE

CROSS REFERENCE TO RELATED APPLICATIONS

This application is a U.S. National Phase of International Patent Application No. PCT/JP2021/004354 filed on Feb. 5, 2021, which claims priority benefit of Japanese Patent Application No. JP 2020-025411 filed in the Japan Patent Office on Feb. 18, 2020. Each of the above-referenced applications is hereby incorporated herein by reference in its entirety.

TECHNICAL FIELD

The present technology relates to a light receiving device, a method for manufacturing a light receiving device, and a distance measuring module, and particularly to a light receiving device, a method for manufacturing a light receiving device, and a distance measuring module, capable of improving sensitivity.

BACKGROUND ART

A distance measuring sensor using an indirect time of flight (ToF) method is known. In the distance measuring sensor of the indirect ToF method, signal charges obtained by receiving reflected light reflected by a measurement object are distributed to two charge accumulation regions, and a distance is calculated from a distribution ratio between the signal charges. In such a distance measuring sensor, there has been proposed a distance measuring sensor that has improved light receiving characteristics by being formed into a back-illuminated type sensor (see, for example, Patent Document 1).

CITATION LIST

Patent Document

Patent Document 1: PCT International Application Laid-Open No.

SUMMARY OF THE INVENTION

Problems to be Solved by the Invention

In such a distance measuring sensor of the indirect ToF method, further improvement in sensitivity is desired.

The present technology has been achieved in view of such a situation, and makes it possible to improve sensitivity.

Solutions to Problems

A light receiving device according to a first aspect of the present technology includes: a pixel array unit in which pixels each including a first tap that detects charges photoelectrically converted by a photoelectric conversion unit and a second tap that detects charges photoelectrically converted by the photoelectric conversion unit are two-dimensionally arranged in a matrix; an on-chip lens disposed for each pixel on a light incident surface side of a substrate; and a lens isolation portion that is formed in the same layer as the on-chip lens and isolates the on-chip lenses from each other.

A method for manufacturing a light receiving device according to a second aspect of the present technology includes: forming, for each pixel of a pixel array unit, a first tap that detects charges photoelectrically converted by a photoelectric conversion unit and a second tap that detects charges photoelectrically converted by the photoelectric conversion unit; forming an on-chip lens for each pixel on a light incident surface side of a substrate; and forming, in the same layer as the on-chip lens, a lens isolation portion that isolates the on-chip lenses from each other.

A distance measuring module according to a third aspect of the present technology includes a light receiving device including: a pixel array unit in which pixels each including a first tap that detects charges photoelectrically converted by a photoelectric conversion unit and a second tap that detects charges photoelectrically converted by the photoelectric conversion unit are two-dimensionally arranged in a matrix; an on-chip lens disposed for each pixel on a light incident surface side of a substrate; and a lens isolation portion that is formed in the same layer as the on-chip lens and isolates the on-chip lenses from each other.

According to the first and third aspects of the present technology, the light receiving device includes: a pixel array unit in which pixels each including a first tap that detects charges photoelectrically converted by a photoelectric conversion unit and a second tap that detects charges photoelectrically converted by the photoelectric conversion unit are two-dimensionally arranged in a matrix; an on-chip lens disposed for each pixel on a light incident surface side of a substrate; and a lens isolation portion that is formed in the same layer as the on-chip lens and isolates the on-chip lenses from each other.

According to the second aspect of the present technology, a first tap that detects charges photoelectrically converted by a photoelectric conversion unit and a second tap that detects charges photoelectrically converted by the photoelectric conversion are formed for each pixel of a pixel array unit; an on-chip lens is formed for each pixel on a light incident surface side of a substrate; and in the same layer as the on-chip lens, a lens isolation portion that isolates the on-chip lenses from each other is formed.

The light receiving device and the distance measuring module may be each an independent device, or may be a module incorporated in another device.

BRIEF DESCRIPTION OF DRAWINGS

FIGS. 33A and 33B are diagrams illustrating an eighth pixel isolation structure of the pixel.

FIGS. 35A and 35B are diagrams for describing pupil correction in the eighth pixel isolation structure.

FIGS. 46A and 46B are diagrams illustrating a fourteenth pixel isolation structure of the pixel.

FIGS. 50A, 50B, 50C, and 50D are diagrams for describing a modification of the first manufacturing method.

FIGS. 51A, 51B, 51C, 51D, and 51E are diagrams for describing a second method for manufacturing an on-chip lens and a lens isolation portion.

MODE FOR CARRYING OUT THE INVENTION

Figure 1:
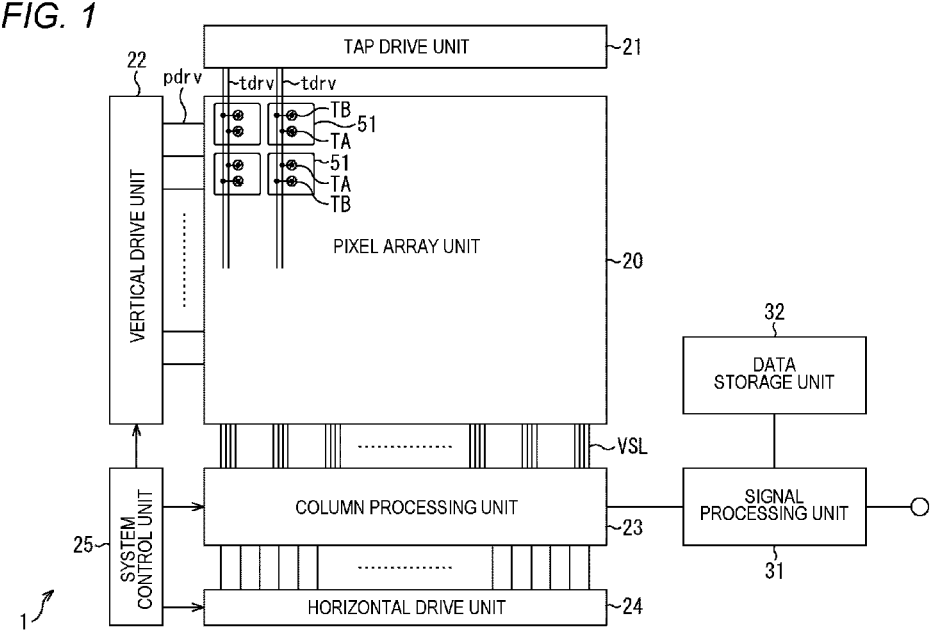
FIG. 1 is a block diagram illustrating a configuration example of a light receiving device.

Hereinafter, a mode for carrying out the present technology (hereinafter, referred to as an embodiment) will be described. Note that the description will be made in the following order.

1. Block diagram of light receiving device
2. Structure example of pixel
3. Cross-sectional configuration example of plurality of pixels
4. Example of other planar shape of tap T
5. Equivalent circuit of pixel
6. Wiring example of vertical signal line VSL
7. Example of planar arrangement of five layers of metal films M1 to M5
8. Configuration example of pixel isolation portion
9. Method for manufacturing on-chip lens and lens isolation portion
10. Substrate configuration example of light receiving device
11. Configuration example of distance measuring module
12. Application example to mobile body <1. Block Diagram of Light Receiving Device>

FIG. 1 is a block diagram illustrating a configuration example of a light receiving device to which the present technology is applied.

A light receiving device 1 in FIG. 1 is a back-illuminated type current assisted photonic demodulator (CAPD) sensor, and is used, for example, as a part of a distance measuring system that performs distance measurement by an indirect ToF method. The distance measuring system can be applied to, for example, an in-vehicle system that is mounted on a vehicle and measures a distance to an object outside the vehicle, a gesture recognition system that measures a distance to an object such as a hand of a user and recognizes a gesture of the user on the basis of the measurement result, and the like.

The light receiving device 1 includes a pixel array unit 20 formed on a semiconductor substrate (not illustrated) and a peripheral circuit unit disposed, for example, around the pixel array unit 20. The peripheral circuit unit includes, for example, a tap drive unit 21, a vertical drive unit 22, a column processing unit 23, a horizontal drive unit 24, and a system control unit 25.

The light receiving device 1 further includes a signal processing unit 31 and a data storage unit 32. Note that the signal processing unit 31 and the data storage unit 32 may be mounted on the same substrate as a substrate on which the light receiving device 1 is mounted, or may be disposed on a substrate different from the substrate on which the light receiving device 1 is mounted in an imaging device.

The pixel array unit 20 has a configuration in which pixels 51 that generate charges according to the amount of received light and output signals according to the charges are two-dimensionally arranged in a matrix in a row direction and a column direction. That is, the pixel array unit 20 includes the plurality of pixels 51 that photoelectrically converts incident light and outputs detection signals according to charges obtained as a result. Here, the row direction refers to an arrangement direction of the pixels 51 in the horizontal direction, and the column direction refers to an arrangement direction of the pixels 51 in the vertical direction. The row direction is a lateral direction in the drawing, and the column direction is a longitudinal direction in the drawing.

The pixel 51 receives and photoelectrically converts light incident from the outside, particularly infrared light, and outputs a signal corresponding to charges obtained as a result. The pixel 51 includes a first tap TA that applies a predetermined voltage MIX_A (first voltage) and detects photoelectrically converted charges, and a second tap TB that applies a predetermined voltage MIX_B (second voltage) and detects photoelectrically converted charges.

The tap drive unit 21 supplies the predetermined voltage MIX_A to the first tap TA of each pixel 51 of the pixel array unit 20 via a predetermined voltage supply line tdrv, and supplies the predetermined voltage MIX_B to the second tap TB via a predetermined voltage supply line tdrv. Therefore, two voltage supply lines tdry of the voltage supply line tdry that transmits the voltage MIX_A and the voltage supply line tdry that transmits the voltage MIX_B are wired in one pixel column of the pixel array unit 20.

In the pixel array unit 20, a pixel drive line pdrv is wired in the row direction for each pixel row with respect to the matrix-like pixel array. The pixel drive line pdrv transmits a drive signal for performing driving when a detection signal is read from a pixel. Note that, in FIG. 1, the pixel drive line pdrv is illustrated as one wire, but is not limited to one wire, and is actually constituted by a plurality of wires. One end of the pixel drive line pdrv is connected to an output terminal corresponding to each row of the vertical drive unit 22.

Furthermore, four vertical signal lines VSL are wired in the column direction for each pixel column of the plurality of pixels arranged in a matrix in the pixel array unit 20. Although details of the four vertical signal lines VSL will be described later with reference to FIGS. 14 to 17, by wiring the four vertical signal lines VSL for each pixel column, a plurality of rows can be read simultaneously, an S/N ratio is improved, and a reading time is shortened.

The vertical drive unit 22 includes a shift register, an address decoder, and the like, and drives all the pixels of the pixel array unit 20 simultaneously, in units of rows, or the like. That is, the vertical drive unit 22 constitutes a drive unit that controls an operation of each pixel of the pixel array unit 20 together with the system control unit 25 that controls the vertical drive unit 22.

A detection signal output from each pixel 51 in a pixel row according to the drive control by the vertical drive unit 22 is input to the column processing unit 23 through the vertical signal line VSL. The column processing unit 23 performs predetermined signal processing on the detection signal output from each pixel 51 through the vertical signal line VSL, and temporarily holds the detection signal after the signal processing.

Specifically, the column processing unit 23 performs noise removal processing, analog to digital (AD) conversion processing, and the like as the signal processing.

The horizontal drive unit 24 includes a shift register, an address decoder, and the like, and sequentially selects a unit circuit corresponding to a pixel column of the column processing unit 23. By selective scanning by the horizontal drive unit 24, a detection signal that has been subjected to signal processing for a unit circuit by the column processing unit 23 is sequentially output to the signal processing unit 31.

The system control unit 25 includes a timing generator that generates various timing signals and the like, and performs drive control on the tap drive unit 21, the vertical drive unit 22, the column processing unit 23, the horizontal drive unit 24, and the like on the basis of various timing signals generated by the timing generator.

The signal processing unit 31 has at least an arithmetic processing function, and performs various types of signal processing such as arithmetic processing on the basis of a detection signal output from the column processing unit 23. The data storage unit 32 temporarily stores data necessary for signal processing in the signal processing unit 31.

The light receiving device 1 is configured as described above.

<2. Structure Example of Pixel>

Next, the structure of the pixel 51 arranged in the pixel array unit 20 will be described.

Figure 2:
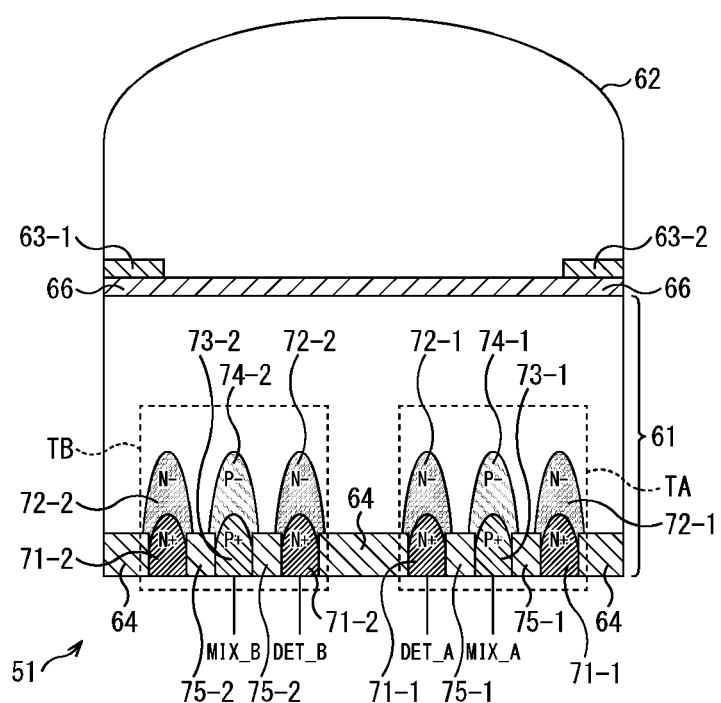
FIG. 2 is a cross-sectional view illustrating a configuration example of a pixel.

FIG. 2 illustrates a cross-sectional view of one pixel 51 arranged in the pixel array unit 20.

The pixel 51 receives and photoelectrically converts light incident from the outside, particularly infrared light, and outputs a signal corresponding to charges obtained as a result.

The pixel 51 includes, for example, a substrate 61 including a P-type semiconductor layer such as a silicon substrate and an on-chip lens 62 formed on the substrate 61. The substrate 61 corresponds to a photoelectric conversion unit that photoelectrically converts light incident on the pixel 51 from the outside.

The substrate 61 is constituted by, for example, a high-resistance P-Epi substrate having a substrate concentration of 1E+13 order or less, and is formed so as to have a resistance (resistivity) of, for example, 500 [Ωcm] or more. Here, a relationship between the substrate concentration and the resistance of the substrate 61 is set such that, for example, the resistance is 2000 [Ωcm] when the substrate concentration is 6.48E+12 [cm$^3$], the resistance is 1000 [Ωcm] when the substrate concentration is 1.30E+13 [cm$^3$], the resistance is 500 [Ωcm] when the substrate concentration is 2.59E+13 [cm$^3$], and the resistance is 100 [Ωcm] when the substrate concentration is 1.30E+14 [cm$^3$].

In FIG. 2, an upper surface of the substrate 61 is a back surface of the substrate 61, and is a light incident surface on which light from the outside is incident on the substrate 61. Meanwhile, a lower surface of the substrate 61 is a front surface of the substrate 61, and a multilayer wiring layer (not illustrated) is formed thereon. A fixed charge film 66 including a single-layer film or a stacked film having positive fixed charges is formed on the light incident surface of the substrate 61. The on-chip lens 62 that condenses light incident from the outside and makes the light incident on the substrate 61 is formed on an upper surface of the fixed charge film 66. The fixed charge film 66 brings the light incident surface side of the substrate 61 into a hole accumulation state and suppresses generation of dark current.

An inter-pixel light shielding film 63-1 and an inter-pixel light shielding film 63-2 for preventing crosstalk between adjacent pixels are formed at pixel boundary portions on the fixed charge film 66. Hereinafter, in a case where it is not particularly necessary to distinguish the inter-pixel light shielding film 63-1 and the inter-pixel light shielding film 63-2 from each other, the inter-pixel light shielding film 63-1 and the inter-pixel light shielding film 63-2 are also simply referred to as an inter-pixel light shielding film 63.

In this example, light from the outside is incident on the substrate 61 via the on-chip lens 62, and the inter-pixel light shielding film 63 is formed in order to prevent the incident light from the outside from being incident on a region of an adjacent pixel 51. That is, light that is incident on the on-chip lens 62 from the outside and travels into another pixel adjacent to the pixel 51 is shielded by the inter-pixel light shielding film 63-1 or the inter-pixel light shielding film 63-2, and is prevented from being incident on another adjacent pixel.

Since the light receiving device 1 is a back-illuminated type CAPD sensor, the light incident surface of the substrate 61 is a so-called back surface, and a wiring layer including a wire or the like is not formed on the back surface. Furthermore, in a portion of a surface opposite to the light incident surface in the substrate 61, a multilayer wiring layer is formed in which a wire for driving a transistor or the like formed in the pixel 51, a wire for reading a detection signal from the pixel 51, and the like are formed.

On a surface side opposite to the light incident surface in the substrate 61, that is, in an inner portion of the lower surface in the drawing, an oxide film 64, the first tap TA, and the second tap TB are formed.

In this example, the oxide film 64 is formed in a central portion of the pixel 51 in the vicinity of the surface of the substrate 61 opposite to the light incident surface, and the first tap TA and the second tap TB are formed at both ends of the oxide film 64.

Here, the first tap TA includes an N+ semiconductor region 71-1 and an N− semiconductor region 72-1 having a lower donor impurity concentration than the N+ semiconductor region 71-1, which are N type semiconductor regions, and a P+ semiconductor region 73-1 and a P− semiconductor region 74-1 having a lower acceptor impurity concentration than the P+ semiconductor region 73-1, which are P type semiconductor regions. Here, examples of the donor impurity include an element belonging to Group 5 in the element periodic table, such as phosphorus (P) or arsenic (As) with respect to Si, and examples of the acceptor impurity include an element belonging to Group 3 in the element periodic table, such as boron (B) with respect to Si. An element to be the donor impurity is referred to as a donor element, and an element to be the acceptor impurity is referred to as an acceptor element.

In FIG. 2, the N+ semiconductor region 71-1 is formed at a position adjacent to the right side of the oxide film 64 in a front surface inner portion of a surface of the substrate 61 opposite to the light incident surface. Furthermore, the N− semiconductor region 72-1 is formed on an upper side of the N+ semiconductor region 71-1 in the drawing so as to cover (surround) the N+ semiconductor region 71-1.

Moreover, the P+ semiconductor region 73-1 is formed on the right side of the N+ semiconductor region 71-1. Furthermore, the P− semiconductor region 74-1 is formed on an upper side of the P+ semiconductor region 73-1 in the drawing so as to cover (surround) the P+ semiconductor region 73-1.

Moreover, the N+ semiconductor region 71-1 is formed on the right side of the P+ semiconductor region 73-1. Furthermore, the N− semiconductor region 72-1 is formed on an upper side of the N+ semiconductor region 71-1 in the drawing so as to cover (surround) the N+ semiconductor region 71-1.

Similarly, the second tap TB includes an N+ semiconductor region 71-2 and an N− semiconductor region 72-2 having a lower donor impurity concentration than the N+ semiconductor region 71-2, which are N type semiconductor regions, and a P+ semiconductor region 73-2 and a P− semiconductor region 74-2 having a lower acceptor impurity concentration than the P+ semiconductor region 73-2, which are P type semiconductor regions.

In FIG. 2, the N+ semiconductor region 71-2 is formed at a position adjacent to the left side of the oxide film 64 in a front surface inner portion of a surface of the substrate 61 opposite to the light incident surface. Furthermore, the N− semiconductor region 72-2 is formed on an upper side of the N+ semiconductor region 71-2 in the drawing so as to cover (surround) the N+ semiconductor region 71-2.

Moreover, the P+ semiconductor region 73-2 is formed on the left side of the N+ semiconductor region 71-2. Furthermore, the P− semiconductor region 74-2 is formed on an upper side of the P+ semiconductor region 73-2 in the drawing so as to cover (surround) the P+ semiconductor region 73-2.

Moreover, the N+ semiconductor region 71-2 is formed on the left side of the P+ semiconductor region 73-2. Furthermore, the N− semiconductor region 72-2 is formed on an upper side of the N+ semiconductor region 71-2 in the drawing so as to cover (surround) the N+ semiconductor region 71-2.

The oxide film 64 similar to the central portion of the pixel 51 is formed at an end portion of the pixel 51 in a front surface inner portion of a surface of the substrate 61 opposite to the light incident surface.

Hereinafter, in a case where it is not necessary to particularly distinguish the first tap TA and the second tap TB from each other, the first tap TA and the second tap TB are simply referred to as a tap T.

Furthermore, hereinafter, in a case where it is not necessary to particularly distinguish the N+ semiconductor region 71-1 and the N+ semiconductor region 71-2 from each other, the N+ semiconductor region 71-1 and the N+ semiconductor region 71-2 are also simply referred to as an N+ semiconductor region 71, and in a case where it is not necessary to particularly distinguish the N− semiconductor region 72-1 and the N− semiconductor region 72-2 from each other, the N− semiconductor region 72-1 and the N− semiconductor region 72-2 are simply referred to as an N− semiconductor region 72.

Moreover, hereinafter, in a case where it is not necessary to particularly distinguish the P+ semiconductor region 73-1 and the P+ semiconductor region 73-2 from each other, the P+ semiconductor region 73-1 and the P+ semiconductor region 73-2 are also simply referred to as a P+ semiconductor region 73, and in a case where it is not necessary to particularly distinguish the P− semiconductor region 74-1 and the P− semiconductor region 74-2 from each other, the P− semiconductor region 74-1 and the P− semiconductor region 74-2 are simply referred to as a P− semiconductor region 74.

Furthermore, in the substrate 61, between the N+ semiconductor region 71-1 and the P+ semiconductor region 73-1, an isolation portion 75-1 for isolating the N+ semiconductor region 71-1 and the P+ semiconductor region 73-1 from each other is constituted by an oxide film or the like. Similarly, also between the N+ semiconductor region 71-2 and the P+ semiconductor region 73-2, an isolation portion 75-2 for isolating the N+ semiconductor region 71-2 and the P+ semiconductor region 73-2 from each other is constituted by an oxide film or the like. Hereinafter, in a case where it is not necessary to particularly distinguish the isolation portion 75-1 and the isolation portion 75-2 from each other, the isolation portion 75-1 and the isolation portion 75-2 are simply referred to as an isolation portion 75.

The N+ semiconductor region 71 disposed in the substrate 61 functions as a charge detection unit for detecting the amount of light incident on the pixel 51 from the outside, that is, the amount of signal carriers generated by photoelectric conversion by the substrate 61. Note that, in addition to the N+ semiconductor region 71, the N− semiconductor region 72 having a low donor impurity concentration can also be regarded as the charge detection unit. The N− semiconductor region 72 having a low donor impurity concentration may be omitted. Furthermore, the P+ semiconductor region 73 functions as a voltage application unit for injecting a large number of carrier currents into the substrate 61, that is, for applying a voltage directly to the substrate 61 to generate an electric field in the substrate 61. Note that, in addition to the P+ semiconductor region 73, the P− semiconductor region 74 having a low acceptor impurity concentration can also be regarded as the voltage application unit. The P− semiconductor region 74 having a low acceptor impurity concentration may be omitted.

Although details will be described later, a floating diffusion (FD) portion (hereinafter, also particularly referred to as an FD portion A) which is a floating diffusion region (not illustrated) is directly connected to the N+ semiconductor region 71-1, and the FD portion A is further connected to the vertical signal line VSL via an amplification transistor (not illustrated) or the like.

Similarly, another FD portion (hereinafter, also particularly referred to as an FD portion B) different from the FD portion A is directly connected to the N+ semiconductor region 71-2, and the FD portion B is further connected to the vertical signal line VSL via an amplification transistor (not illustrated) or the like. Here, the vertical signal line VSL connected to the FD portion A and the vertical signal line VSL connected to the FD portion B are different vertical signal lines VSL.

For example, in a case where a distance to an object is to be measured by an indirect ToF method, infrared light is emitted from an imaging device including the light receiving device 1 toward the object. Then, when the infrared light is reflected by the object and returns to the imaging device as reflected light, the substrate 61 of the light receiving device 1 receives and photoelectrically converts the incident reflected light (infrared light). The tap drive unit 21 drives the first tap TA and the second tap TB of the pixel 51, and distributes signals corresponding to charges DET obtained by the photoelectric conversion to the FD portion A and the FD portion B.

For example, at a certain timing, the tap drive unit 21 applies a voltage to the two P+ semiconductor regions 73 via a contact or the like. Specifically, for example, the tap drive unit 21 applies a voltage of MIX_A=1.5 V to the P+ semiconductor region 73-1 of the first tap TA, and applies a voltage of MIX_B=0 V to the P+ semiconductor region 73-2 of the second tap TB.

Then, an electric field is generated between the two P+ semiconductor regions 73 in the substrate 61, and a current flows from the P+ semiconductor region 73-1 to the P+ semiconductor region 73-2. In this case, holes in the substrate 61 move toward the P+ semiconductor region 73-2, and electrons move toward the P+ semiconductor region 73-1.

Therefore, when infrared light (reflected light) from the outside is incident on the substrate 61 via the on-chip lens 62 in such a state and the infrared light is photoelectrically converted in the substrate 61 and converted into a pair of an electron and a hole, the obtained electron is guided toward the P+ semiconductor region 73-1 by an electric field between the P+ semiconductor regions 73 and moves into the N+ semiconductor region 71-1.

In this case, the electrons generated by the photoelectric conversion are used as signal carriers (signal charges) for detecting a signal corresponding to the amount of infrared light incident on the pixel 51, that is, the amount of received infrared light.

Therefore, in the N+ semiconductor region 71-1, charges corresponding to electrons moving into the N+ semiconductor region 71-1 are accumulated, and the charges are detected by the column processing unit 23 via the FD portion A, the amplification transistor, the vertical signal line VSL, and the like.

That is, the accumulated charges DET_A in the N+ semiconductor region 71-1 are transferred to the FD portion A directly connected to the N+ semiconductor region 71-1, and a signal corresponding to the charges DET_A transferred to the FD portion A is read by the column processing unit 23 via the amplification transistor or the vertical signal line VSL. Then, processing such as AD conversion processing is performed on the read signal in the column processing unit 23, and a detection signal obtained as a result is supplied to the signal processing unit 31.

This detection signal is a signal indicating the amount of charges according to the electrons detected by the N+ semiconductor region 71-1, that is, the amount of charges DET_A accumulated in the FD portion A. In other words, the detection signal is a signal indicating the amount of infrared light received by the pixel 51.

Note that, at this time, similarly to the case of the N+ semiconductor region 71-1, a detection signal corresponding to electrons detected in the N+ semiconductor region 71-2 may also be appropriately used for distance measurement.

Furthermore, at the next timing, a voltage is applied to the two P+ semiconductor regions 73 via a contact or the like by the tap drive unit 21 so as to generate an electric field in a direction opposite to the electric field that has been generated in the substrate 61 so far. Specifically, for example, a voltage of MIX_A=0 V is applied to the P+ semiconductor region 73-1 of the first tap TA, and a voltage of MIX_B=1.5 V is applied to the P+ semiconductor region 73-2 of the second tap TB.

Therefore, an electric field is generated between the two P+ semiconductor regions 73 in the substrate 61, and a current flows from the P+ semiconductor region 73-2 to the P+ semiconductor region 73-1.

When infrared light (reflected light) from the outside is incident on the substrate 61 via the on-chip lens 62 in such a state and the infrared light is photoelectrically converted in the substrate 61 and converted into a pair of an electron and a hole, the obtained electron is guided toward the P+ semiconductor region 73-2 by an electric field between the P+ semiconductor regions 73 and moves into the N+ semiconductor region 71-2.

Therefore, in the N+ semiconductor region 71-2, charges corresponding to electrons moving into the N+ semiconductor region 71-2 are accumulated, and the charges are detected by the column processing unit 23 via the FD portion B, the amplification transistor, the vertical signal line VSL, and the like.

That is, the accumulated charges DET_B in the N+ semiconductor region 71-2 are transferred to the FD portion B directly connected to the N+ semiconductor region 71-2, and a signal corresponding to the charges DET_B transferred to the FD portion B is read by the column processing unit 23 via the amplification transistor or the vertical signal line VSL. Then, processing such as AD conversion processing is performed on the read signal in the column processing unit 23, and a detection signal obtained as a result is supplied to the signal processing unit 31.

Note that, at this time, similarly to the case of the N+ semiconductor region 71-2, a detection signal corresponding to electrons detected in the N+ semiconductor region 71-1 may also be appropriately used for distance measurement.

In this way, when detection signals obtained by photoelectric conversion in different periods are obtained in the same pixel 51, the signal processing unit 31 calculates distance information indicating a distance to the object on the basis of these detection signals and outputs the distance information to a subsequent stage.

A method for distributing signal carriers to the N+ semiconductor regions 71 different from each other in this way and calculating distance information on the basis of a detection signal corresponding to the signal carriers is called an indirect ToF method.

<Example of Planar Shape of Tap I>

Figure 3:
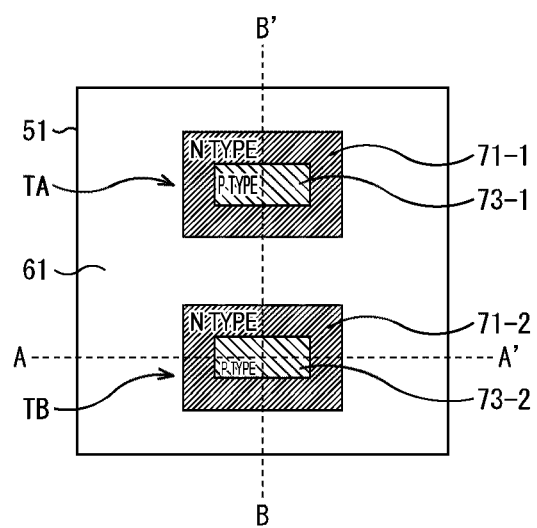
FIG. 3 is a plan view of a first tap and a second tap of a pixel.

FIG. 3 is a plan view of the first tap TA and the second tap TB of the pixel 51.

In FIG. 3, a part corresponding to that in FIG. 2 is denoted by the same reference numeral, and description thereof is appropriately omitted.

As illustrated in FIG. 3, each tap T has a structure in which a periphery of the P+ semiconductor region 73 is surrounded by the N+ semiconductor region 71. More specifically, the rectangular P+ semiconductor region 73 is formed at a central position of the tap T, and a periphery of the P+ semiconductor region 73 is surrounded by the rectangular N+ semiconductor region 71, more specifically, the rectangular frame-shaped N+ semiconductor region 71 with the P+ semiconductor region 73 as the center.

Note that FIG. 3 does not illustrate the isolation portion 75 between the P+ semiconductor region 73 and the N+ semiconductor region 71 or the oxide film 64.

Infrared light incident from the outside is condensed on the central portion of the pixel 51, that is, an intermediate portion between the first tap TA and the second tap TB by the on-chip lens 62. Therefore, it is possible to suppress occurrence of crosstalk due to incidence of the infrared light on a pixel 51 adjacent to a pixel 51. Furthermore, when the infrared light is directly incident on the tap T, charge isolation efficiency, that is, contrast between active and inactive tap (Cmod) and modulation contrast are reduced, and therefore reduction thereof can also be suppressed.

Here, the tap T that reads a signal corresponding to the charges DET obtained by the photoelectric conversion, that is, the tap T that should detect the charges DET obtained by the photoelectric conversion is also referred to as an active tap.

Conversely, the tap T that basically does not read a signal corresponding to the charges DET obtained by the photoelectric conversion, that is, the tap T that is not the active tap is also referred to as an inactive tap.

In the above-described example, the tap T in which a voltage of 1.5 V is applied to the P+ semiconductor region 73 is an active tap, and the tap T in which a voltage of 0 V is applied to the P+ semiconductor region 73 is an inactive tap.

Cmod is calculated by the following formula (1), is an index indicating how many % of charges generated by the photoelectric conversion of the incident infrared light can be detected in the N+ semiconductor region 71 of the tap T which is an active tap, that is, whether a signal according to the charges can be taken out, and indicates the charge isolation efficiency. In formula (1), I0 represents a signal detected by one of the two charge detection units (P+ semiconductor regions 73), and I1 represents a signal detected by the other.

$$C\bmod = \{|I0-I1|/(I0+I1)\} \times 100 \tag{1}$$

Therefore, for example, when infrared light incident from the outside is incident on the region of the inactive tap and photoelectric conversion is performed in the inactive tap, there is a high possibility that electrons, which are signal carriers generated by the photoelectric conversion, move to the N+ semiconductor region 71 in the inactive tap. Then, charges of some electrons obtained by the photoelectric conversion are not detected in the N+ semiconductor region 71 in the active tap, and Cmod, that is, the charge isolation efficiency decreases.

Therefore, in the pixel 51, by condensing infrared light on the vicinity of the central portion of the pixel 51 at a position far away from the two taps T by substantially the same distance, a probability that the infrared light incident from the outside is photoelectrically converted in the region of the inactive tap can be reduced, and the charge isolation efficiency can be improved. Furthermore, in the pixel 51, a modulation contrast can also be improved. In other words, electrons obtained by the photoelectric conversion can be easily guided to the N+ semiconductor region 71 in the active tap.

<Structure Example in which DTI for Pixel Isolation is Disposed>

In the structure of the pixel 51 illustrated in FIG. 2, an isolation structure can be disposed between the pixels 51 in order to improve isolation characteristics between adjacent pixels and suppress crosstalk.

Figure 4:
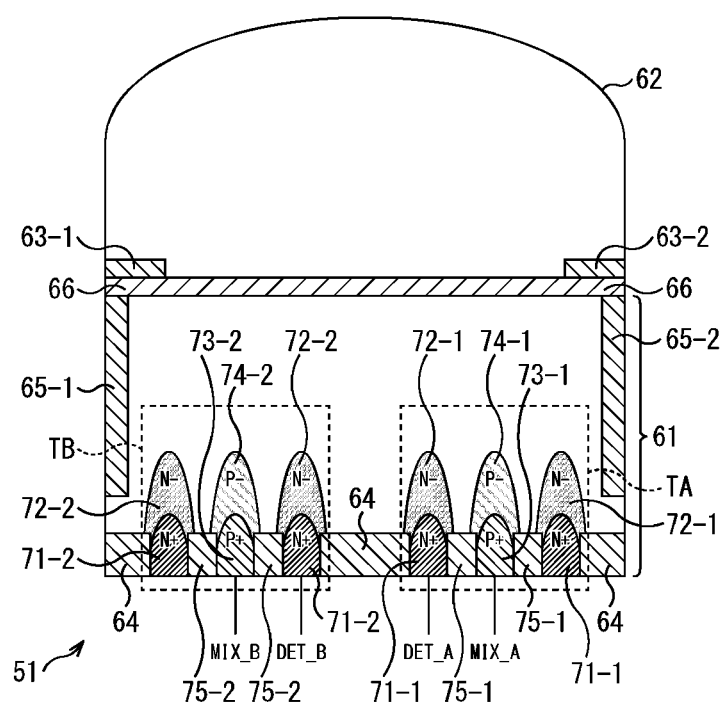
FIG. 4 is a cross-sectional view of a pixel having an isolation structure.

FIG. 4 is a cross-sectional view illustrating a configuration in which an isolation structure is disposed between the adjacent pixels 51 illustrated in FIG. 2.

In FIG. 4, a part corresponding to that in FIG. 2 is denoted by the same reference numeral, and description thereof is omitted.

The pixel 51 in FIG. 4 is different from the pixel 51 illustrated in FIG. 2 in that deep trench isolations (DTIs) 65-1 and 65-2 as pixel isolation portions are disposed, and is common to the pixel 51 in FIG. 2 in other points. The DTIs 65-1 and 65-2 are formed in the substrate 61 at a boundary portion with the adjacent pixel 51 at a predetermined depth from a back surface side of the substrate 61. Hereinafter, in a case where it is not necessary to particularly distinguish the DTIs 65-1 and 65-2 from each other, the DTIs 65-1 and 65-2 are simply referred to as a DTI 65. The DTI 65 can be constituted by, for example, an oxide film. Furthermore, for example, the DTI 65 may have a structure in which an outer periphery of a metal film of tungsten (W), aluminum (Al), copper (Cu), titanium (Ti), or the like is covered with (surrounded by) an insulating film of silicon oxide ($SiO_2$), silicon oxynitride (SiON), or the like.

By forming the embedded DTI 65 in this way, the isolation characteristic of infrared light between pixels can be improved, and occurrence of crosstalk can be suppressed.

<3. Cross-Sectional Configuration Example of Plurality of Pixels>

In the cross-sectional configurations of the pixel 51 illustrated in FIGS. 2 and 4, a multilayer wiring layer formed on a front surface side of the substrate 61 opposite to the light incident surface is not illustrated.

Figure 5:
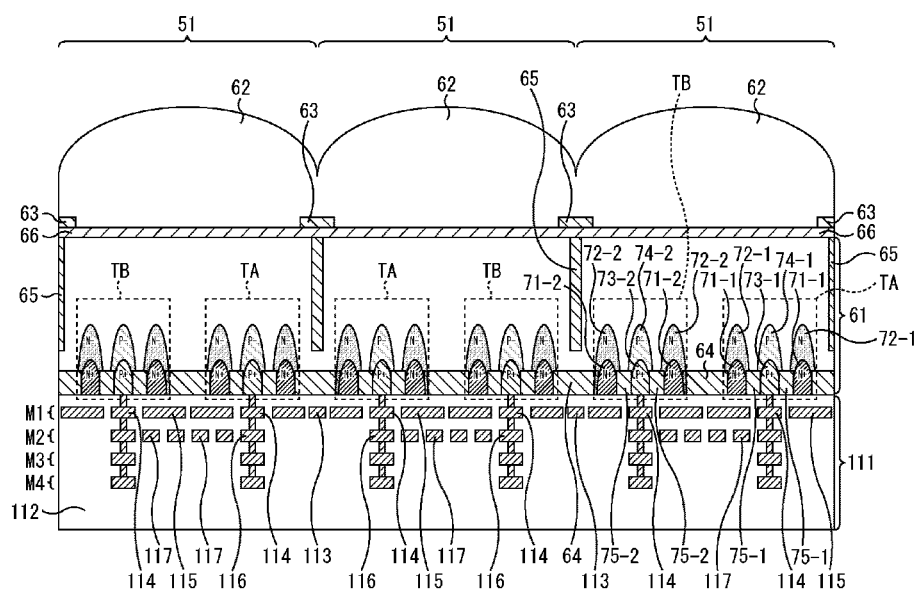
FIG. 5 is a cross-sectional view of a plurality of pixels.
Figure 6:
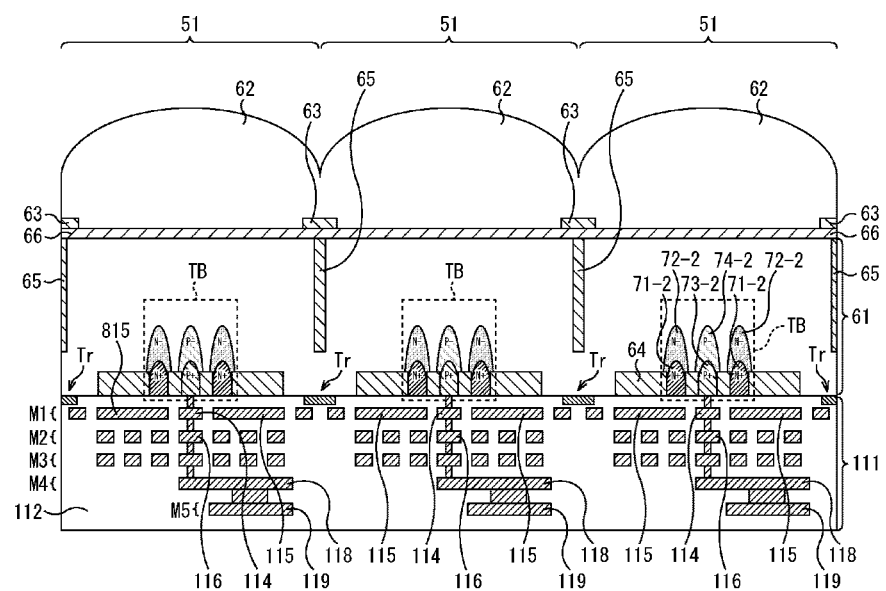
FIG. 6 is a cross-sectional view of a plurality of pixels.

Therefore, FIGS. 5 and 6 each illustrate a cross-sectional view of a plurality of adjacent pixels without omitting the multilayer wiring layer.

FIG. 5 is a cross-sectional view taken along line B-B' of FIG. 3, and FIG. 6 is a cross-sectional view taken along line A-A' of FIG. 3.

Note that FIGS. 5 and 6 are each a cross-sectional view in which the plurality of pixels 51 each including the DTI 65 illustrated in FIG. 4 is arranged. Also in FIGS. 5 and 6, a part corresponding to that in FIGS. 3 and 4 is denoted by the same reference numeral, and description thereof is omitted.

A multilayer wiring layer 111 is formed on a side of the substrate 61 opposite to the light incident surface side on which the on-chip lens 62 is formed for each pixel. In other words, the substrate 61, which is a semiconductor layer, is disposed between the on-chip lens 62 and the multilayer wiring layer 111. The multilayer wiring layer 111 includes five layers of metal films M1 to M5 and an interlayer insulating film 112 therebetween. Note that, in FIG. 5, the outermost metal film M5 among the five layers of metal films M1 to M5 of the multilayer wiring layer 111 is not illustrated because the metal film M5 is in an invisible place, but is illustrated in FIG. 6, which is a cross-sectional view from a direction different from the cross-sectional view of FIG. 5.

As illustrated in FIG. 6, a pixel transistor Tr is formed in a pixel boundary region at an interface portion between the multilayer wiring layer 111 and the substrate 61. The pixel transistor Tr is any one of a transfer transistor 121, a reset transistor 123, an amplification transistor 124, a selection transistor 125, and the like described later with reference to FIGS. 12 and 13.

Among the five layers of metal films M1 to M5 of the multilayer wiring layer 111, the metal film M1 closest to the substrate 61 includes a power supply line 113 for supplying a power supply voltage, a voltage application wire 114 for applying a predetermined voltage to the P+ semiconductor region 73-1 or 73-2, and a reflecting member 115 that reflects incident light. In the metal film M1 of FIG. 6, a wire other than the power supply line 113 and the voltage application wire 114 is the reflecting member 115, but some reference numerals are omitted in order to prevent the drawing from being complicated. The reflecting member 115 is disposed for the purpose of reflecting incident light. The reflecting member 115 is disposed below the N+ semiconductor regions 71-1 and 71-2 so as to overlap the N+ semiconductor regions 71-1 and 71-2, which are charge detection units in plan view. Note that a light shielding member may be disposed instead of the reflecting member 115.

Figure 12:
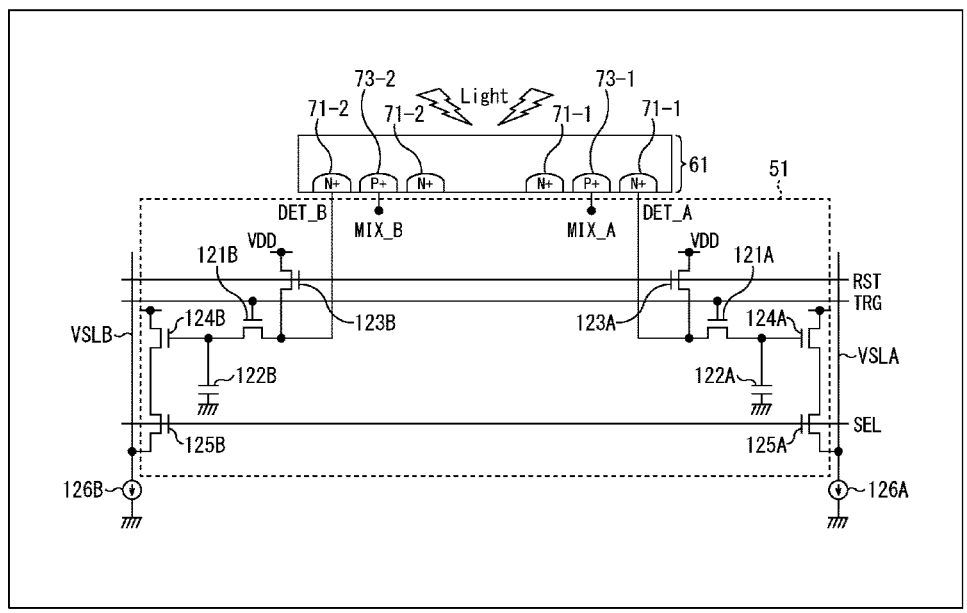
FIG. 12 is a diagram illustrating an equivalent circuit of a pixel.
Figure 13:
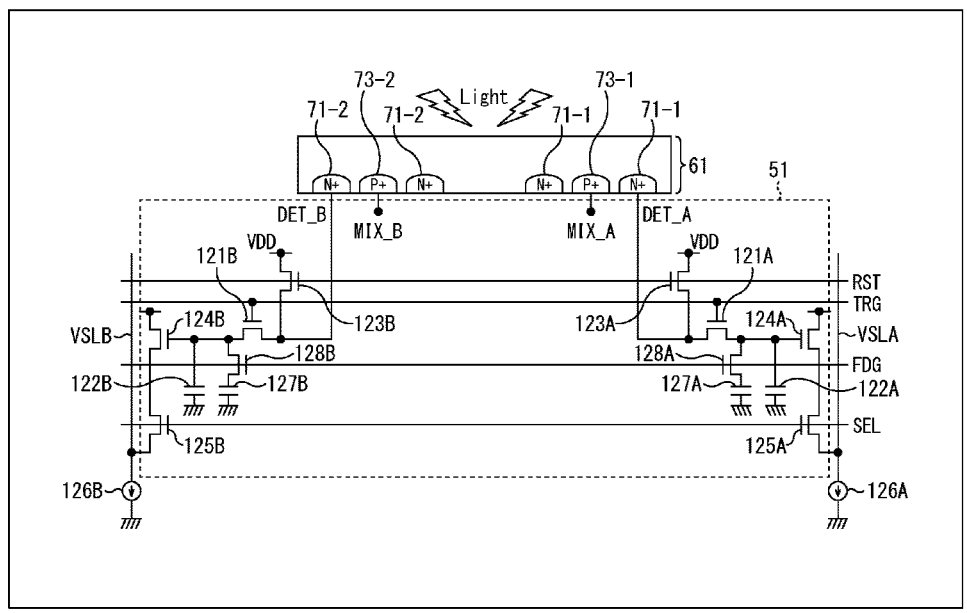
FIG. 13 is a diagram illustrating another equivalent circuit of the pixel.

In the metal film M2, which is the second layer from the substrate 61 side, for example, a voltage application wire 116 connected to the voltage application wire 114 of the metal film M1, a control line 117 that transmits a drive signal TRG, a drive signal RST, a selection signal SEL, a drive signal FDG, and the like described later with reference to FIGS. 12 and 13, a VSS wire having a predetermined VSS potential such as GND, and the like are formed. Furthermore, in the metal film M2, an FD 122 and an additional capacitor 127 described later with reference to FIGS. 12 and 13 are formed.

In the metal film M3, which is the third layer from the substrate 61 side, for example, a vertical signal line VSL, a VSS wire, and the like are formed.

In the metal films M4 and M5, which are the fourth layer and the fifth layer from the substrate 61 side, for example, voltage supply lines 118 and 119 for applying a predetermined voltage MIX_A or MIX_B to the P+ semiconductor regions 73-1 and 73-2, which are voltage application units of the tap T, are formed.

Note that details of the planar arrangement of the five layers of metal films M1 to M5 of the multilayer wiring layer 111 will be described later with reference to FIGS. 18 to 23.

<4. Example of Other Planar Shape of Tap T>

Other planar shapes of the tap T will be described with reference to FIGS. 7 to 11.

Note that, in FIGS. 7 to 11, a part corresponding to that in FIG. 3 is denoted by the same reference numeral, and description thereof is appropriately omitted.

(First Modification of Tap T)

Figure 7:
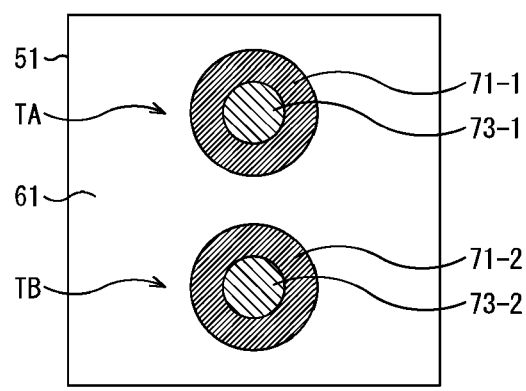
FIG. 7 is a plan view illustrating a first modification of a tap of a pixel.

FIG. 7 is a plan view illustrating a first modification of the first tap TA and the second tap TB of the pixel 51.

In FIG. 3, the planar shape of each tap T of the first tap TA and the second tap TB is rectangular.

In the first modification illustrated in FIG. 7, the planar shape of each tap T of the first tap TA and the second tap TB is circular. More specifically, the circular P+ semiconductor region 73 is formed at a central position of each tap T, and a periphery of the P+ semiconductor region 73 is surrounded by the circular (annular) N+ semiconductor region 71 with the P+ semiconductor region 73 as the center.

(Second Modification of Tap T)

Figure 8:
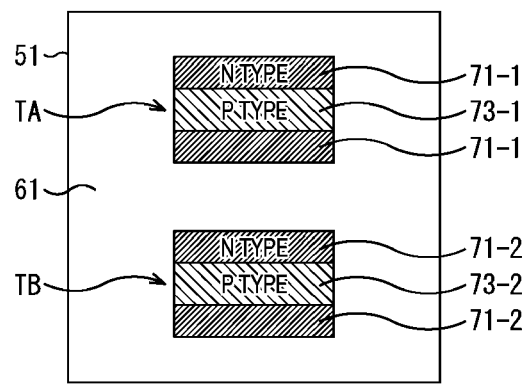
FIG. 8 is a plan view illustrating a second modification of the tap of the pixel.

FIG. 8 is a plan view illustrating a second modification of the first tap TA and the second tap TB of the pixel 51.

In FIG. 3, each tap T is formed such that the N+ semiconductor region 71 surrounds an outer periphery of the P+ semiconductor region 73. However, in the second modification illustrated in FIG. 8, each tap T is formed such that the line-shaped N+ semiconductor regions 71 sandwich the line-shaped P+ semiconductor region 73 therebetween from a direction perpendicular to a longitudinal direction. Therefore, an end surface of a short side of the line-shaped P+ semiconductor region 73 is not surrounded by the N+ semiconductor region 71.

The lateral length of each of the line-shaped N+ semiconductor region 71 and the line-shaped P+ semiconductor region 73 may be any length, and these regions do not need to have the same length.

(Third Modification of Tap T)

Figure 9:
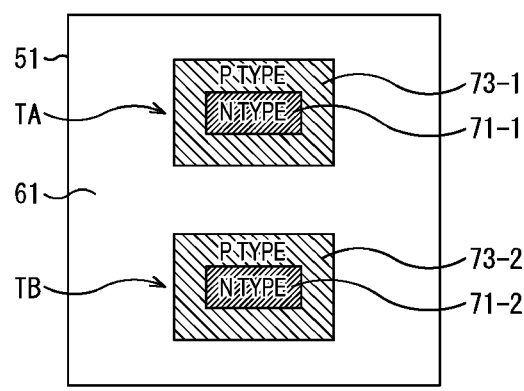
FIG. 9 is a plan view illustrating a third modification of the tap of the pixel.

FIG. 9 is a plan view illustrating a third modification of the first tap TA and the second tap TB of the pixel 51.

In FIG. 3, each tap T has a configuration in which the P+ semiconductor region 73 is surrounded by the N+ semiconductor region 71. In other words, the P+ semiconductor region 73 is formed inside the tap T, and the N+ semiconductor region 71 is formed outside the tap T.

The arrangement of the N+ semiconductor region 71 and the P+ semiconductor region 73 may be reversed.

Each tap T in FIG. 9 is configured by reversing the arrangement of the N+ semiconductor region 71 and the P+ semiconductor region 73 of each tap T in FIG. 3.

Specifically, each tap T in FIG. 9 has a configuration in which the rectangular N+ semiconductor region 71 is surrounded by the P+ semiconductor region 73. In other words, the N+ semiconductor region 71 is formed, and the P+ semiconductor region 73 is formed outside.

(Fourth Modification of Tap T)

Figure 10:
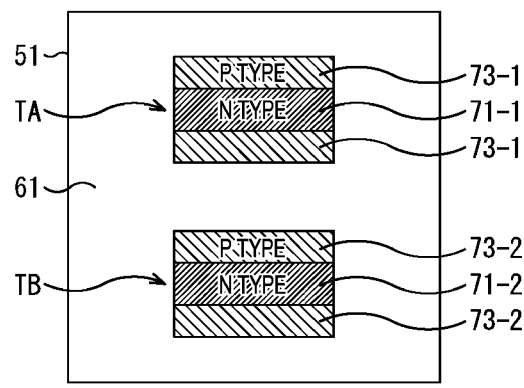
FIG. 10 is a plan view illustrating a fourth modification of the tap of the pixel.

FIG. 10 is a plan view illustrating a fourth modification of the first tap TA and the second tap TB of the pixel 51.

Each tap T in FIG. 10 is configured by reversing the arrangement of the N+ semiconductor region 71 and the P+ semiconductor region 73 of each tap T in FIG. 8.

Specifically, each tap T in FIG. 10 is formed such that the line-shaped P+ semiconductor regions 73 sandwich the line-shaped N+ semiconductor region 71 therebetween from a direction perpendicular to a longitudinal direction.

The lateral length of each of the line-shaped N+ semiconductor region 71 and the line-shaped P+ semiconductor region 73 may be any length, and these regions do not need to have the same length.

(Fifth Modification of Tap T)

Figure 11:
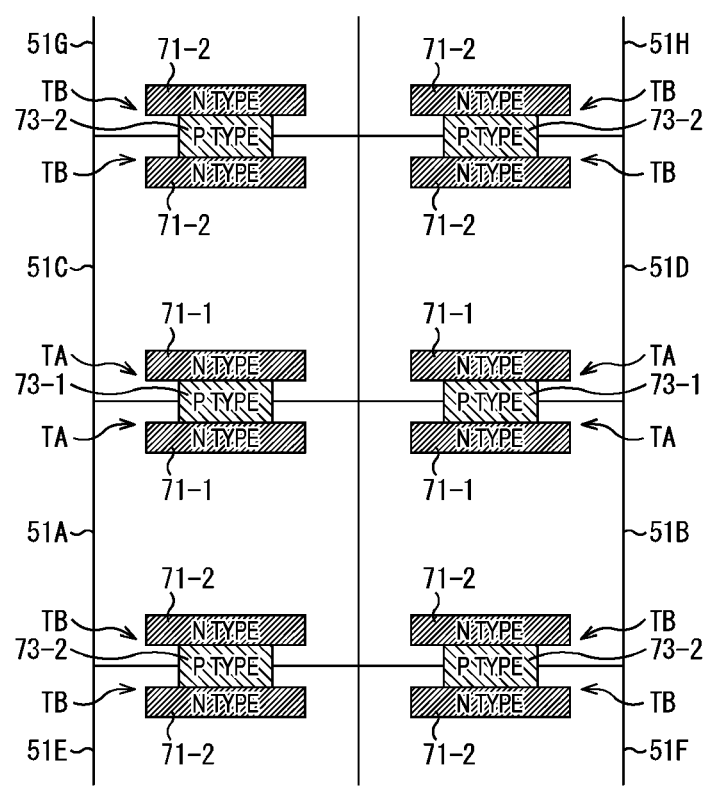
FIG. 11 is a plan view illustrating a fifth modification of the tap of the pixel.

FIG. 11 is a plan view illustrating a fifth modification of the first tap TA and the second tap TB of the pixel 51.

In FIG. 11, six pixels 51 arranged in 2×4 are distinguished from each other as pixels 51A to 51H.

The first tap TA and the second tap TB of each pixel 51 can have a structure in which the P+ semiconductor region 73 as a voltage application unit is shared by adjacent pixels 51. Hereinafter, a structure in which the P+ semiconductor region 73 as a voltage application unit is shared by two taps T of different pixels 51 is also referred to as a shared tap structure.

The fifth modification illustrated in FIG. 11 is a shared tap structure in which the P+ semiconductor region 73 as a voltage application unit of each tap T in FIG. 8 is shared by two pixels 51 adjacent in the vertical direction (up-down direction).

Specifically, the P+ semiconductor region 73-1 disposed at a pixel boundary between the pixel 51A and the pixel 51C serves as the P+ semiconductor region 73 as a voltage application unit of the first tap TA of the pixel 51A and the P+ semiconductor region 73 as a voltage application unit of the first tap TA of the pixel 51C.

The P+ semiconductor region 73-1 disposed at a pixel boundary between the pixel 51B and the pixel 51D serves as the P+ semiconductor region 73 as a voltage application unit of the first tap TA of the pixel 51B and the P+ semiconductor region 73-1 as a voltage application unit of the first tap TA of the pixel 51D.

The P+ semiconductor region 73-2 disposed at a pixel boundary between the pixel 51A and the pixel 51E serves as the P+ semiconductor region 73 as a voltage application unit of the second tap TB of the pixel 51B and the P+ semiconductor region 73 as a voltage application unit of the second tap TB of the pixel 51E.

The P+ semiconductor region 73-2 disposed at a pixel boundary between the pixel 51B and the pixel 51F serves as the P+ semiconductor region 73 as a voltage application unit of the second tap TB of the pixel 51B and the P+ semiconductor region 73 as a voltage application unit of the second tap TB of the pixel 51F.

Similarly, each of the P+ semiconductor region 73-2 disposed at a pixel boundary between the pixel 51C and the pixel 51 G and the P+ semiconductor region 73-2 disposed at a pixel boundary between the pixel 51D and the pixel 51H serves as the P+ semiconductor regions 73 as voltage application units of the second taps TB of two pixels 51 adjacent in the vertical direction.

As described above, also in the shared tap structure in which the P+ semiconductor region 73 of the voltage application unit of each tap T is shared by adjacent pixels, a distance can be measured using an indirect ToF method by the operation described with reference to FIG. 2.

In the shared tap structure as illustrated in FIG. 11, a distance between paired P+ semiconductor regions for generating an electric field, that is, a current, such as a distance between the P+ semiconductor region 73-1 of the first tap TA and the P+ semiconductor region 73-2 of the second tap TB, is long. In other words, by sharing the P+ semiconductor region 73 of the voltage application unit of each tap T by adjacent pixels, a distance between the P+ semiconductor regions can be maximized. Therefore, since a current hardly flows between the P+ semiconductor regions of two taps T, power consumption of the pixel 51 can be reduced, which is advantageous for miniaturization of the pixel.

Note that FIG. 11 illustrates a configuration in which the tap structure of FIG. 8 is a shared tap structure. However, for example, in a case where the tap structure of FIG. 10 is a shared tap structure, the N+ semiconductor region 71 is shared by adjacent pixels 51.

<5. Equivalent Circuit of Pixel>

FIG. 12 illustrates an equivalent circuit of the pixel 51.

The pixel 51 includes a transfer transistor 121A, an FD 122A, a reset transistor 123A, an amplification transistor 124A, and a selection transistor 125A for the first tap TA including the N+ semiconductor region 71-1, the P+ semiconductor region 73-1, and the like.

Furthermore, the pixel 51 includes a transfer transistor 121B, an FD 122B, a reset transistor 123B, an amplification transistor 124B, and a selection transistor 125B for the second tap TB including the N+ semiconductor region 71-2, the P+ semiconductor region 73-2, and the like.

The tap drive unit 21 applies a predetermined voltage MIX_A (first voltage) to the P+ semiconductor region 73-1 and applies a predetermined voltage MIX_B (second voltage) to the P+ semiconductor region 73-2. In the above-described example, one of the voltages MIX_A and MIX_B is 1.5 V, and the other is 0 V. The P+ semiconductor regions 73-1 and 73-2 are voltage application units to which the first voltage or the second voltage is applied.

The N+ semiconductor regions 71-1 and 71-2 are each a charge detection unit that detects and accumulates charges generated by photoelectric conversion of light incident on the substrate 61.

When a drive signal TRG supplied to a gate electrode becomes active, the transfer transistor 121A becomes conductive in response thereto, and thereby transfers charges accumulated in the N+ semiconductor region 71-1 to the FD 122A. When a drive signal TRG supplied to a gate electrode becomes active, the transfer transistor 121B becomes conductive in response thereto, and thereby transfers charges accumulated in the N+ semiconductor region 71-2 to the FD 122B.

The FD 122A temporarily holds charges DET_A supplied from the N+ semiconductor region 71-1. The FD 122B temporarily holds charges DET_B supplied from the N+ semiconductor region 71-2. The FD 122A corresponds to the FD portion A described with reference to FIG. 2, and the FD 122B corresponds to the FD portion B.

When a drive signal RST supplied to a gate electrode becomes active, the reset transistor 123A becomes conductive in response thereto, and thereby resets the potential of the FD 122A to a predetermined level (power supply voltage VDD). When a drive signal RST supplied to a gate electrode becomes active, the reset transistor 123B becomes conductive in response thereto, and thereby resets the potential of the FD 122B to a predetermined level (power supply voltage VDD). Note that when the reset transistors 123A and 123B become active, the transfer transistors 121A and 121B also become active simultaneously.

By connection of a source electrode to a vertical signal line VSLA via the selection transistor 125A, the amplification transistor 124A forms a source follower circuit with a load MOS of a constant current source circuit unit 126A connected to one end of the vertical signal line VSLA. By connection of a source electrode to a vertical signal line VSLB via the selection transistor 125B, the amplification transistor 124B forms a source follower circuit with a load MOS of a constant current source circuit unit 126B connected to one end of the vertical signal line VSLB.

The selection transistor 125A is connected between a source electrode of the amplification transistor 124A and the vertical signal line VSLA. When a selection signal SEL supplied to a gate electrode becomes active, the selection transistor 125A becomes conductive in response thereto, and outputs a detection signal output from the amplification transistor 124A to the vertical signal line VSLA.

The selection transistor 125B is connected between a source electrode of the amplification transistor 124B and the vertical signal line VSLB. When a selection signal SEL supplied to a gate electrode becomes active, the selection transistor 125B becomes conductive in response thereto, and outputs a detection signal output from the amplification transistor 124B to the vertical signal line VSLB.

The transfer transistors 121A and 121B, the reset transistors 123A and 123B, the amplification transistors 124A and 124B, and the selection transistors 125A and 125B of the pixel 51 are controlled by, for example, the vertical drive unit 22.

<Configuration Example of Other Equivalent Circuit of Pixel>

FIG. 13 illustrates another equivalent circuit of the pixel 51.

In FIG. 13, a part corresponding to that in FIG. 12 is denoted by the same reference numeral, and description thereof is appropriately omitted.

In the equivalent circuit of FIG. 13, the additional capacitor 127 and a switching transistor 128 for controlling connection thereof are added to each of the first tap TA and the second tap TB in the equivalent circuit of FIG. 12.

Specifically, an additional capacitor 127A is connected between the transfer transistor 121A and the FD 122A via a switching transistor 128A, and an additional capacitor 127B is connected between the transfer transistor 121B and the FD 122B via a switching transistor 128B.

When a drive signal FDG supplied to a gate electrode becomes active, the switching transistor 128A becomes conductive in response thereto, and thereby connects the additional capacitor 127A to the FD 122A. When a drive signal FDG supplied to a gate electrode becomes active, the switching transistor 128B becomes conductive in response thereto, and thereby connects the additional capacitor 127B to the FD 122B.

For example, at high illuminance with a large amount of incident light, the vertical drive unit 22 makes the switching transistors 128A and 128B active, connects the FD 122A and the additional capacitor 127A to each other, and connects the FD 122B and the additional capacitor 127B to each other. Therefore, more charges can be accumulated at high illuminance.

Meanwhile, at low illuminance with a small amount of incident light, the vertical drive unit 22 makes the switching transistors 128A and 128B inactive, and separates the additional capacitors 127A and 127B from the FDs 122A and 122B, respectively.

The additional capacitor 127 may be omitted as in the equivalent circuit of FIG. 12. However, by disposing the additional capacitor 127 and using the additional capacitor 127 in various ways depending on the amount of incident light, a high dynamic range can be ensured.

<6. Wiring Example of Vertical Signal Line VSL>

In the light receiving device 1, as described with reference to FIG. 1, the four vertical signal lines VSL are disposed for each pixel column of the pixels 51 arranged in a matrix in the pixel array unit 20.

FIGS. 14 to 17 illustrate wiring examples of the light receiving device 1 in a case where the four vertical signal lines VSL are disposed for one pixel column.

(First Wiring Example of Vertical Signal Line VSL)

Figure 14:
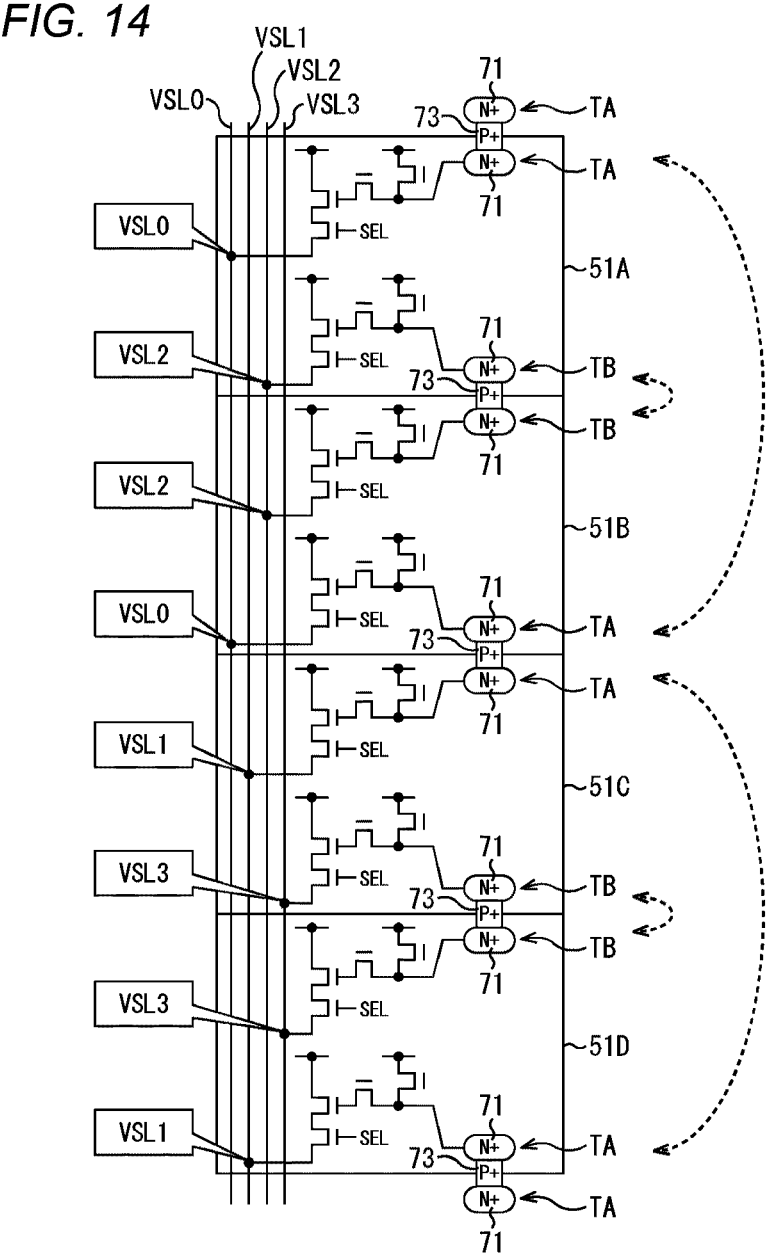
FIG. 14 is a diagram illustrating a first wiring example of a vertical signal line.

FIG. 14 illustrates a first wiring example of the vertical signal line VSL.

Since a pixel circuit of each pixel 51 illustrated in FIG. 14 is the same as the circuit illustrated in FIG. 12, reference numerals are appropriately omitted. Furthermore, the shared tap structure illustrated in FIG. 11 is adopted as the configuration of each tap T of each pixel 51 in FIG. 14.

Note that although FIG. 14 illustrates only one pixel column, the same applies to the other pixel columns.

Furthermore, in FIG. 14, four pixels 51 arranged in one pixel column are distinguished from each other as pixels 51A to 51D, and four vertical signal lines VSL disposed in one pixel column are distinguished from each other as vertical signal lines VSL0 to VSL3.

In the first wiring example of FIG. 14, two pixels 51 adjacent in the vertical direction form one pair, the first taps TA of the two pixels 51 to be paired are connected to the same vertical signal line VSL, and the second taps TB of the two pixels 51 to be paired are connected to the same vertical signal line VSL.

Specifically, the first taps TA of the pixel 51A and the pixel 51B to be paired are connected to the vertical signal line VSL0, and the second taps TB of the pixel 51A and the pixel 51B to be paired are connected to the vertical signal line VSL2. The first taps TA of the pixel 51C and the pixel 51D to be paired are connected to the vertical signal line VSL1, and the second taps TB of the pixel 51C and the pixel 51D to be paired are connected to the vertical signal line VSL3.

Therefore, the vertical signal line VSL0 outputs detection signals of the first taps TA of the pixel 51A and the pixel 51B to be paired to the column processing unit 23, and the vertical signal line VSL1 outputs detection signals of the first taps TA of the pixel 51C and the pixel 51D to be paired to the column processing unit 23. The vertical signal line VSL2 outputs detection signals of the second taps TB of the pixel 51A and the pixel 51B to be paired to the column processing unit 23, and the vertical signal line VSL3 outputs detection signals of the second taps TB of the pixel 51C and the pixel 51D to be paired to the column processing unit 23. Therefore, in the four vertical signal lines VSL0 to VSL3, two vertical signal lines (vertical signal lines VSL0 and VSL1) that each transmit a detection signal of the first tap TA and two vertical signal lines (vertical signal line VSL2 and VSL3) that each transmit a detection signal of the second tap TB are disposed adjacent to each other (TA, TA, TB, TB).

By disposing the four vertical signal lines VSL0 to VSL3 in one pixel column, in a first drive mode in which a detection signal of each pixel 51 is output in units of one pixel, the light receiving device 1 can output a detection signal to the outside of the pixel array unit 20 (column processing unit 23) in units of two rows of odd rows or even rows. Therefore, a reading speed can be increased.

Meanwhile, in a second drive mode in which detection signals of two taps T are added up and output, the light receiving device 1 can add up detection signals of the first taps TA or the second taps TB of two pixels to be paired and output the detection signals to the outside of the pixel array unit 20 in units of four rows. In order to improve resolution, even in a case where the number of pixels increases and the signal amount per pixel is small, a sufficient S/N ratio can be ensured by adding up detection signals of two pixels.

(Second Wiring Example of Vertical Signal Line VSL)

Figure 15:
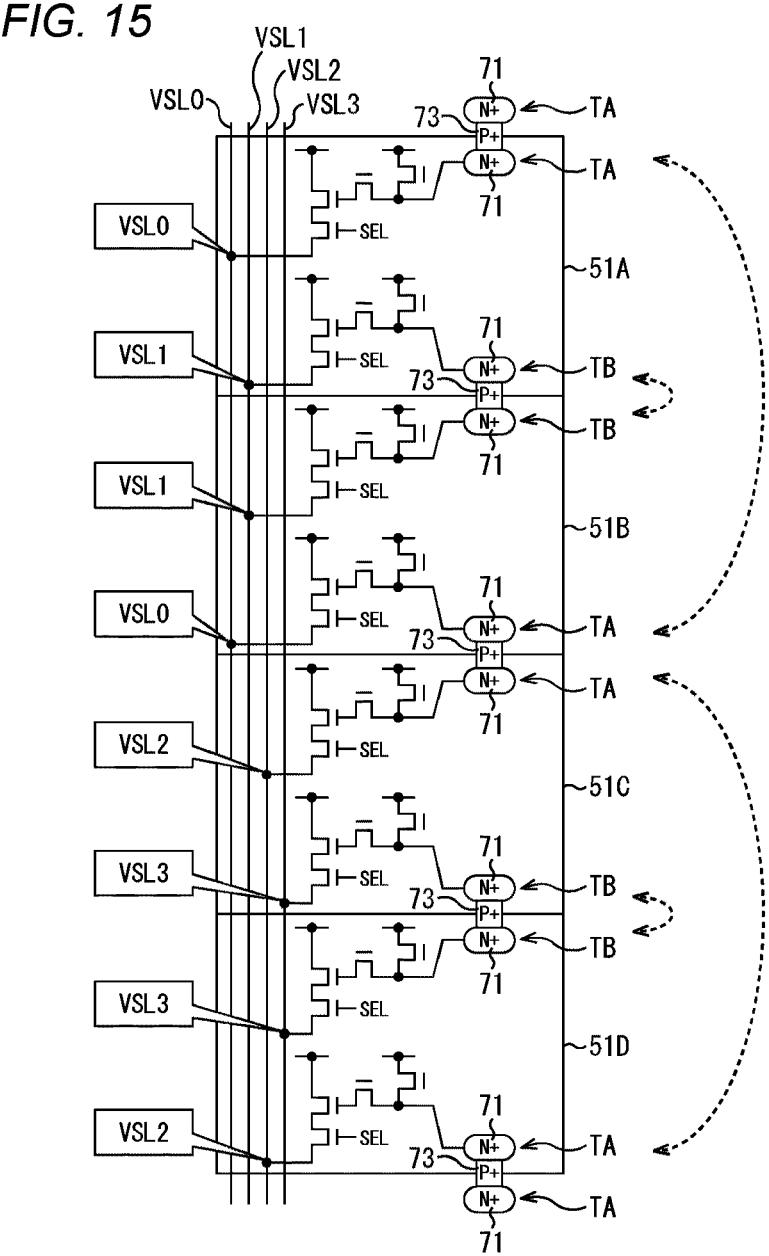
FIG. 15 is a diagram illustrating a second wiring example of the vertical signal line.

FIG. 15 illustrates a second wiring example of the vertical signal line VSL.

In FIG. 15, description of points similar to those of the first wiring example illustrated in FIG. 14 will be appropriately omitted, and points different from the first wiring example will be described.

The second wiring example of FIG. 15 is common to the first wiring example in that first taps TA of two pixels 51 to be paired are connected to the same vertical signal line VSL, and second taps TB of the two pixels 51 to be paired are connected to the same vertical signal line VSL.

However, the second wiring example of FIG. 15 is the same as the first wiring example illustrated in FIG. 14 in that the first taps TA of the pixel 51A and the pixel 51B to be paired are connected to the vertical signal line VSL0, but the second taps TB are connected not to the vertical signal line VSL2 but to the vertical signal line VSL1 in the second wiring example.

The second wiring example of FIG. 15 is the same as the first wiring example in that the second taps TB of the pixel 51C and the pixel 51D to be paired are connected to the vertical signal line VSL3, but the first taps TA are connected not to the vertical signal line VSL1 but to the vertical signal line VSL2 in the second wiring example.

Therefore, in the second wiring example, the vertical signal line VSL0 outputs detection signals of the first taps TA of the pixel 51A and the pixel 51B to be paired, and the vertical signal line VSL1 outputs detection signals of the second taps TB of the pixel 51A and the pixel 51B to be paired to the column processing unit 23. The vertical signal line VSL2 outputs detection signals of the first taps TA of the pixel 51C and the pixel 51D to be paired, and the vertical signal line VSL3 outputs detection signals of the second taps TB of the pixel 51C and the pixel 51D to be paired. Therefore, in the four vertical signal lines VSL0 to VSL3, a vertical signal line VSL that transmits a detection signal of the first tap TA and a vertical signal line VSL that transmits a detection signal of the second tap TB are disposed alternately (TA, TB, TA, TB).

Driving in the first drive mode and driving in the second drive mode in the second wiring example are similar to those in the first wiring example. Therefore, in the first drive mode, a reading speed can be increased. In the second drive mode, even in a case where the signal amount per pixel is small, a sufficient S/N ratio can be ensured by adding up detection signals of two pixels.

In the first wiring example of FIG. 14 and the second wiring example of FIG. 15, in the second drive mode in which detection signals of two taps T are added up and output, the two taps T whose detection signals are to be added up are closed within two pixels constituting a pair. Therefore, it is possible to reduce an operation deviation between the first taps TA of two pairs adjacent vertically or between the second taps TB of two pairs adjacent vertically, and to reduce a distortion of a high-speed operation.

Moreover, in the second wiring example of FIG. 15, a vertical signal line VSL that transmits a detection signal of the first tap TA and a vertical signal line VSL that transmits a detection signal of the second tap TB are disposed alternately (TA, TB, TA, TB), and a coupling capacitance between adjacent vertical signal lines VSL can be thereby made uniform to reduce noise.

(Third Wiring Example of Vertical Signal Line VSL)

Figure 16:
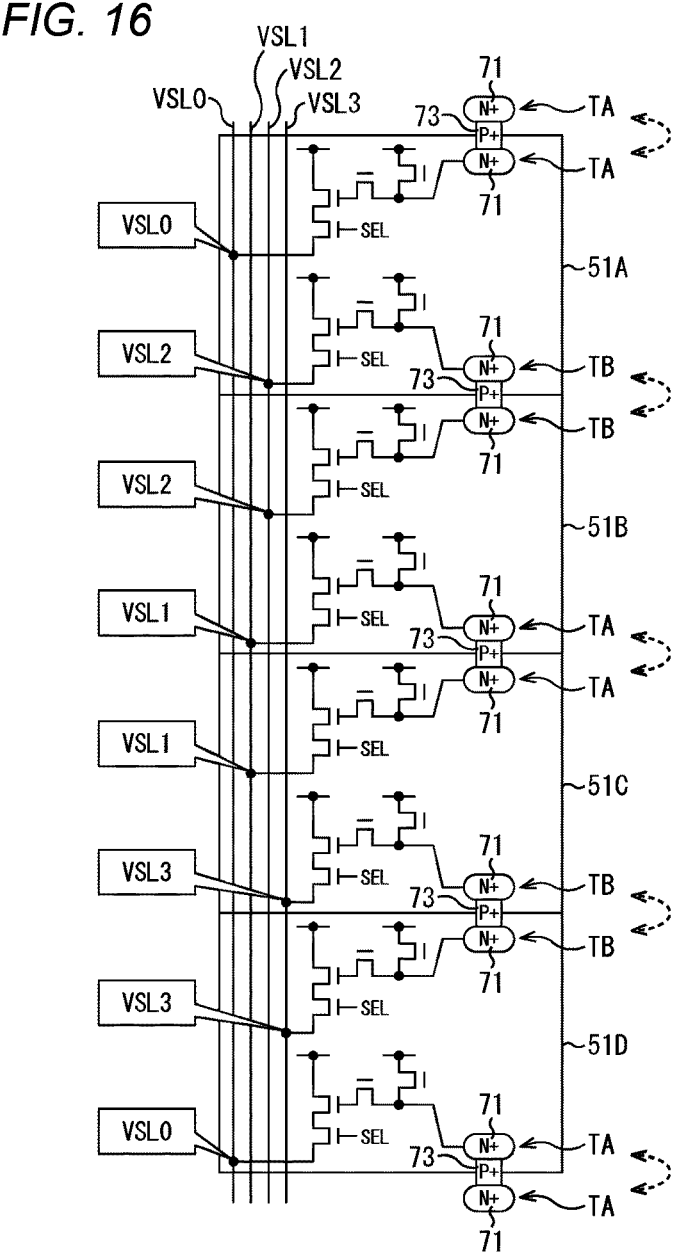
FIG. 16 is a diagram illustrating a third wiring example of the vertical signal line.

FIG. 16 illustrates a third wiring example of the vertical signal line VSL.

In FIG. 16, description of points similar to those of the first wiring example illustrated in FIG. 14 will be appropriately omitted, and points different from the first wiring example will be described.

In the third wiring example of FIG. 16, in the second drive mode in which two detection signals are added up and output, in each of the first tap TA and the second tap TB, two taps T whose detection signals are to be added up share the P+ semiconductor region 73 of the voltage application unit.

For example, the two second taps TB disposed at a pixel boundary between the pixel 51A and the pixel 51B are both connected to the vertical signal line VSL2. Therefore, the two second taps TB are two taps T whose detection signals are to be added up and output in the second drive mode, and share the P+ semiconductor region 73 disposed at the pixel boundary between the pixel 51A and the pixel 51B.

The two first taps TA disposed at a pixel boundary between the pixel 51B and the pixel 51C are both connected to the vertical signal line VSL1. Therefore, the two first taps TA are two taps T whose detection signals are to be added up and output in the second drive mode, and share the P+ semiconductor region 73 disposed at the pixel boundary between the pixel 51B and the pixel 51C.

The two second taps TB disposed at a pixel boundary between the pixel 51C and the pixel 51D are both connected to the vertical signal line VSL3. Therefore, the two second taps TB are two taps T whose detection signals are to be added up and output in the second drive mode, and share the P+ semiconductor region 73 disposed at the pixel boundary between the pixel 51C and the pixel 51D.

On the other hand, in the first wiring example illustrated in FIG. 14, in the second drive mode, the two second taps TB share the P+ semiconductor region 73 of the voltage application unit as in the third wiring example, but for the first taps TA whose detection signals of two taps T are to be added up, do not share the P+ semiconductor region 73 of the voltage application unit.

For example, in the pair of the pixel 51A and the pixel 51B in FIG. 14, for the second tap TB, the second tap TB of the pixel 51A and the second tap TB of the pixel 51B, whose detection signals are to be added up, share the P+ semiconductor region 73 disposed at a pixel boundary between the pixel 51A and the pixel 51B, but for the first tap TA, the first tap TA of the pixel 51A and the first tap TA of the pixel 51B, whose detection signals are to be added up, do not share the P+ semiconductor region 73. In other words, the P+ semiconductor region 73 of the first tap TA of the pixel 51A and the P+ semiconductor region 73 of the first tap TA of the pixel 51B are different P+ semiconductor regions 73.

Furthermore, in the third wiring example of FIG. 16, two first taps TA having a shared tap structure disposed at a pixel boundary between the pixel 51A and a pixel 51 (not illustrated) thereon are both connected to the vertical signal line VSL0. Two second taps TB having a shared tap structure disposed at a pixel boundary between the pixel 51A and the pixel 51B are both connected to the vertical signal line VSL2. Two first taps TA having a shared tap structure disposed at a pixel boundary between the pixel 51B and the pixel 51C are both connected to the vertical signal line VSL1. Two second taps TB having a shared tap structure disposed at a pixel boundary between the pixel 51C and the pixel 51D are both connected to the vertical signal line VSL3. Therefore, in the four vertical signal lines VSL0 to VSL3, two vertical signal lines (vertical signal lines VSL0 and VSL1) that each transmit a detection signal of the first tap TA and two vertical signal lines (vertical signal line VSL2 and VSL3) that each transmit a detection signal of the second tap TB are disposed adjacent to each other (TA, TA, TB, TB).

In the first drive mode in which a detection signal of each pixel 51 is output in units of one pixel, the light receiving device 1 outputs a detection signal to the outside of the pixel array unit 20 (column processing unit 23) in units of two rows of odd rows or even rows. Therefore, a reading speed can be increased.

Meanwhile, in the second drive mode in which detection signals of two taps T are added up and output, the light receiving device 1 adds up detection signals of two first taps TA or two second taps TB corresponding to two pixels and outputs the detection signals to the outside of the pixel array unit 20 in units of four rows. Even in a case where the signal amount per pixel is small, a sufficient S/N ratio can be ensured.

According to the third wiring example, in the second drive mode, since the P+ semiconductor region 73 as the voltage application unit of the two taps T whose detection signals are added up and output is shared, it is possible to suppress variations in applied voltages applied to the two taps T whose detection signals are added up and output.

(Fourth Wiring Example of Vertical Signal Line VSL)

Figure 17:
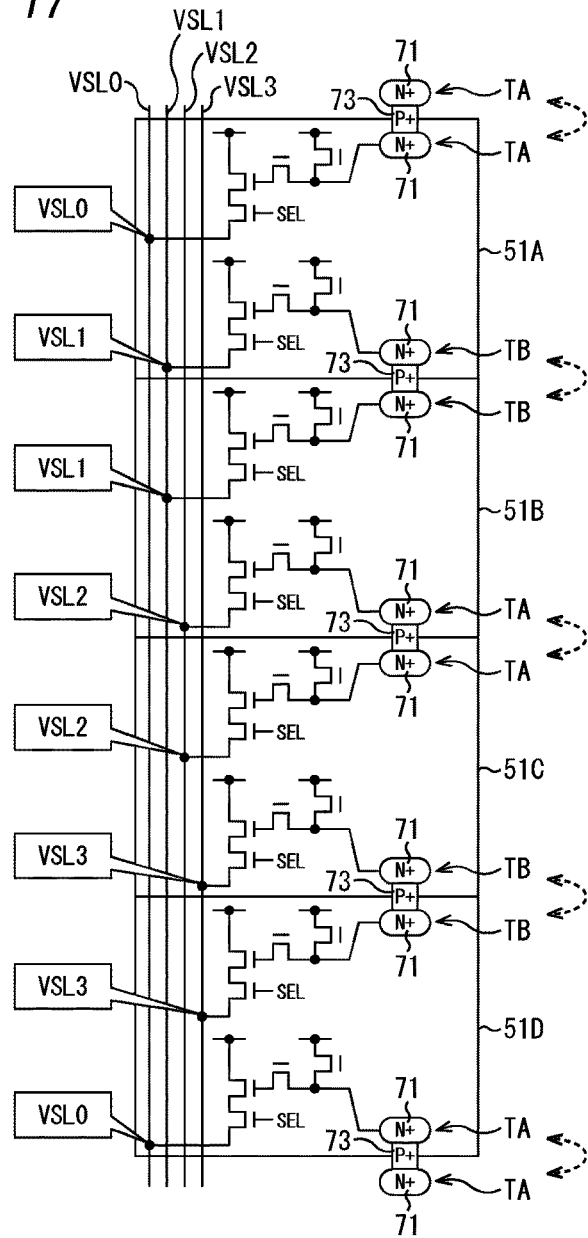
FIG. 17 is a diagram illustrating a fourth wiring example of the vertical signal line.

FIG. 17 illustrates a fourth wiring example of the vertical signal line VSL.

In FIG. 17, description of points similar to those of the first to third wiring examples described above will be appropriately omitted, and points different from the first to third wiring examples will be described.

Unlike the second wiring example illustrated in FIG. 15, the fourth wiring example of FIG. 17 has a configuration in which in the second drive mode in which two detection signals are added up and output, two taps T whose detection signals are to be added up share the P+ semiconductor region 73 as the voltage application unit.

In other words, the fourth wiring example of FIG. 17 is common to the third wiring example of FIG. 16 in that in the second drive mode in which two detection signals are added up and output, in each of the first tap TA and the second tap TB, two taps T whose detection signals are to be added up share the P+ semiconductor region 73 as the voltage application unit.

Meanwhile, in the third wiring example of FIG. 16, the two second taps TB disposed at a pixel boundary between the pixel 51A and the pixel 51B are connected to the vertical signal line VSL2, but in the fourth wiring example of FIG. 17, the two second taps TB are connected to the vertical signal line VSL1. Furthermore, in the third wiring example, the two first taps TA disposed at a pixel boundary between the pixel 51B and the pixel 51C are connected to the vertical signal line VSL1, but in the fourth wiring example of FIG. 17, the two first taps TA are connected to the vertical signal line VSL2. Therefore, in the four vertical signal lines VSL0 to VSL3, as in the second wiring example illustrated in FIG. 15, a vertical signal line VSL that transmits a detection signal of the first tap TA and a vertical signal line VSL that transmits a detection signal of the second tap TB are disposed alternately (TA, TB, TA, TB).

In the first drive mode in which a detection signal of each pixel 51 is output in units of one pixel, the light receiving device 1 outputs a detection signal to the outside of the pixel array unit 20 (column processing unit 23) in units of two rows of odd rows or even rows. Therefore, a reading speed can be increased.

Meanwhile, in the second drive mode in which detection signals of two taps T are added up and output, the light receiving device 1 adds up detection signals of two first taps TA or two second taps TB corresponding to two pixels and outputs the detection signals to the outside of the pixel array unit 20 in units of four rows. Even in a case where the signal amount per pixel is small, a sufficient S/N ratio can be ensured.

According to the fourth wiring example, in the second drive mode, since the P+ semiconductor region 73 as the voltage application unit of the two taps T whose detection signals are added up and output is shared, it is possible to suppress variations in applied voltages applied to the two taps T whose detection signals are added up and output.

According to the first to fourth wiring examples in which four vertical signal lines VSL are disposed for one pixel column, it is possible to use a drive mode (first drive mode) in which resolution is improved with a signal output as a pixel unit and a drive mode (second drive mode) in which an S/N ratio of a signal is improved rather than the resolution in various ways depending on applications and the like. In other words, it is possible to suppress a decrease in distance measurement accuracy due to an increase in the number of pixels while increasing the number of pixels.

<7. Example of Planar Arrangement of Five Layers of Metal Films M1 to M5>

Next, a detailed configuration of the multilayer wiring layer 111 formed on a side of the substrate 61 opposite to the light incident surface side will be described with reference to FIGS. 18 to 23.

Note that the configurations illustrated in FIGS. 18 to 23 correspond to the configurations described with reference to FIGS. 5 and 6, but will be described with different reference numerals as configurations of different modes.

Figure 18:
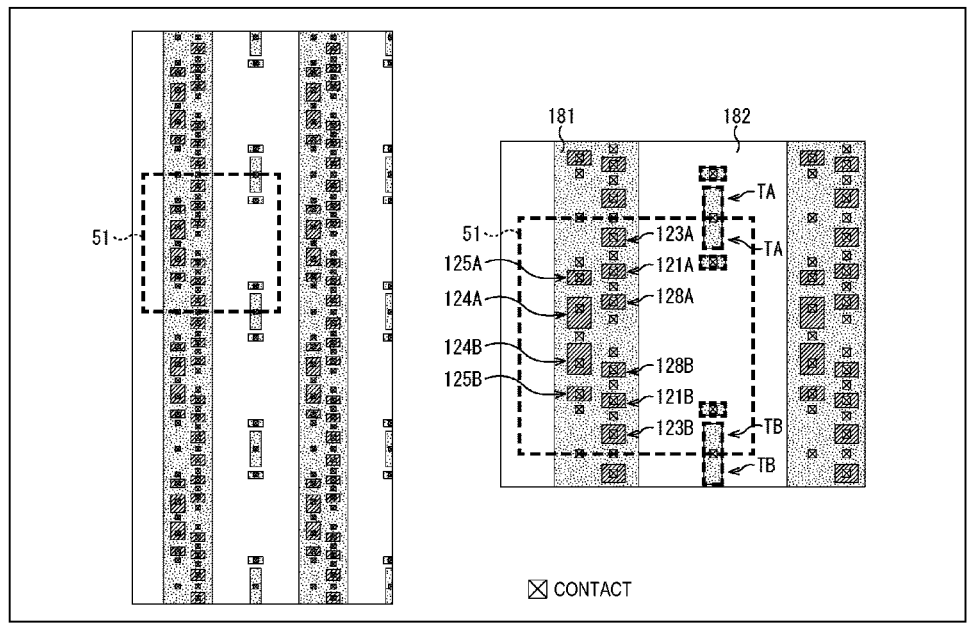
FIG. 18 is a plan view of a gate formation surface between a multilayer wiring layer and a substrate.

FIG. 18 is a plan view of a gate formation surface on which a gate electrode and a contact of a pixel transistor Tr, which is an interface between the substrate 61 and the multilayer wiring layer 111, are formed.

The plan view on the left side of FIG. 18 is a plan view including regions of a plurality of pixels arranged in the vertical direction in the pixel array unit 20, and a region of one predetermined pixel 51 is indicated by a broken line. The plan view on the right side of FIG. 18 is an enlarged view of a region near the pixel 51 indicated by a broken line in the plan view on the left side. In the enlarged view, the regions of the first tap TA and the second tap TB are indicated by broken lines.

The gate formation surface of the substrate 61 includes an active region 181 in which a gate electrode of the pixel transistor Tr, a contact with the P+ semiconductor region 73 as a voltage application unit, a contact with the N+ semiconductor region 71 as a charge detection unit, and the like are formed, and an oxide film region 182 as a region other than the active region 181. The oxide film region 182 corresponds to, for example, the oxide film 64, the isolation portion 75, and the like in FIG. 2. Note that, in FIGS. 19 to 23, the active region 181 is illustrated to be superimposed on a lower layer with reference numerals omitted for reference of a positional relationship.

In the region of one pixel 51, the first tap TA including the N+ semiconductor region 71-1, the P+ semiconductor region 73-1, and the like and the second tap TB including the N+ semiconductor region 71-2, the P+ semiconductor region 73-2, and the like are disposed at a pixel boundary so as to be symmetric with respect to a pixel intermediate line (not illustrated) of the pixel 51 in the vertical direction.

The transfer transistor 121A, the reset transistor 123A, the amplification transistor 124A, the selection transistor 125A, and the switching transistor 128A, which are pixel transistors Tr that control the first tap TA, and the transfer transistor 121B, the reset transistor 123B, the amplification transistor 124B, the selection transistor 125B, and the switching transistor 128B, which are the pixel transistors Tr that control the second tap TB, are disposed symmetrically with respect to the pixel intermediate line of the pixel 51 in the vertical direction.

By disposing the plurality of pixel transistors Tr that controls the first tap TA or the second tap TB in two columns in the active region 181, the pixel transistors Tr can be disposed with a margin. In particular, a gate electrode of the amplification transistor 124 can be formed with the largest size, and therefore noise characteristics of the amplification transistor 124 can be suppressed.

Figure 19:
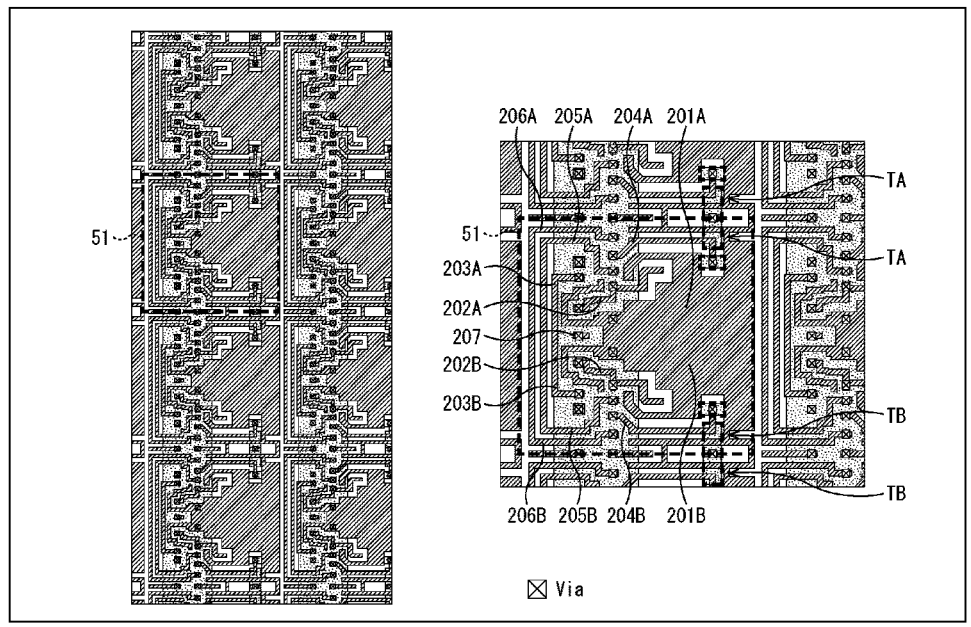
FIG. 19 is a diagram illustrating a planar arrangement example of a metal film M1 which is a first layer of the multilayer wiring layer.

FIG. 19 illustrates a planar arrangement example of the metal film M1 which is the first layer closest to the substrate 61 among the five layers of metal films M1 to M5 of the multilayer wiring layer 111.

A relationship between the left plan view and the right plan view of FIG. 19 is similar to that of FIG. 18.

In the metal film M1 which is the first layer of the multilayer wiring layer 111, metal films 201A and 201B as reflecting members 115 (FIG. 5) that reflect infrared light are formed between the first tap TA and the second tap TB of the pixel 51. Although a boundary between the metal films 201A and 201B is not illustrated, the metal films 201A and 201B are formed symmetrically with respect to the vertical direction of the pixel 51 in the region of the pixel 51. As illustrated in FIG. 19, in the region of the pixel 51, the regions of the metal films 201A and 201B are formed to be the largest. By reflecting infrared light that has passed through the substrate 61 and is incident on the multilayer wiring layer 111 again to the substrate 61, the amount of infrared light to be photoelectrically converted in the substrate 61 can be further increased to improve sensitivity.

Note that the potential of each of the metal films 201A and 201B is a predetermined VSS potential, and is, for example, GND in the present embodiment.

The metal film 202A is a wire that connects a gate electrode of the amplification transistor 124A and the FD 122A (FIG. 20) to each other. The metal film 202B is a wire that connects a gate electrode of the amplification transistor 124B and the FD 122B (FIG. 20) to each other. The metal film 202A and the metal film 202B are also disposed symmetrically with respect to the pixel intermediate line of the pixel 51 in the vertical direction.

The metal films 203A and 203B are wires connected to the selection transistors 125A and 125B. The metal film 204A is a wire connected to the N+ semiconductor region 71-1 as a charge detection unit of the first tap TA of the pixel 51, and the metal film 204B is a wire connected to the N+ semiconductor region 71-2 as a charge detection unit of the second tap TB of the pixel 51.

The metal films 205A and 205B are wires connected to the transfer transistors 121A and 121B. The metal films 206A and 206B are wires connected to the reset transistors 123A and 123B.

The metal films 203A to 206A related to the first tap TA and the metal films 203B to 206B related to the second tap TB are disposed symmetrically with respect to the pixel intermediate line of the pixel 51 in the vertical direction. A power supply voltage VDD is supplied to a contact 207 located at a pixel intermediate portion of the pixel 51 in the vertical direction.

The metal film 201A as a shield wire is disposed between the metal film 202A that connects a gate electrode of the amplification transistor 124A and the FD 122A (FIG. 20) to each other and the contact 207 to which the power supply voltage VDD is supplied. Therefore, the influence amount of the potential of the FD 122A on a potential fluctuation of the power supply voltage VDD is reduced, and noise is suppressed.

The metal film 201A as a shield wire is also disposed between the metal film 202A that connects a gate electrode of the amplification transistor 124A and the FD 122A (FIG. 20) to each other and the metal film 203A as a wire connected to the selection transistor 125A. Therefore, the influence amount of the potential of the FD 122A on a potential fluctuation of the selection transistor 125A is reduced, and noise is suppressed.

The metal film 201A as a shield wire is also disposed between the metal film 202A that connects a gate electrode of the amplification transistor 124A and the FD 122A (FIG. 20) to each other and the metal film 204A which is a wire connected to the N+ semiconductor region 71-1 as a charge detection unit of the first tap TA. Therefore, the influence amount of the potential of the FD 122A on a potential fluctuation of the charge detection unit of the first tap TA is reduced, and noise is suppressed.

The same applies to the metal films 201B to 206B related to the second tap TB, disposed symmetrically with respect to the pixel intermediate line of the pixel 51 in the vertical direction.

Since the pixel transistor Tr that drives the first tap TA and the pixel transistor Tr that drives the second tap TB in the pixel are symmetrically disposed in the vertical direction, a wiring load is uniformly adjusted between the first tap TA and the second tap TB. This reduces drive variations of the first tap TA and the second tap TB.

Figure 20:
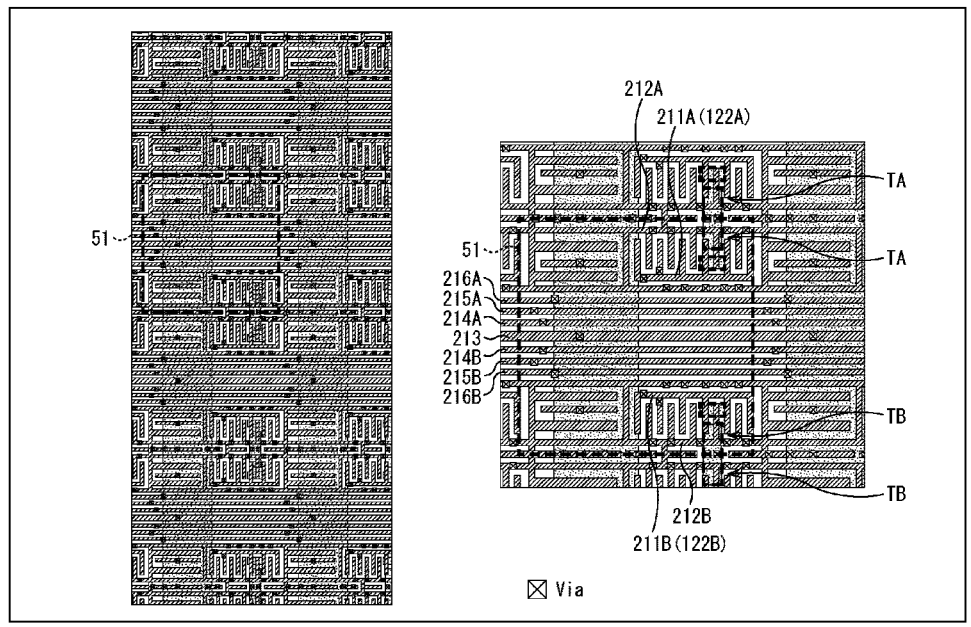
FIG. 20 is a diagram illustrating a planar arrangement example of a metal film M2 which is a second layer of the multilayer wiring layer.

FIG. 20 illustrates a planar arrangement example of the metal film M2 which is the second layer among the five layers of metal films M1 to M5 of the multilayer wiring layer 111.

A relationship between the left plan view and the right plan view of FIG. 20 is similar to that of FIG. 18.

In the metal film M2 which is the second layer of the multilayer wiring layer 111, the FD 122A of the pixel 51 is constituted by a comb-shaped metal film 211A. A metal film 212A of GND (VSS potential) is formed in a comb shape so as to be inserted into a comb-shaped gap of the metal film 211A as the FD 122A. Each of the metal film 212A as the FD 122A and the metal film 212A of GND (VSS potential) is formed in a comb shape, and a large opposing region is ensured. As a result, it is possible to increase a storage capacity of the FD 122A and to widen a dynamic range. Furthermore, the metal film 212A of GND is disposed around the metal film 211A as the FD 122A so as to surround the metal film 211A, the influence amount of other potential changes on the potential of the FD 122A is reduced, and noise is suppressed.

In the metal film M2, the FD 122B of the pixel 51 is formed at a position symmetrical to the FD 122A with respect to the pixel intermediate line of the pixel 51 in the vertical direction. The FD 122B is also constituted by a comb-shaped metal film 211B, and a comb-shaped metal film 212B of GND (VSS potential) is formed so as to face the comb-shaped metal film 211B. The metal film 212B of GND (VSS potential) is disposed around the metal film 211B as the FD 122B so as to surround the metal film 211B, and noise is thereby suppressed.

In the metal film M2, the FDs 122A and 122B are disposed in a region not overlapping the formation region of the pixel transistor Tr in FIGS. 18 and 19. Therefore, potential fluctuation received from the metal film (wire) connected to the pixel transistor Tr is reduced, and noise is suppressed. Note that the FDs 122A and 122B may overlap a part of the formation region of the pixel transistor Tr in FIGS. 18 and 19.

The metal film 211A as the FD 122A is connected to the metal film M1 by two or more vias. The metal film 211B as the FD 122B is also connected to the metal film M1 by two or more vias.

Therefore, an influence of resistance change due to process variations is reduced, and noise is reduced.

The metal film 213 disposed at an intermediate position of the pixel 51 in the vertical direction is a wire that supplies a power supply voltage VDD. Metal films 214A and 214B disposed above and below the metal film 213 are wires that transmit a drive signal TRG supplied to the transfer transistors 121A and 121B. Metal films 215A and 215B disposed outside the metal films 214A and 214B are wires that transmit a drive signal RST supplied to the reset transistors 123A and 123B. Metal films 216A and 216B disposed outside the metal films 215A and 215B are wires that transmit a selection signal SEL supplied to the selection transistors 125A and 125B.

Wires that transmit control signals of the plurality of pixel transistors Tr that controls the first tap TA or the second tap TB are disposed symmetrically with respect to the pixel intermediate line of the pixel 51 in the vertical direction, and drive variations of the first tap TA and the second tap TB are thereby reduced.

Figure 21:
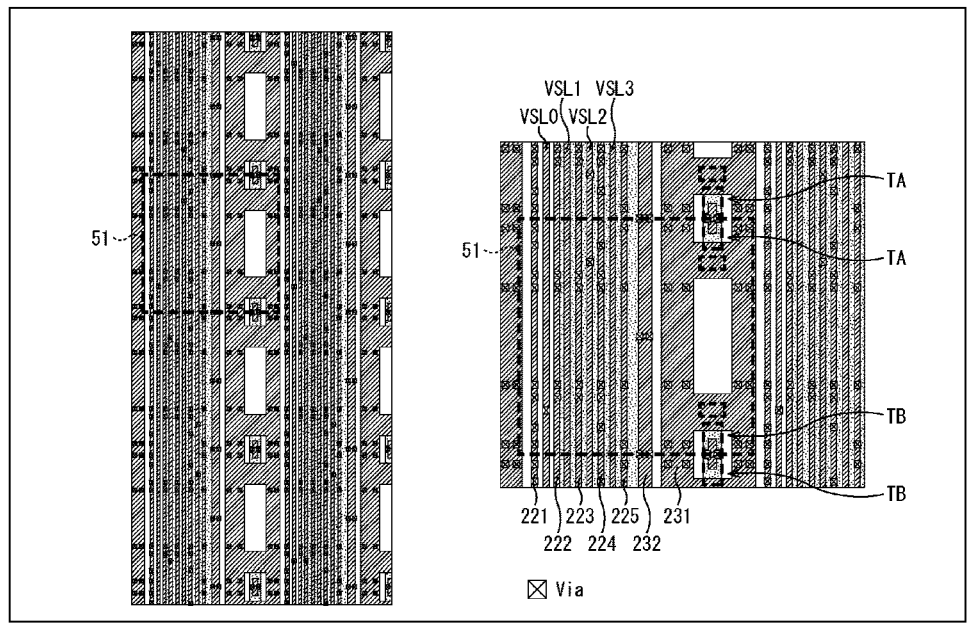
FIG. 21 is a diagram illustrating a planar arrangement example of a metal film M3 which is a third layer of the multilayer wiring layer.

FIG. 21 illustrates a planar arrangement example of the metal film M3 which is the third layer among the five layers of metal films M1 to M5 of the multilayer wiring layer 111.

A relationship between the left plan view and the right plan view of FIG. 21 is similar to that of FIG. 18.

The vertical signal lines VSL0 to VSL3 are disposed in the metal film M3 which is the third layer. Any of the wires 221 to 225 are disposed on both sides of each of the vertical signal lines VSL0 to VSL3, and each of the wires 221 to 225 is connected to GND (VSS potential). By disposing any one of the wires 221 to 225 connected to GND between any two of the vertical signal lines VSL0 to VSL3, potential fluctuation from an adjacent vertical signal line VSL is reduced, and noise is suppressed. Note that, in a case where the potentials of two adjacent vertical signal lines VSL among the vertical signal lines VSL0 to VSL3 are the same potential, a GND wire (any one of the wires 221 to 225) therebetween may be omitted.

The region where the vertical signal lines VSL0 to VSL3 are disposed is a region where the position thereof in a planar direction in the pixel 51 does not overlap the FDs 122A and 122B of the metal film M2. Therefore, a potential fluctuation of the FDs 122A and 122B received from the vertical signal lines VSL0 to VSL3 is reduced, and noise is suppressed.

In a region of the metal film M3 corresponding to the positions of the metal films 211A and 211B as the FDs 122A and 122B of the metal film M2, a wire 231 connected to GND (VSS potential) is disposed. Therefore, by disposing the metal films 211A and 211B as the FDs 122A and 122B of the metal film M2 and a GND wire of the metal film M3 so as to face each other also in a stacking direction, the capacitance of the FD 122 is increased, a potential fluctuation is reduced, and noise is suppressed.

Figure 22:
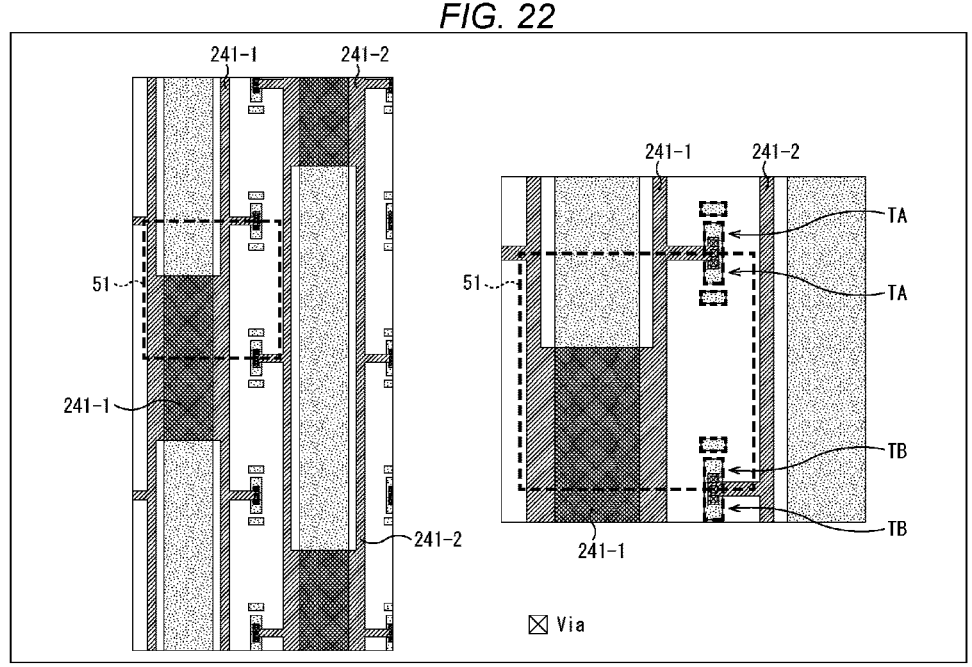
FIG. 22 is a diagram illustrating a planar arrangement example of a metal film M4 which is a fourth layer of the multilayer wiring layer.

FIG. 22 illustrates a planar arrangement example of the metal film M4 which is the fourth layer among the five layers of metal films M1 to M5 of the multilayer wiring layer 111.

A relationship between the left plan view and the right plan view of FIG. 22 is similar to that of FIG. 18.

In the metal film M4 which is the fourth layer of the multilayer wiring layer 111, voltage supply lines 241-1 and 241-2 for applying a predetermined voltage MIX_A or MIX_B to the P+ semiconductor regions 73-1 and 73-2 as voltage application units of the tap T of each pixel 51 are formed. In the example of FIG. 22, the voltage supply line 241-1 is connected to the first tap TA of the pixel 51 indicated by a broken line via a via, and the voltage supply line 241-2 is connected to the second tap TB of the pixel 51 indicated by a broken line via a via. Of the voltage supply lines 241-1 and 241-2 in FIG. 22, a region indicated by a hatched lattice pattern indicates a via region connected to the metal film M5 illustrated in FIG. 23.

The wiring region of the voltage supply lines 241-1 and 241-2 of the metal film M4 extending in the vertical direction is a region that does not overlap the regions of the vertical signal lines VSL0 to VSL3 of the metal film M3 in a planar direction. Therefore, an influence of the voltage MIX_A or MIX_B of the voltage supply lines 241-1 and 241-2 on the potentials of the vertical signal lines VSL0 to VSL3 is suppressed, and noise is suppressed.

Figure 23:
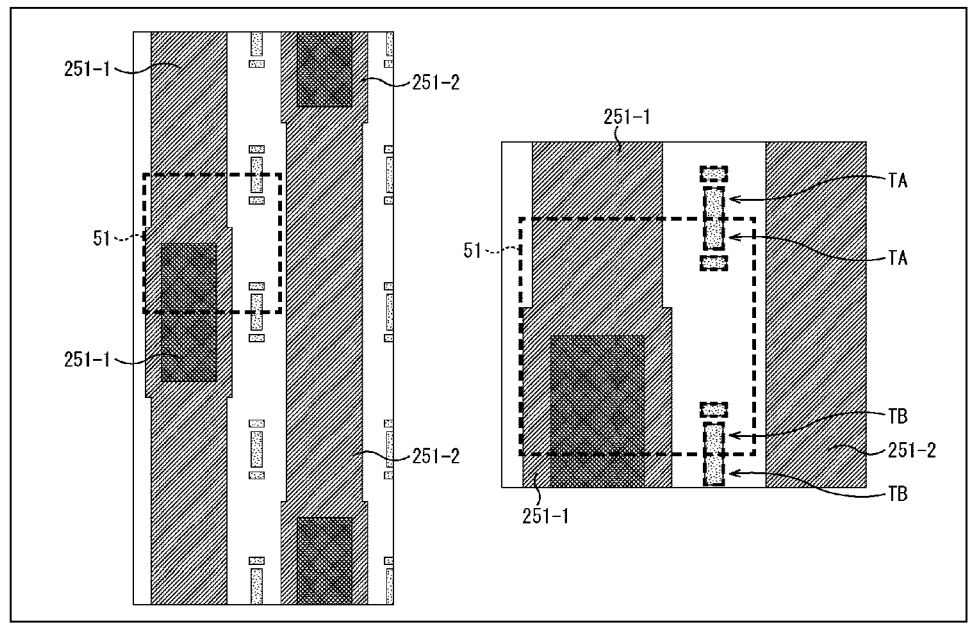
FIG. 23 is a diagram illustrating a planar arrangement example of a metal film M5 which is a fifth layer of the multilayer wiring layer.

FIG. 23 illustrates a planar arrangement example of the metal film M5 which is the fifth layer among the five layers of metal films M1 to M5 of the multilayer wiring layer 111.

A relationship between the left plan view and the right plan view of FIG. 23 is similar to that of FIG. 18.

In the metal film M5 which is the fifth layer of the multilayer wiring layer 111, voltage supply lines 251-1 and 251-2 for applying a predetermined voltage MIX_A or MIX_B to the P+ semiconductor regions 73-1 and 73-2 as voltage application units of the tap T of each pixel 51 are formed. In the example of FIG. 23, the voltage supply line 251-1 is a wire connected to the first tap TA similarly to the voltage supply line 241-1 of the metal film M4, and the voltage supply line 251-2 is a wire connected to the second tap TB.

However, the voltage supply line 251-1 of the metal film M5 is not directly connected to the first tap TA, and applies the predetermined voltage MIX_A to the first tap TA via the voltage supply line 241-1 of the metal film M4. In the voltage supply line 251-1 of the metal film M5 in FIG. 23, the region indicated by a hatched lattice pattern indicates a via region in which the voltage supply line 241-1 and the voltage supply line 251-1 are connected to each other in a stacking direction.

Similarly, the voltage supply line 251-2 of the metal film M5 is not directly connected to the second tap TB, and applies the predetermined voltage MIX_B to the second tap TB via the voltage supply line 241-2 of the metal film M4. In the voltage supply line 251-2 of the metal film M5 in FIG. 23, the region indicated by a hatched lattice pattern indicates a via region in which the voltage supply line 241-2 and the voltage supply line 251-2 are connected to each other in a stacking direction.

As can be seen with reference to the metal film M4 of FIG. 22 and the metal film M5 of FIG. 23, the position of the via region between the voltage supply lines 241-1 and 251-1 and the position of the via region between the voltage supply lines 241-2 and 251-2 are shifted from each other in the vertical direction. Therefore, the via region between the voltage supply lines 241-1 and 251-1 and the via region between the voltage supply lines 241-2 and 251-2 in a planar direction can be separated from each other as much as possible. Therefore, a via can be easily formed, and a manufacturing process can be stabilized.

Two layers of the voltage supply line 241 of the metal film M4 as the fourth layer and the voltage supply line 251 of the metal film M5 as the fifth layer are wired in the vertical direction of the pixel array unit 20, and the predetermined voltage MIX_A or MIX_B applied to the tap T of each pixel 51 in the vertical direction is transmitted through the two layers. As a result, wiring resistance in the vertical direction is reduced, and propagation delay is reduced. Therefore, in-plane characteristic variations of the pixel array unit 20 can be suppressed.

<8. Configuration Example of Pixel Isolation Portion>

In FIGS. 4 to 6, the structure has been described in which the DTI 65 is disposed as the pixel isolation portion in the pixel 51 adopting the tap structure (non-shared tap structure) not sharing the P+ semiconductor region 73 as a voltage application unit of the tap T.

Next, a structure will be described in which the pixel isolation portion is disposed in the pixel 51 having the tap T of a shared tap structure with reference to FIGS. 24A, 24B, 25, 26A, 26B, 27A, 27B, 28A, 28B, 29A, 29B, 30A, 30B, 31A, 31B, 32A, 32B, 33A, 33B, 34A, 34B, 35A, 35B, 36, 37A, 37B, 38A, 38B, 39, 40A, 40B, 41A, 41B, 42, 43, 44A, 44B, 45, 46A, and 46B.

(First Pixel Isolation Structure)

Figure 24A:
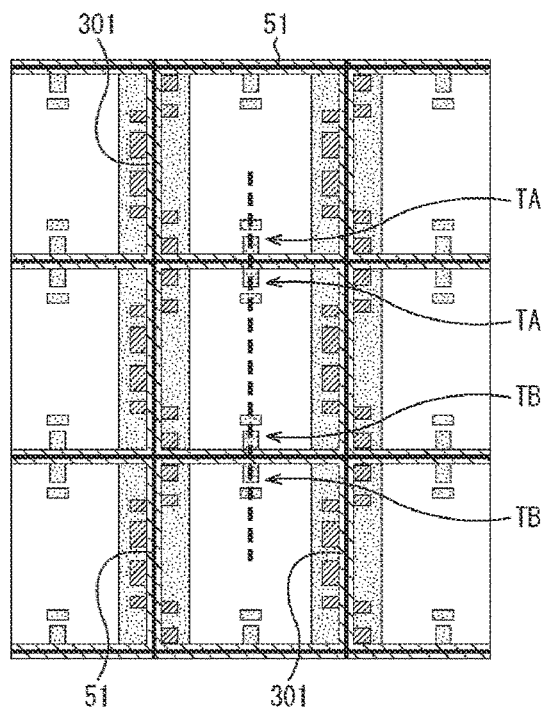
FIGS. 24A and 24B are diagrams illustrating a first pixel isolation structure of a pixel.

FIG. 24A is a plan view illustrating a first pixel isolation structure. Note that, in FIG. 24A, a boundary line between the pixels 51 indicated by a solid line is for describing a border between the adjacent pixels 51, and does not represent any structure. The same applies to FIGS. 25, 26A, 26B, 27A, 27B, 28A, 28B, 29A, 29B, 30A, 30B, 31A, 31B, 32A, and 32B.

Figure 24B:
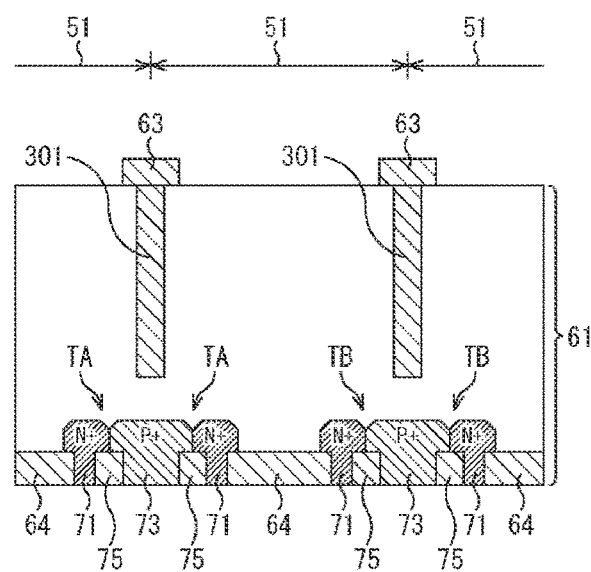

FIG. 24B is a pixel cross-sectional view of a line segment passing through a tap T, corresponding to a broken line portion of FIG. 24A.

In the first pixel isolation structure, as illustrated in FIG. 24A, a DTI 301 is disposed at a boundary portion between the pixels 51. The planar shape of the DTI 301 is a lattice shape, and a lattice pitch is equal to a pixel pitch.

As illustrated in FIG. 24B, the DTI 301 is formed by embedding an insulator (for example, SiO2) in a groove portion (trench) formed by digging the substrate 61 to a predetermined depth from a back surface side which is a light incident surface side of the substrate 61. A material to be embedded in the groove portion of the DTI 301 may be, for example, constituted only by an insulating layer such as SiO2, or may have a double structure in which an outer side (pixel center side) of a metal layer such as tungsten is covered with an insulator. The DTI 301 is disposed so as to overlap at least a part of the P+ semiconductor region 73 as a voltage application unit of a tap T (the first tap TA or the second tap TB) in plan view. Furthermore, the inter-pixel light shielding film 63 is formed on an upper surface of the DTI 301.

By forming the DTI 301 of the first pixel isolation structure, it is possible to suppress occurrence of crosstalk due to incidence of infrared light once incident on a pixel 51 on an adjacent pixel 51. Furthermore, since isolation characteristics of infrared light between pixels can be improved, sensitivity can be improved.

(Second Pixel Isolation Structure)

Figure 25:
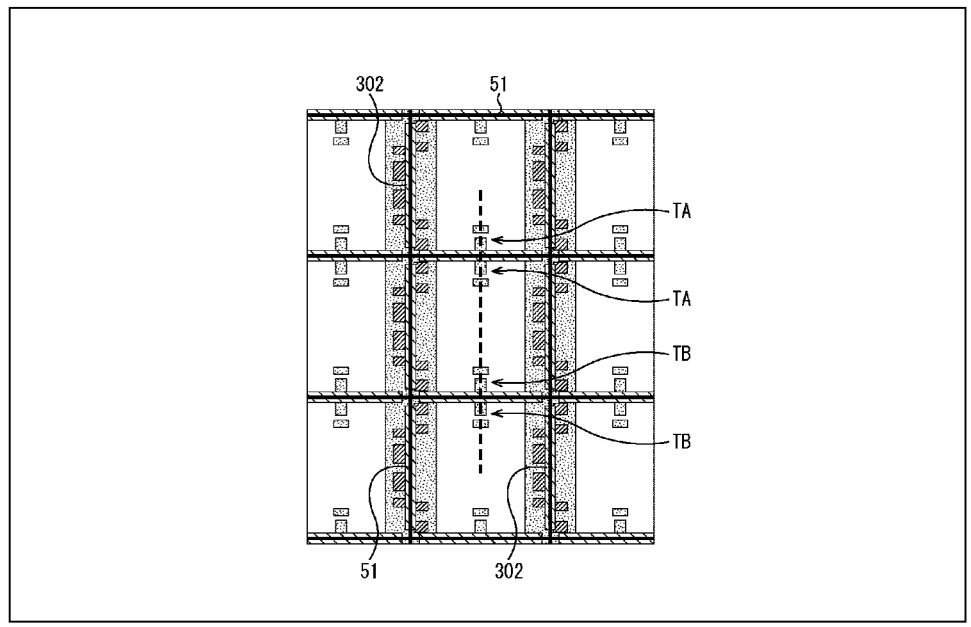
FIG. 25 is a diagram illustrating a second pixel isolation structure of the pixel.

A of FIG. 25 is a plan view illustrating a second pixel isolation structure.

Also in the second pixel isolation structure, as illustrated in FIG. 25, a DTI 302 is disposed in a lattice shape along a pixel boundary between the pixels 51.

A pixel cross-sectional view of a broken line portion in FIG. 25 is the same as the cross-sectional view of the first pixel isolation structure illustrated in FIG. 24B, and therefore is not illustrated.

A difference between the first pixel isolation structure in FIGS. 24A and 24B and the second pixel isolation structure in FIG. 25 is that the DTI 301 is also formed at an intersection where lattices intersect with each other in the first pixel isolation structure, whereas the DTI 302 is not formed at an intersection where lattices intersect with each other in the second pixel isolation structure. A method for forming the DTI 302 and a material embedded in a groove portion are similar to those of the DTI 301.

By forming the DTI 302 of the second pixel isolation structure, it is possible to suppress occurrence of crosstalk due to incidence of infrared light once incident on a pixel 51 on an adjacent pixel 51. Furthermore, since isolation characteristics of infrared light between pixels can be improved, sensitivity can be improved.

Moreover, according to the DTI 302 in which the isolation structure is not formed at a lattice-shaped intersection, it is possible to suppress occurrence of overcurrent due to a large width (width in a planar direction) of the groove portion at the intersection and an excessively large depth of the groove portion when the DTI is formed.

(Third Pixel Isolation Structure)

Figure 26A:
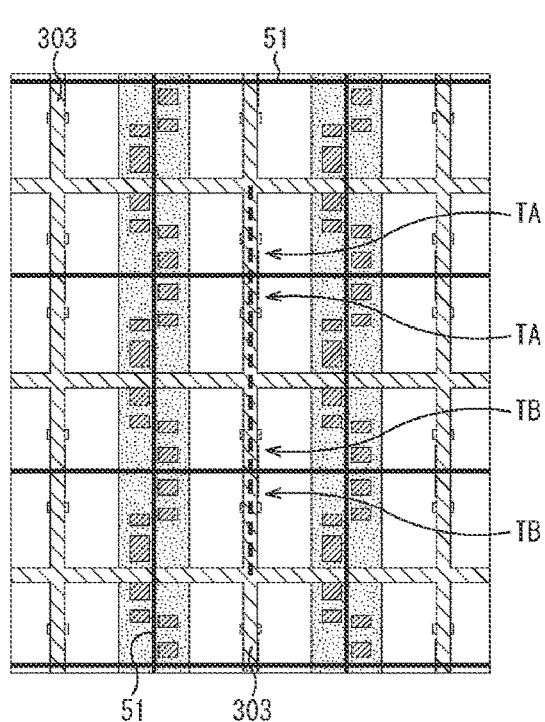
FIGS. 26A and 26B are diagrams illustrating a third pixel isolation structure of the pixel.

FIG. 26A is a plan view illustrating a third pixel isolation structure.

Figure 26B:
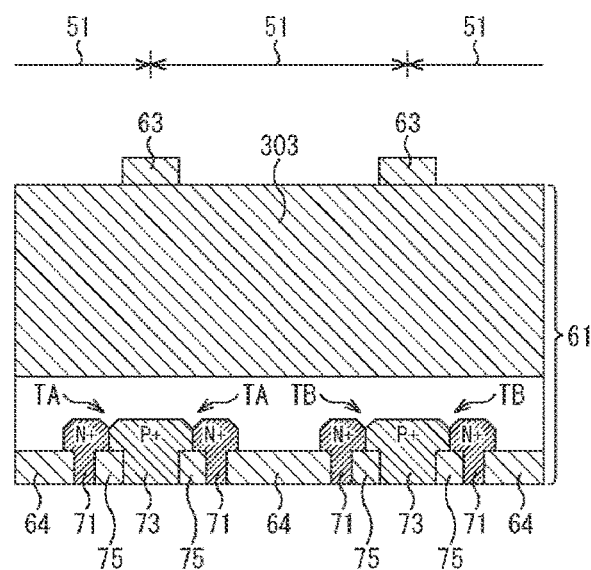

FIG. 26B is a pixel cross-sectional view of a line segment passing through a tap T, corresponding to a broken line portion of FIG. 26A.

As illustrated in FIG. 26A, in the third pixel isolation structure, similarly to the first pixel isolation structure illustrated in FIG. 24A, DTIs 303 are disposed in a lattice shape at an interval equal to a pixel pitch. A difference between the DTI 303 of the third pixel isolation structure and the DTI 301 of the first pixel isolation structure is a position where the DTI 303 is formed.

That is, the position of the DTI 303 of the third pixel isolation structure is shifted by a half pitch of a lattice in the vertical direction and the horizontal direction with respect to the position of the DTI 301 of the first pixel isolation structure. In other words, the DTI 301 of the first pixel isolation structure is formed such that an intersection of the lattices is at the position of a boundary portion between the pixels 51, but the DTI 303 of the third pixel isolation structure is formed such that an intersection of the lattices is at the position of the central portion of a planar region of the pixel 51.

Since the DTI 303 is formed on a line segment connecting the first tap TA and the second tap TB, a pixel cross-sectional view corresponding to a broken line portion in FIG. 26A is illustrated in FIG. 26B.

The on-chip lens 62 is formed such that incident light is condensed on the central portion of the planar region of the pixel 51, in other words, at an intermediate position between the first tap TA and the second tap TB. Therefore, the condensing portion of the incident light is an intersection of the DTIs 303, and diffraction of the incident light by the DTI 303 increases. Therefore, sensitivity can be improved.
(Fourth Pixel Isolation Structure)

Figure 27A:
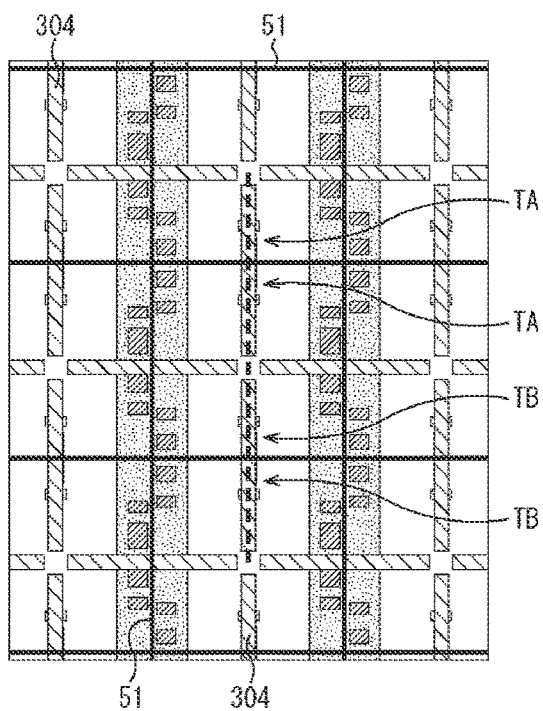
FIGS. 27A and 27B are diagrams illustrating a fourth pixel isolation structure of the pixel.

FIG. 27A is a plan view illustrating a fourth pixel isolation structure.

Figure 27B:
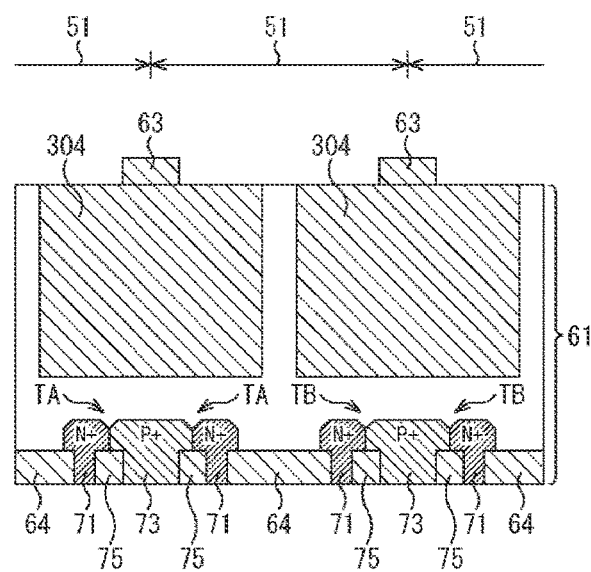

FIG. 27B is a pixel cross-sectional view of a line segment passing through a tap T, corresponding to a broken line portion of FIG. 27A.

In the fourth pixel isolation structure, a DTI 304 is formed. The DTI 304 has a structure in which an intersection of the DTIs 303 of the third pixel isolation structure is not disposed. In other words, the DTI 304 of the fourth pixel isolation structure is common to the third pixel isolation structure in FIGS. 26A and 26B in that an intersection of the lattices is formed at the central portion of the planar region of the pixel 51, and is common to the second pixel isolation structure in FIG. 25 in that an isolation structure is not disposed at the intersection.

According to the fourth pixel isolation structure, similarly to the third pixel isolation structure, since the intersection of the DTI 304 is the central portion of the pixel region, diffraction of incident light by the DTI 304 increases, and sensitivity can be improved.

Furthermore, in the DTI 304, since an isolation structure is not formed at the lattice-shaped intersection, similarly to the second pixel isolation structure, it is possible to suppress occurrence of overcurrent due to formation of an excessively deep groove portion.
(Fifth Pixel Isolation Structure)

Figure 28A:
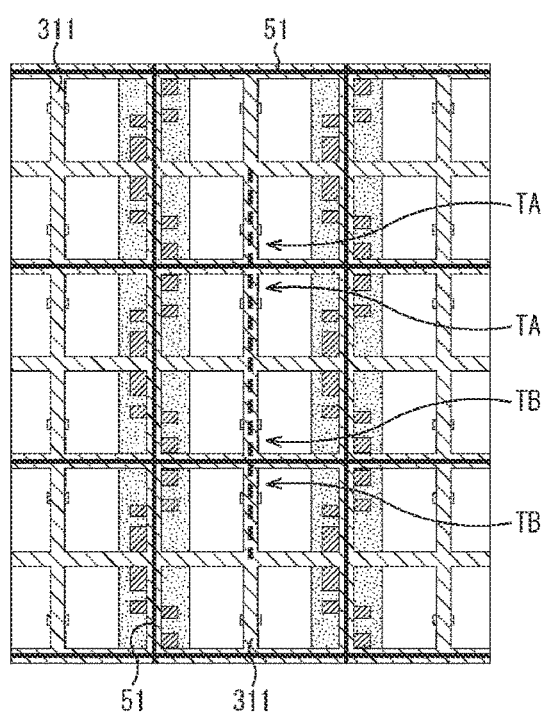
FIGS. 28A and 28B are diagrams illustrating a fifth pixel isolation structure of the pixel.

FIG. 28A is a plan view illustrating a fifth pixel isolation structure.

Figure 28B:
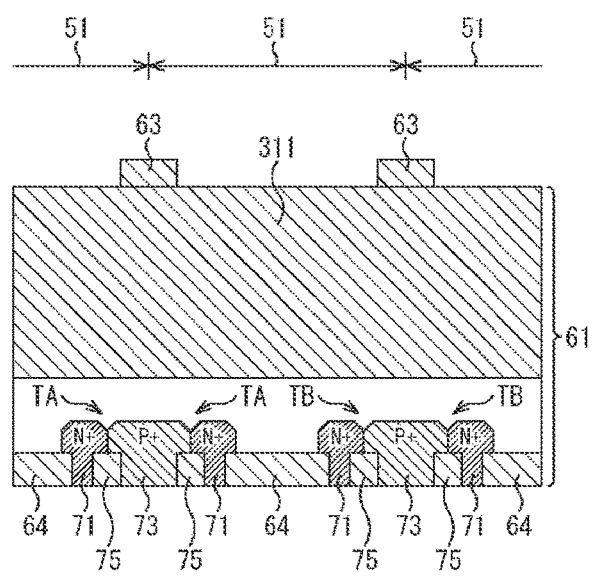

FIG. 28B is a pixel cross-sectional view of a line segment passing through a tap T, corresponding to a broken line portion of FIG. 28A.

In the fifth pixel isolation structure, a DTI 311 is formed. The planar shape of the DTI 311 is a lattice shape, and a lattice pitch is a half (½) of a pixel pitch.

In other words, the DTI 311 of the fifth pixel isolation structure is an isolation structure in which the lattice pitch of the DTI 301 of the first pixel isolation structure illustrated in FIGS. 24A and 24B or the DTI 303 of the third pixel isolation structure illustrated in FIGS. 26A and 26B are changed to a half thereof. Therefore, the DTI 311 is formed at a boundary portion between the pixels 51, and is also formed on a line that divides the rectangular pixel region into two in the vertical direction and the horizontal direction.

A pixel cross-sectional view corresponding to the broken line portion in FIG. 28A is illustrated in FIG. 28B, and is similar to FIG. 26B.

According to the fifth pixel isolation structure, similarly to the first pixel isolation structure, it is possible to suppress occurrence of crosstalk due to incidence of infrared light once incident on a pixel 51 on an adjacent pixel 51. Furthermore, similarly to the third pixel isolation structure, the condensing portion of the incident light is an intersection of the DTIs 311, and diffraction of the incident light by the DTI 311 increases. Therefore, sensitivity can be improved.
(Sixth Pixel Isolation Structure)

Figure 29A:
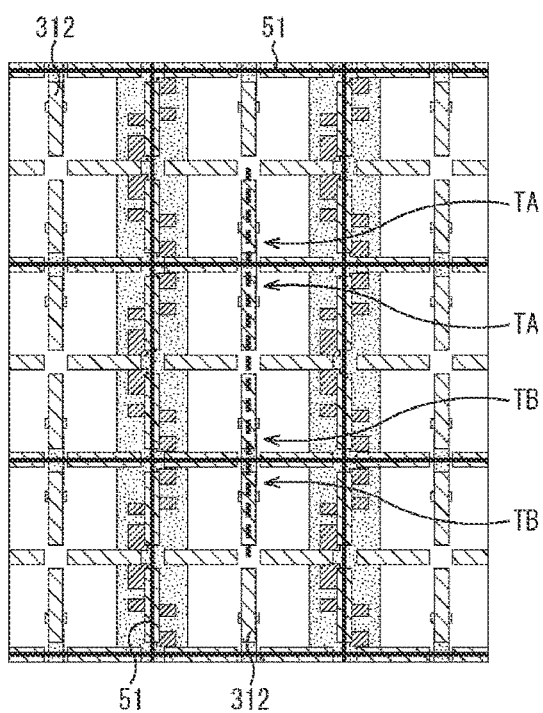
FIGS. 29A and 29B are diagrams illustrating a sixth pixel isolation structure of the pixel.

FIG. 29A is a plan view illustrating a sixth pixel isolation structure.

Figure 29B:
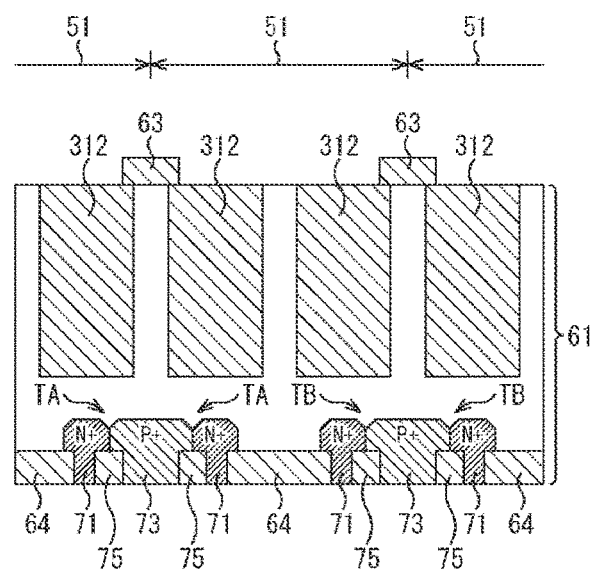

FIG. 29B is a pixel cross-sectional view of a line segment passing through a tap T, corresponding to a broken line portion of FIG. 29A.

In the sixth pixel isolation structure, a DTI 312 is formed. The DTI 312 has a structure in which an intersection of the DTIs 311 of the fifth pixel isolation structure illustrated in FIGS. 28A and 28B are not disposed. Specifically, the planar shape of the DTI 312 is a lattice shape, and a lattice pitch is a half (½) of a pixel pitch. As illustrated in FIG. 29B, the DTI 312 is not disposed at a pixel boundary portion and a pixel central portion corresponding to a lattice-shaped intersection.

According to the sixth pixel isolation structure, similarly to the first pixel isolation structure, it is possible to suppress occurrence of crosstalk due to incidence of infrared light once incident on a pixel 51 on an adjacent pixel 51. Furthermore, similarly to the third pixel isolation structure, the condensing portion of the incident light is an intersection of the DTIs 312, and diffraction of the incident light by the DTI 312 increases. Therefore, sensitivity can be improved. Moreover, since the DTI 312 is not formed at the lattice-shaped intersection, similarly to the second pixel isolation structure, it is possible to suppress occurrence of overcurrent due to formation of an excessively deep groove portion.
(Pixel Structure to which Antireflection Structure is Added)

In the pixel 51 having any one of the first to sixth pixel isolation structures illustrated in FIGS. 24A, 24B, 25, 26A, 26B, 27A, 27B, 28A, 28B, 29A, and 29B, a fine uneven structure can be formed on the light incident surface of the substrate 61.

Figure 30A:
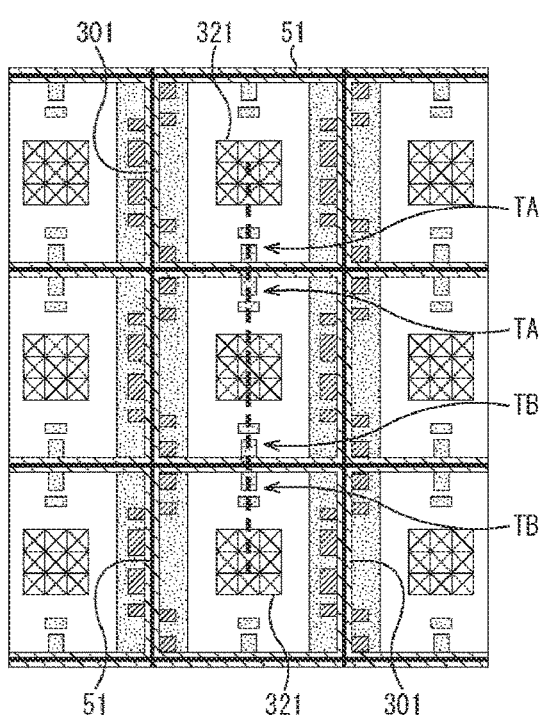
FIGS. 30A and 30B are diagrams illustrating the first pixel isolation structure having an uneven structure.
Figure 30B:
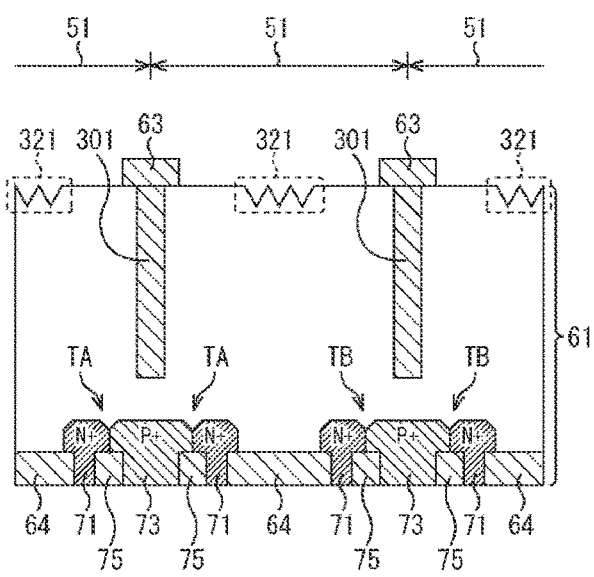

FIGS. 30A and 30B are plan views and a cross-sectional view illustrating a pixel structure in which an uneven structure is formed in the pixel 51 having the first pixel isolation structure illustrated in FIGS. 24A and 24B.

Therefore, FIGS. 30A, 30B, 24A, and 24B are different from each other only in whether or not an uneven portion 321 is formed on the light incident surface of the substrate 61, and are the same as each other in the other portions.

As illustrated in the plan view in FIG. 30A, the uneven portion 321 is formed in a region including the central portion of the pixel region. As illustrated in the cross-sectional view of FIG. 30B, the uneven portion 321 has, for example, an inverse pyramid structure in which a plurality of quadrangular pyramidal regions having apexes on the tap T side is regularly arranged. The bottom surface shape of each quadrangular pyramid is, for example, a square, and each quadrangular pyramidal region is formed by digging the substrate 61 so as to protrude toward the tap T side. Note that the uneven portion 321 may have a forward pyramid structure in which a plurality of quadrangular pyramid regions having apexes on the on-chip lens 62 side, which is a side on which light is incident, is regularly arranged. Note that the apex of the inverse pyramid structure or the forward pyramid structure may have a curvature and a rounded shape.

In the example of FIGS. 30A and 30B, the uneven portion 321 has a structure in which quadrangular pyramid shapes are arranged in 3×3, but the size of a repeating unit (quadrangular pyramid shape) and the arrangement number thereof are arbitrary. In the example of FIGS. 30A and 30B, the uneven portion 321 is formed only in the vicinity of the center of the pixel region, but the uneven portion 321 may be formed in any region of the light incident surface of the substrate 61 as long as the DTI 301 is not formed in the region. The uneven portion 321 may be formed on the entire light incident surface except the portion of the DTI 301.

Although not illustrated, the uneven portion 321 can be formed on the light incident surface of the substrate 61 also in the pixel 51 having any one of the second to sixth pixel isolation structures illustrated in FIGS. 25, 26A, 26B, 27A, 27B, 28A, 28B, 29A, and 29B.

Diffracted light of incident light is increased by the uneven portion 321, and a gradient of a refractive index is formed. Therefore, reflection is reduced. As a result, the amount of incident light to be photoelectrically converted can be increased, and therefore sensitivity can be improved.

(Seventh Pixel Isolation Structure)

Figure 31A:
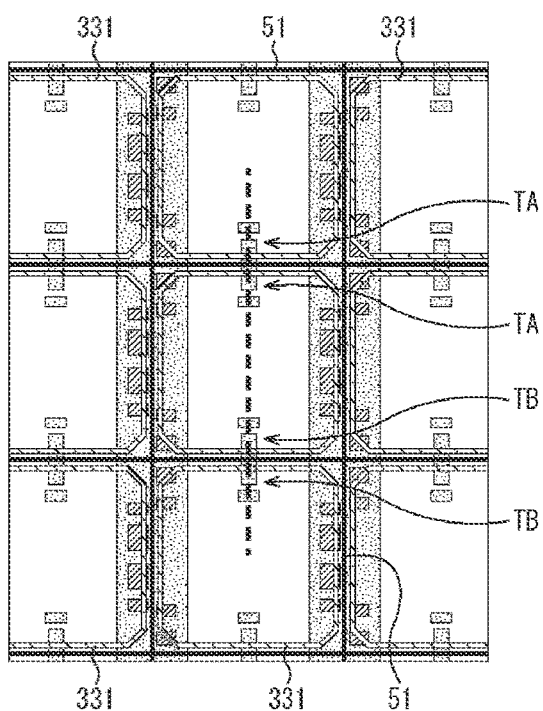
FIGS. 31A and 31B are diagrams illustrating a seventh pixel isolation structure of the pixel.

FIG. 31A is a plan view illustrating a seventh pixel isolation structure.

Figure 31B:
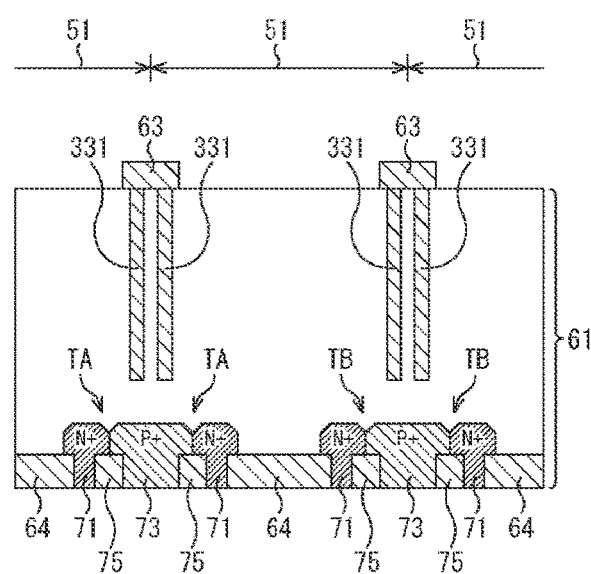

FIG. 31B is a pixel cross-sectional view of a line segment passing through a tap T, corresponding to a broken line portion of FIG. 31A.

In the seventh pixel isolation structure, a DTI 331 is formed. Compared with the DTI 301 of the first pixel isolation structure in FIGS. 24A and 24B, the DTI 301 is formed at a boundary portion between the pixels 51 as a barrier shared by the two adjacent pixels 51, but the DTI 331 in FIGS. 31A and 31B are formed so as to be an individual barrier for each pixel. As a result, as illustrated in FIG. 31B, the DTI 331 is formed so as to be a double barrier between adjacent pixels.

As illustrated in the plan view in FIG. 31A, along a boundary portion between the pixels 51, a corner of the DTI 331 formed in a rectangular shape is chamfered such that sides do not intersect with each other at a right angle, and has a shape in which an intersection is not formed at 90 degrees. Therefore, it is possible to suppress occurrence of defects and damages at the time of forming a groove portion of the intersection, and to suppress generation of noise charges.

With the DTI 331, it is possible to suppress occurrence of crosstalk due to incidence of infrared light once incident on a pixel 51 on an adjacent pixel 51. Furthermore, since isolation characteristics of infrared light between pixels can be improved, sensitivity can be improved.

(Pixel Structure to which Antireflection Structure is Added)

An uneven structure can be formed also in the seventh pixel isolation structure.

Figure 32A:
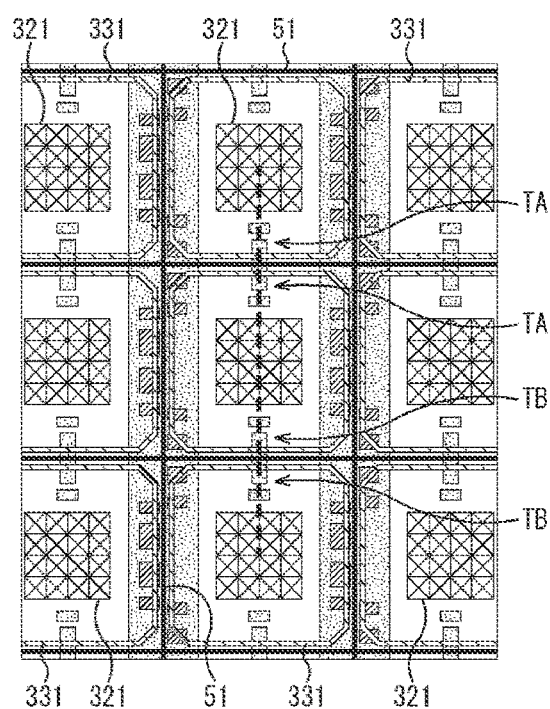
FIGS. 32A and 32B are diagrams illustrating the seventh pixel isolation structure having an uneven structure.
Figure 32B:
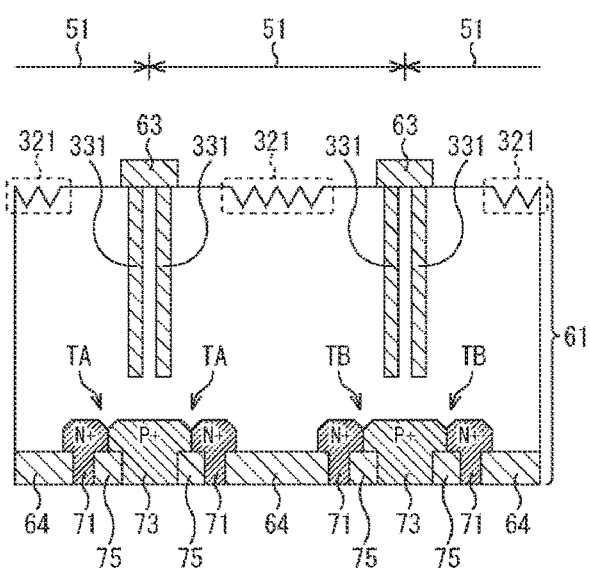

FIGS. 32A and 32B are plan views and a cross-sectional view in which an uneven portion 321 is formed in the pixel 51 having the seventh pixel isolation structure illustrated in FIGS. 31A and 31B. Therefore, FIGS. 31A, 31B, 32A, and 32B are different from each other only in whether or not an uneven portion 321 is formed on the light incident surface of the substrate 61, and are the same as each other in the other portions.

Note that the uneven portion 321 illustrated in FIGS. 30A and 30B has a structure in which quadrangular pyramid shapes as repeating units are arranged in 3×3, but the uneven portion 321 illustrated in FIGS. 32A and 32B has a structure in which quadrangular pyramid shapes are arranged in 4×4.

Also in the seventh pixel isolation structure, by forming the uneven portion 321, diffracted light of incident light is increased, and a gradient of a refractive index is formed. Therefore, reflection is reduced. As a result, the amount of incident light to be photoelectrically converted can be increased, and therefore sensitivity can be improved.

Note that the DTI 301, the DTI 302, the DTI 303, the DTI 304, the DTI 311, the DTI 312, and the DTI 331 illustrated as the first to seventh pixel isolation structures described above can each additionally include a fixed charge film so as to cover a side wall and a bottom surface of the DTI with the fixed charge film.

In a case where the fixed charge film is added, it is only required to form the fixed charge film on a side wall and a bottom surface of a groove portion (trench) formed by digging the substrate 61 to a predetermined depth from a back surface side which is the light incident surface side of the substrate 61, and then embed an insulator. As the fixed charge film, it is preferable to use a material capable of generating fixed charges by being deposited on the substrate 61 such as silicon to enhance pinning, and a high refractive index material film or a high dielectric film having negative charges can be used. As a specific material, for example, an oxide or a nitride containing at least one element of hafnium (Hf), aluminum (Al), zirconium (Zr), tantalum (Ta), and titanium (Ti) can be applied. Examples of a film forming method include a chemical vapor deposition method (hereinafter, referred to as a CVD method), a sputtering method, and an atomic layer deposition method (hereinafter, referred to as an ALD method). By using the ALD method, a SiO2 film that reduces an interface state during film formation can be simultaneously formed to a film thickness of about 1 nm. Furthermore, examples of a material other than the above materials include an oxide or a nitride containing at least one element of lanthanum (La), praseodymium (Pr), cerium (Ce), neodymium (Nd), promethium (Pm), samarium (Sm), europium (Eu), gadolinium (Gd), terbium (Tb), dysprosium (Dy), holmium (Ho), thulium (Tm), ytterbium (Yb), lutetium (Lu), and yttrium (Y). Moreover, the fixed charge film can be constituted by a hafnium oxynitride film or an aluminum oxynitride film.

As for the above-described material of the fixed charge film, silicon (Si) or nitrogen (N) may be added into the film as long as insulating properties are not impaired. The concentration thereof is appropriately determined within a range in which the insulating properties of the film are not impaired. As described above, the addition of silicon (Si) or nitrogen (N) makes it possible to increase heat resistance of the film and ability to prevent ion implantation in the process.

By covering the side wall and the bottom surface of the DTI with the fixed charge film, an inversion layer is formed on a surface in contact with the fixed charge film. Therefore, the silicon interface is pinned by the inversion layer, and therefore generation of dark current is suppressed. The suppression of generation of dark current contributes to improvement of the sensitivity of the pixel 51. Furthermore, in a case where a groove portion is formed in the substrate 61, physical damage may occur on the side wall and the bottom surface of the groove portion, and pinning deviation may occur in a peripheral portion of the groove portion. Against this problem, by forming the fixed charge film having a large amount of fixed charges on the side wall and the bottom surface of the groove portion, pinning deviation is prevented. In a case where the fixed charge film is formed on the side wall and the bottom surface of the DTI, the fixed charge film can be integrally and simultaneously formed with the fixed charge film 66 formed on the light incident surface side of the substrate 61.

(Eighth Pixel Isolation Structure)

FIG. 33A is a plan view illustrating an eighth pixel isolation structure.

In the eighth pixel isolation structure of FIGS. 33A and 33B, as in the first pixel isolation structure illustrated in FIGS. 24A and 24B, the DTI 301 is disposed at a boundary portion between the pixels 51. The plan view of the eighth pixel isolation structure in FIG. 33A is the same as the plan view of the first pixel isolation structure illustrated in FIG. 24A. Note that, in FIG. 33A, the boundary line between the pixels 51 illustrated in FIG. 24A and the like for description is omitted.

FIG. 33B is a pixel cross-sectional view of a line segment passing through a tap T, corresponding to a broken line portion of FIG. 33B.

FIG. 33B illustrates, in addition to the structure of the substrate 61 illustrated in FIG. 24A and the like, a part of the multilayer wiring layer 111 formed on a front surface side of the substrate 61, the on-chip lens 62 formed on a back surface side of the substrate 61, and the like.

The inter-pixel light shielding film 63 for preventing crosstalk between adjacent pixels is formed at a pixel boundary portion at an interface on the back surface side of the substrate 61. Similarly to the DTI 301, the inter-pixel light shielding film 63 is also formed in a lattice shape so as to surround a periphery of the pixel 51. A flattening film 341 is formed on a lower surface of the on-chip lens 62 on the pixel center side of the inter-pixel light shielding film 63. The flattening film 341 can be constituted by, for example, an inorganic film such as an oxide film (SiO2), a nitride film (SiN), an oxynitride film (SiON), or silicon carbide (SiC). Furthermore, the flattening film 341 may be a film constituted by an organic material such as a resin and having a filter function of transmitting only light having a predetermined wavelength.

A lens isolation portion 342 that isolates the on-chip lenses 62 formed for the respective pixels 51 from each other is formed on an upper surface of the inter-pixel light shielding film 63 at a pixel boundary portion between the pixels 51. As a material of the lens isolation portion 342, for example, a metal material such as tungsten (W), aluminum (Al), copper (Cu), or titanium (Ti) can be used. Furthermore, the flattening film 343 is formed on the on-chip lens 62 such that an upper surface of the on-chip lens 62 is flat at the same height as the lens isolation portion 342. The flattening film 343 can also be constituted by, for example, an inorganic film such as an oxide film (SiO2), a nitride film (SiN), an oxynitride film (SiON), or silicon carbide (SiC).

Here, when the refractive index of the flattening film 343 is represented by $n_0$, the refractive index of the on-chip lens 62 is represented by $n_1$, and the refractive index of the lens isolation portion 342 is represented by $n_2$, the refractive indices $n_0$, $n_1$, and $n_2$ have a relationship of $n_2<n_0<n_1$. The flattening film 343 having the refractive index no is constituted by a film having a higher density of N (nitrogen) or C (carbon) than the lens isolation portion 342 having the refractive index $n_2$. The on-chip lens 62 having the refractive index $n_1$ is constituted by a film having a higher density of N (nitrogen) or C (carbon) than the flattening film 343 having the refractive index no.

The multilayer wiring layer 111 including the metal films M1 to M3 is formed on a front surface side of the substrate 61. The configuration of the multilayer wiring layer 111 is similar to the detailed configuration described with reference to FIGS. 18 to 23, and therefore description thereof is omitted. Note that, in the multilayer wiring layer 111 in FIGS. 33A, 33B, 34A, 34B, 35A, 35B, 36, 37A, and 37B, a contact for applying the voltage MIX_A or MIX_B to the P+ semiconductor region 73 as a voltage application unit and a contact that connects the N+ semiconductor region 71 as a charge detection unit and the FD portion (FD 122) to each other are not illustrated.

As compared with the first pixel isolation structure illustrated in FIGS. 24A and 24B, the eighth pixel isolation structure configured as described above has a configuration in which the lens isolation portion 342 that is formed in the same layer as the on-chip lens 62 and isolates the on-chip lenses 62 formed for the respective pixels 51 from each other is newly added.

According to the eighth pixel isolation structure, similarly to the first pixel isolation structure, the DTI 301 formed at a pixel boundary portion can suppress occurrence of crosstalk due to incidence of infrared light once incident on a pixel 51 on an adjacent pixel 51, and can improve sensitivity. Furthermore, with the lens isolation portion 342, it is possible to prevent light reflected by the metal film M1 or the like of the multilayer wiring layer 111 from leaking to an adjacent pixel, like incident light F1 illustrated in FIG. 33B.

(Modification of Eighth Pixel Isolation Structure)

Figure 34A:
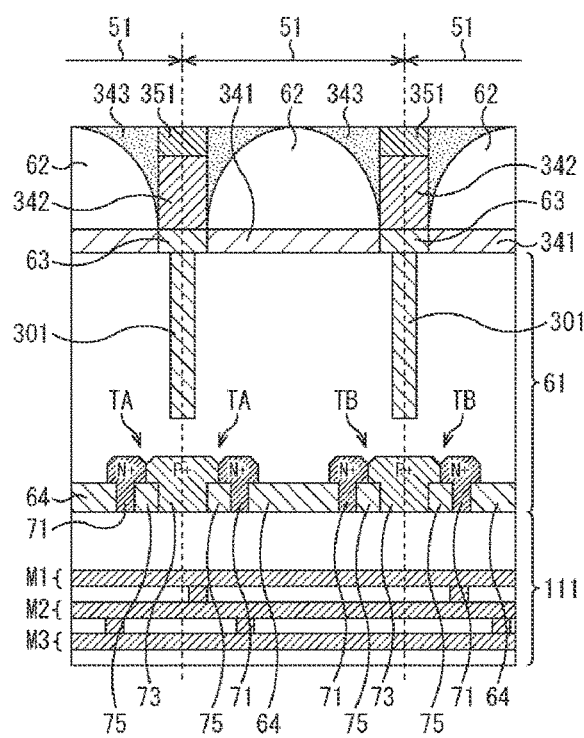
FIGS. 34A and 34B are pixel cross-sectional views illustrating a modification of the eighth pixel isolation structure.

FIG. 34A is a pixel cross-sectional view illustrating a first modification of the eighth pixel isolation structure.

Figure 34B:
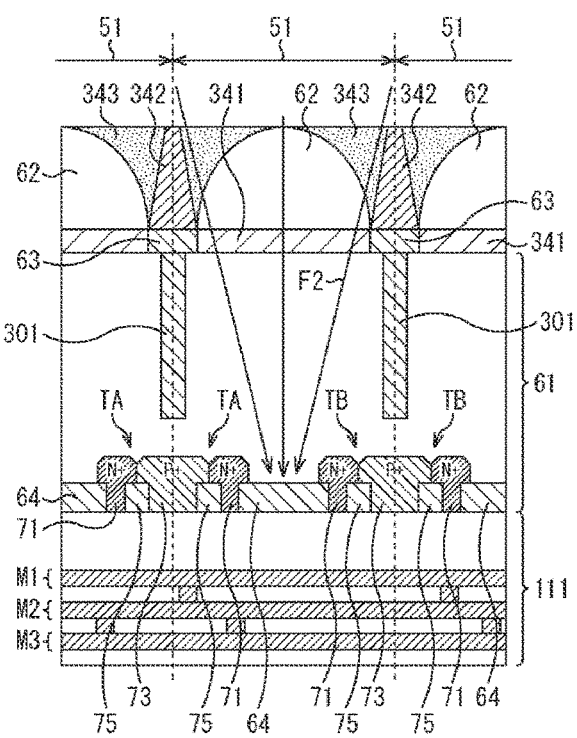

FIG. 34B is a pixel cross-sectional view illustrating a second modification of the eighth pixel isolation structure.

In the first modification in FIG. 34A, a reflection suppressing film 351 that suppresses reflection of incident light is newly added to an upper portion of the lens isolation portion 342 that isolates the on-chip lenses 62 from each other, and the combined height of the lens isolation portion 342 and the reflection suppressing film 351 is the same as the height of the flattening film 343.

The reflection suppressing film 351 can be constituted by, for example, an inorganic film such as an oxynitride film (SiON), a carbonitride film (SiCN), a nitride film (SiN), silicon nitride (Si3N4), or silicon carbide (SiC), or a metal film such as tungsten (W).

With the reflection suppressing film 351, for example, in the eighth pixel isolation structure in FIGS. 33A and 33B, it is possible to suppress light that has hit an upper portion of the lens isolation portion 342 from being diffracted and leaking to an adjacent pixel. Therefore, it is possible to suppress occurrence of crosstalk and to improve sensitivity.

In the second modification in FIG. 34B, the cross-sectional shape of the lens isolation portion 342 that isolates the on-chip lenses 62 from each other is a substantially trapezoidal shape. Specifically, the area of an upper surface of the lens isolation portion 342 on an incident surface side of incident light is formed so as to be smaller than the area of a lower surface on the substrate 61 side, and a side wall of the lens isolation portion 342 is inclined so as to face the incident surface side. Therefore, the area of the upper surface of the flattening film 343 is larger than the area of a bottom surface of the on-chip lens 62.

As described above, by making the side cross-sectional shape of the lens isolation portion 342 a cross-sectional shape in which the area of the upper surface is smaller than the area of the bottom surface, light having a wider angle can also be taken into the substrate 61 like incident light F2 illustrated in FIG. 34B. Therefore, the sensitivity of the pixel 51 can be improved.

In the above-described eighth pixel isolation structure, the on-chip lens 62, the inter-pixel light shielding film 63, the lens isolation portion 342, and the like formed on the incident surface (back surface) side of the substrate 61 can be disposed so as to perform pupil correction.

That is, since an incident angle of a principal ray of incident light from an optical lens (not illustrated) is 0 degrees (perpendicular) at the central portion of the pixel array unit 20, there is no need to perform pupil correction, and the center of the on-chip lens 62 coincides with the center of the pixel region of the substrate 61 as illustrated in FIG. 33B.

Meanwhile, in a peripheral portion (outer peripheral portion) of the pixel array unit 20, since the incident angle of the principal ray of the incident light from the optical lens is a predetermined angle according to design of the lens, pupil correction is performed. That is, as illustrated in FIGS. 35A and 35B, the center of the on-chip lens 62 is shifted toward the center side of the pixel array unit 20 from the center of the pixel region of the substrate 61. The amount of shift between the center position of the on-chip lens 62 and the central position of the pixel region of the substrate 61 increases as it goes closer to an outer periphery of the pixel array unit 20.

Then, in accordance with the shift of the on-chip lens 62, the position of the lens isolation portion 342 is also shifted toward the center side as it goes closer to the outer periphery of the pixel array unit 20. Furthermore, the amount of shift of the inter-pixel light shielding film 63 is smaller than the amount of shift of the lens isolation portion 342 because the inter-pixel light shielding film 63 is closer to the substrate 61 than the lens isolation portion 342.

As described above, by disposing the on-chip lens 62, the inter-pixel light shielding film 63, the lens isolation portion 342, and the like on the incident surface side of the substrate 61 so as to perform pupil correction, it is possible to suppress a decrease in sensitivity and charge distribution modulation degree caused by a difference in the incident angle of the principal ray on the outer peripheral portion of the pixel array unit 20 and to suppress in-plane variations.

(Ninth Pixel Isolation Structure)

Figure 36:
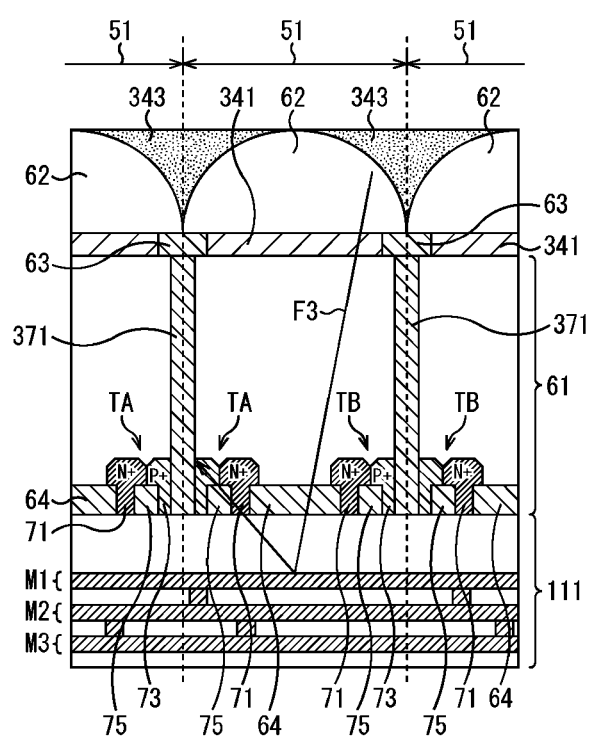
FIG. 36 is a diagram illustrating a ninth pixel isolation structure of the pixel.

FIG. 36 is a plan view illustrating a ninth pixel isolation structure.

In the ninth pixel isolation structure of FIG. 36, the DTI 301 formed at a boundary portion between the pixels 51 in the first pixel isolation structure illustrated in FIGS. 24A and 24B are replaced with an inter-pixel trench portion 371 penetrating the substrate 61. The lens isolation portion 342 in FIGS. 33A and 33B is not formed on an upper surface of the inter-pixel light shielding film 63, and the on-chip lens 62 is formed in the entire pixel region in a plana direction such that the on-chip lenses 62 of adjacent pixels are in contact with each other.

The inter-pixel trench portion 371 is formed by forming a trench from a back surface side or a front surface side of the substrate 61 so as to penetrate the substrate 61 to reach a substrate surface on the opposite side and embedding, for example, an insulating film of silicon oxide in the trench. A material to be embedded in the trench as the inter-pixel trench portion 371 may be, for example, a metal material such as tungsten (W), aluminum (Al), titanium (Ti), or titanium nitride (TiN), or polysilicon, in addition to the insulating film such as a silicon oxide film.

By forming such an inter-pixel trench portion 371, taps T of adjacent pixels formed in a shared tap structure can be electrically isolated from each other completely. Therefore, like incident light F3 illustrated in FIG. 36, it is possible to prevent incident light from traveling into an adjacent pixel 10, to suppress occurrence of crosstalk, and to improve sensitivity.

(Modification of Ninth Pixel Isolation Structure)

Figure 37A:
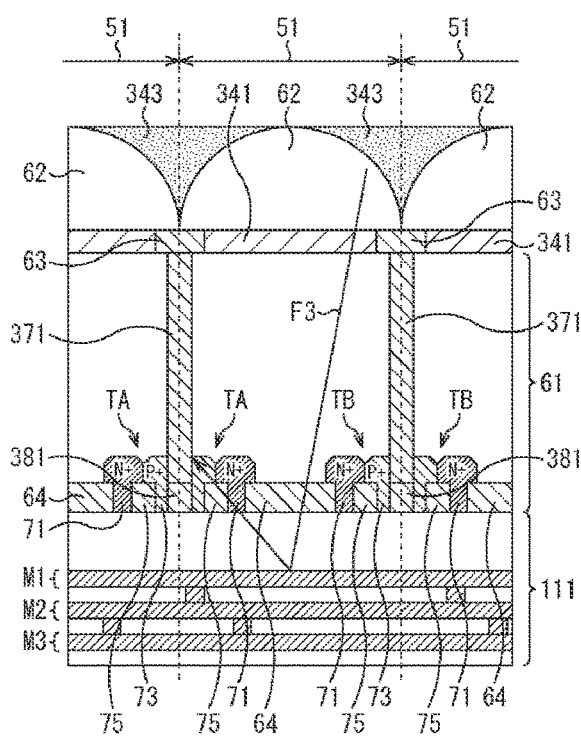
FIGS. 37A and 37B are pixel cross-sectional views illustrating a modification of the ninth pixel isolation structure.

FIG. 37A is a pixel cross-sectional view illustrating a first modification of the ninth pixel isolation structure.

In the first modification in FIG. 37A, the inter-pixel trench portion 371 is formed so as not to reach a substrate surface on a front surface side of the substrate 61 but to be in contact with a shallow groove portion 381 formed on the front surface side of the substrate 61, and the groove portion 381 and the inter-pixel trench portion 371 are combined to electrically isolate pixels of the substrate 61 from each other completely. The shallow groove portion 381 is formed by, for example, shallow trench isolation (STI) together with the isolation portion 75 in the vicinity thereof.

The groove portion 381 serves as a stopper when a trench to be the inter-pixel trench portion 371 is formed from a back surface side of the substrate 61 to the vicinity of a substrate surface on a front surface side of the substrate 61 by plasma etching or the like. By forming the groove portion 381 as an insulating layer, it is possible to prevent damage to the multilayer wiring layer 111 via a contact or the like of the P+ semiconductor region 73 formed in the vicinity when a trench is formed.

Figure 37B:
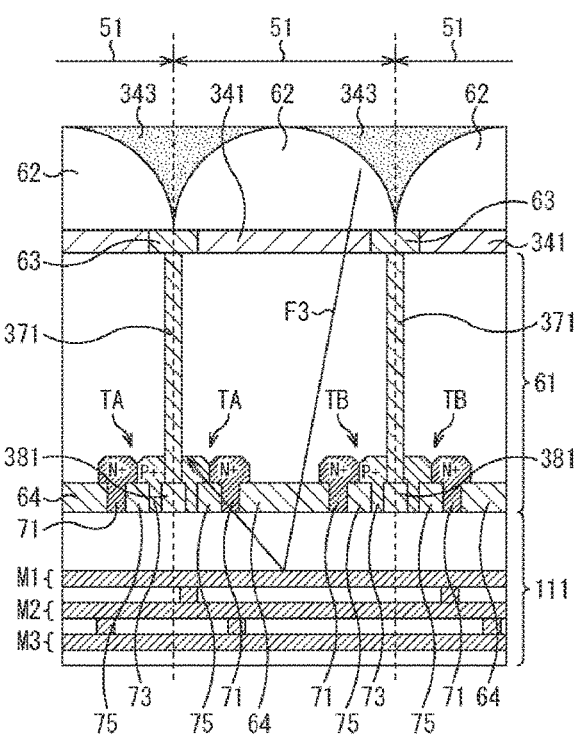

FIG. 37B is a pixel cross-sectional view illustrating a second modification of the ninth pixel isolation structure.

The second modification in FIG. 37B is common to the first modification in that the inter-pixel trench portions 371 and the groove portions 381 are formed at a pixel boundary portion of the substrate 61, and the inter-pixel trench portions 371 and the groove portion 381 electrically isolate the pixels of the substrate 61 completely from the back surface side to the front surface side of the substrate 61.

Meanwhile, the second modification in FIG. 37B is different from the first modification in FIG. 37A in that the sizes of the inter-pixel trench portion 371 and the groove portion 381 in the planar direction are substantially the same in the first modification, whereas the size of the groove portion 381 in the planar direction is larger than the size of the inter-pixel trench portion 371 in the planar direction in the second modification. Therefore, when a trench to be the inter-pixel trench portion 371 is formed from a back surface side of the substrate 61 to the vicinity of a substrate surface on a front surface side of the substrate 61, it is possible to suppress the trench from deviating from the formation position of the groove portion 381 and to allow variations in the trench formation position in the planar direction to a certain extent.

Also in the first and second modifications, since the inter-pixel trench portions 371 and the groove portion 381 electrically isolate the pixels of the substrate 61 completely from the back surface side to the front surface side of the substrate 61, it is possible to prevent incident light from traveling into an adjacent pixel 10, to suppress occurrence of crosstalk, and to improve sensitivity.

(Tenth Pixel Isolation Structure)

Figure 38A:
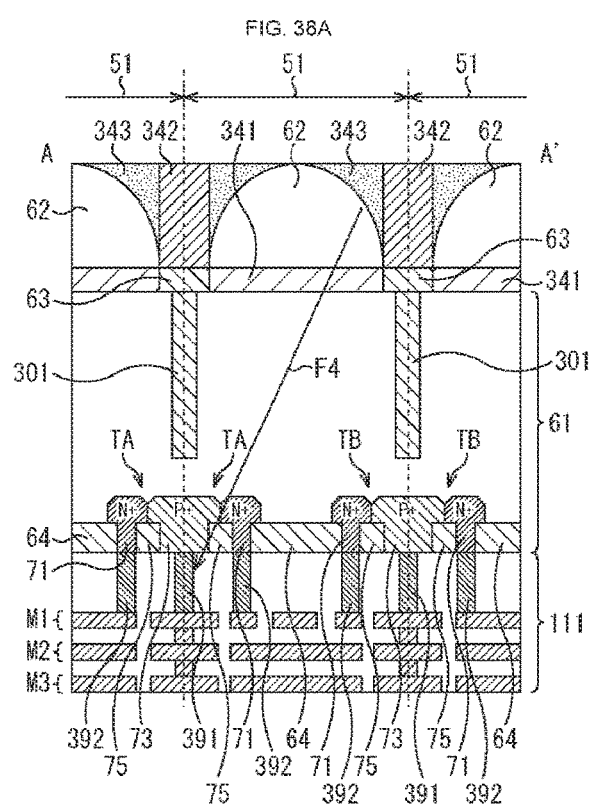
FIGS. 38A and 38B are diagrams illustrating a tenth pixel isolation structure of the pixel.
Figure 39:
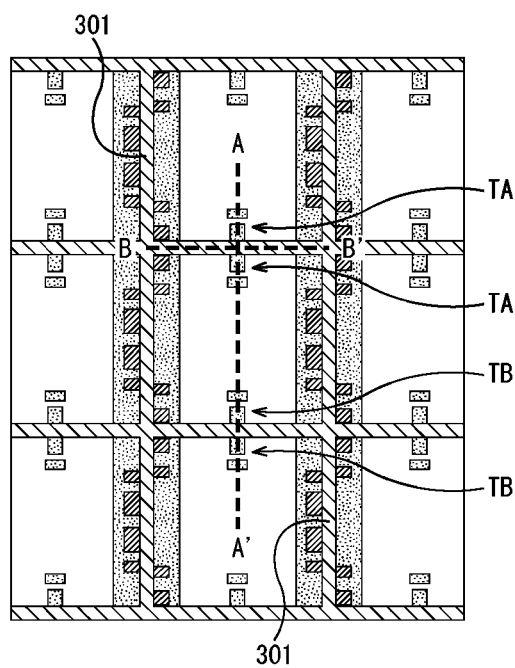
FIG. 39 is a plan view for describing a cross-sectional direction of FIGS. 38A and 38B.

FIG. 38A is a pixel cross-sectional view illustrating a tenth pixel isolation structure, and is a cross-sectional view corresponding to a broken line portion of A-A' of FIG. 39.

Figure 38B:
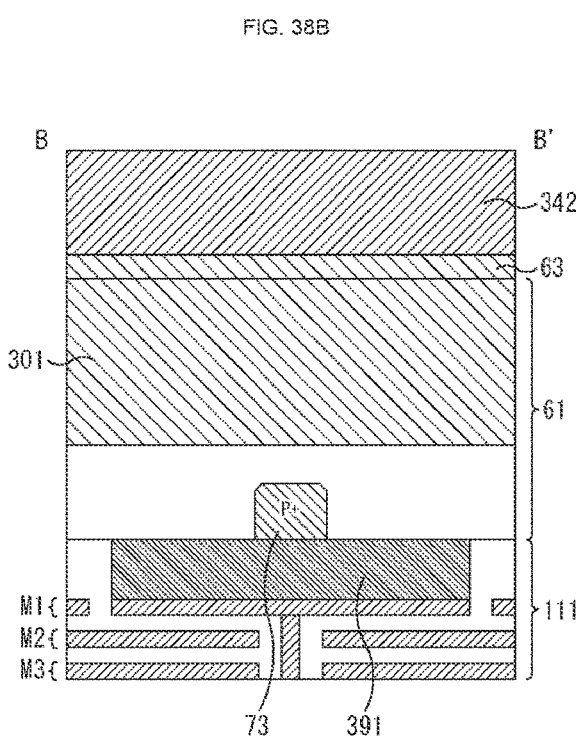

FIG. 38B is a pixel cross-sectional view illustrating the tenth pixel isolation structure, and is a cross-sectional view corresponding to a broken line portion of B-B' of FIG. 39.

FIG. 39 is a plan view illustrating a cross-sectional direction of the pixel cross-sectional view of FIGS. 38A and 38B. As illustrated in FIG. 39, the DTI 301 is formed in a lattice shape at a pixel boundary portion so as to surround a periphery of the pixel 51. Note that the planar arrangement of the inter-pixel trench portion 371 in the ninth pixel isolation structure illustrated in FIG. 36 is also the same as that of the DTI 301 in FIG. 39.

In the tenth pixel isolation structure in FIGS. 38A and 38B, the configuration in the substrate 61 and the configuration on a back surface side of the substrate 61 on which the on-chip lens 62 and the like are formed are similar to those of the first pixel isolation structure illustrated in FIGS. 24A and 24B, and therefore description thereof will be omitted.

Meanwhile, in the multilayer wiring layer 111 on the front surface side of the substrate 61, a contact 391 which is an electrode for applying the voltage MIX_A or MIX_B to the P+ semiconductor region 73, and a contact 392 which is an electrode for transferring charges accumulated in the N+ semiconductor region 71 to the FD 122 are formed. The contact 391 and the contact 392 are connected to the metal film M1 which is the first layer of the multilayer wiring layer 111 at different positions.

The contact 391 which is an electrode for applying the voltage MIX_A or MIX_B to the P+ semiconductor region 73 is formed linearly along a pixel boundary line as illustrated in FIG. 38B similarly to the DTI 301. As for the planar arrangement of the contact 391, as illustrated in the plan view of FIG. 41A, the contact 391 is formed to be long in the same direction as a broken line of B-B' of FIG. 39.

As described above, the contact 391 which is an electrode for applying the voltage MIX_A or MIX_B to the P+ semiconductor region 73 is linearly formed along the pixel boundary line between the backside interface of the substrate 61 and the metal film M1. As a result, a light shielding wall is formed, and it is possible to prevent light incident on the pixel boundary or light reflected by the metal film M1 from leaking into an adjacent pixel, like incident light F4 illustrated in FIG. 38A.

(Modification of Tenth Pixel Isolation Structure)

Figure 40A:
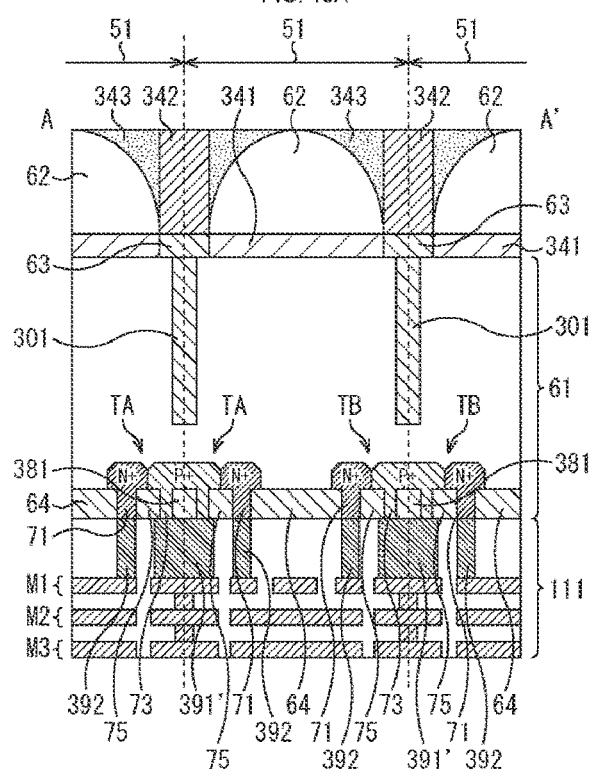
FIGS. 40A and 40B are pixel cross-sectional views illustrating a modification of the tenth pixel isolation structure.

FIG. 40A is a pixel cross-sectional view illustrating a modification of the tenth pixel isolation structure, and is a cross-sectional view corresponding to a broken line portion of A-A' of FIG. 39.

Figure 40B:
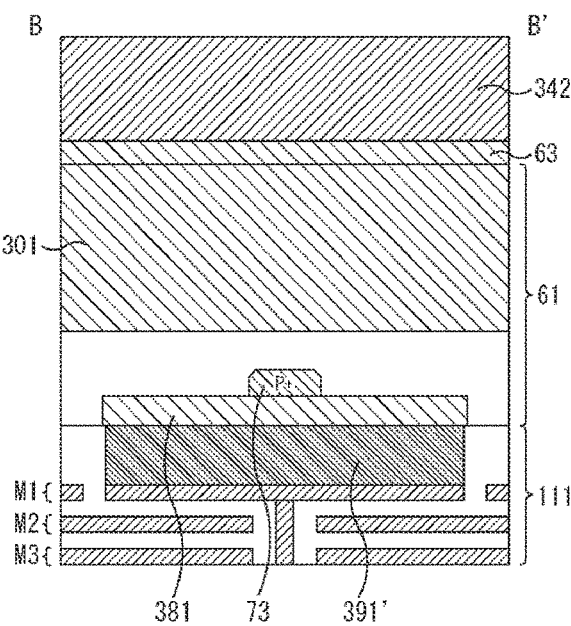

FIG. 40B is a pixel cross-sectional view illustrating a modification of the tenth pixel isolation structure, and is a cross-sectional view corresponding to a broken line portion of B-B' of FIG. 39.

In the modification of FIGS. 40A and 40B, the shallow groove portion 381 formed by STI or the like is formed i a central portion of the P+ semiconductor region 73 on a front surface side of the substrate 61. Then, the contact 391 for applying the voltage MIX_A or MIX_B to the P+ semiconductor region 73 illustrated in FIGS. 38A and 38B are changed to a contact 391' formed to be wide in a direction connecting two taps T of a shared tap structure (the direction of the broken line A-A') in order to be connected to the P+ semiconductor region 73 in a region other than the groove portion 381 in the modification of FIGS. 40A and 40B.

As illustrated in FIG. 40B, similarly to the contact 391', the groove portion 381 is also formed linearly along a pixel boundary line.

Figure 41A:
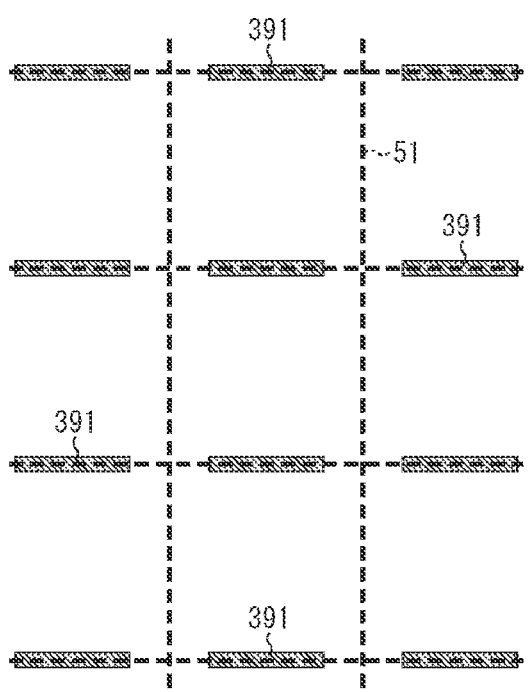
FIGS. 41A and 41B are plan views illustrating a planar arrangement of a contact in the tenth pixel isolation structure.

FIG. 41A is a plan view illustrating a planar arrangement of the contact 391 in the tenth pixel isolation structure illustrated in FIGS. 38A and 38B.

Figure 41B:
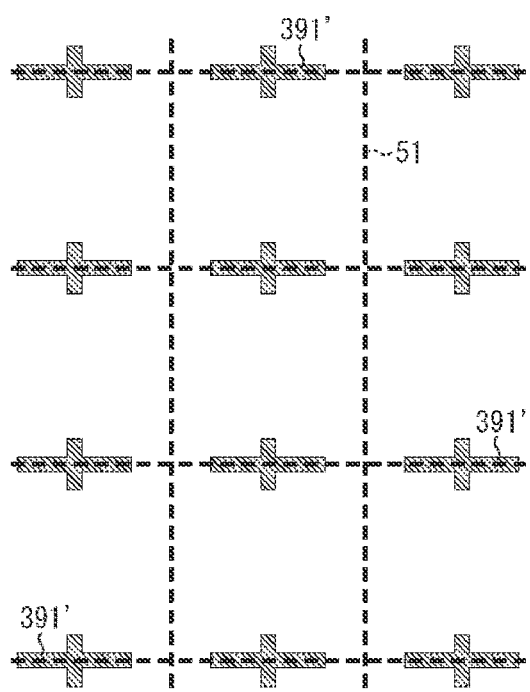

FIG. 41B is a plan view illustrating a planar arrangement of the contact 391' in the modification of the tenth pixel isolation structure illustrated in FIGS. 40A and 40B.

In FIGS. 41A and 41B, a border of a broken line indicates a boundary line between the pixels 51.

Since the contact 391' is formed to be wide in the direction connecting the two taps T of the shared tap structure, the contact 391' is disposed in a cross shape intersecting with a line shape along the pixel boundary line.

(Eleventh Pixel Isolation Structure)

Figure 42:
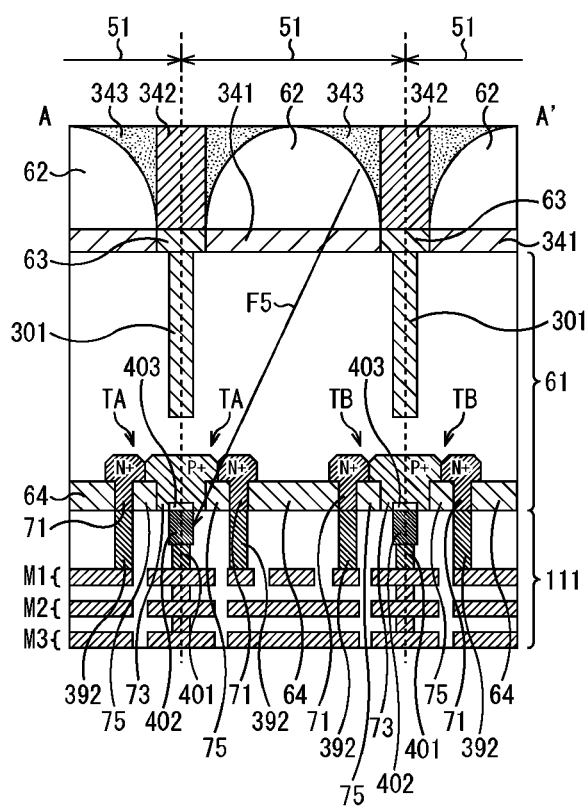
FIG. 42 is a diagram illustrating an eleventh pixel isolation structure of the pixel.

FIG. 42 is a pixel cross-sectional view illustrating an eleventh pixel isolation structure, and is a cross-sectional view corresponding to a broken line portion of A-A' of FIG. 39.

In the eleventh pixel isolation structure of FIG. 42, the contact 391 for applying the voltage MIX_A or MIX_B to the P+ semiconductor region 73 illustrated in the tenth pixel isolation structure of FIGS. 38A and 38B are changed to a structure similar to the gate electrode of each of the plurality of pixel transistors Tr that controls the first tap TA or the second tap TB, that is, a contact 401, a polysilicon 402, and a gate insulating film 403.

By sharing the structure of the contact for applying the voltage MIX_A or MIX_B to the P+ semiconductor region 73 with the structure of the gate electrode of each of the plurality of pixel transistors Tr that controls the first tap TA or the second tap TB, a manufacturing process is stabilized, and conduction failure can be reduced.

Note that the pixel cross-sectional structure of the contact 401, the polysilicon 402, and the gate insulating film 403 in the eleventh pixel isolation structure in a direction along the pixel boundary line corresponding to a broken line portion of B-B' in FIG. 39 may be formed in a linear shape along the pixel boundary line as in FIG. 38B, or may be formed in a circular shape like a normal contact.

Also in the eleventh pixel isolation structure, like incident light F5 illustrated in FIG. 42, it is possible to prevent light incident on the pixel boundary or light reflected by the metal film M1 from leaking into an adjacent pixel.

(Twelfth Pixel Isolation Structure)

Figure 43:
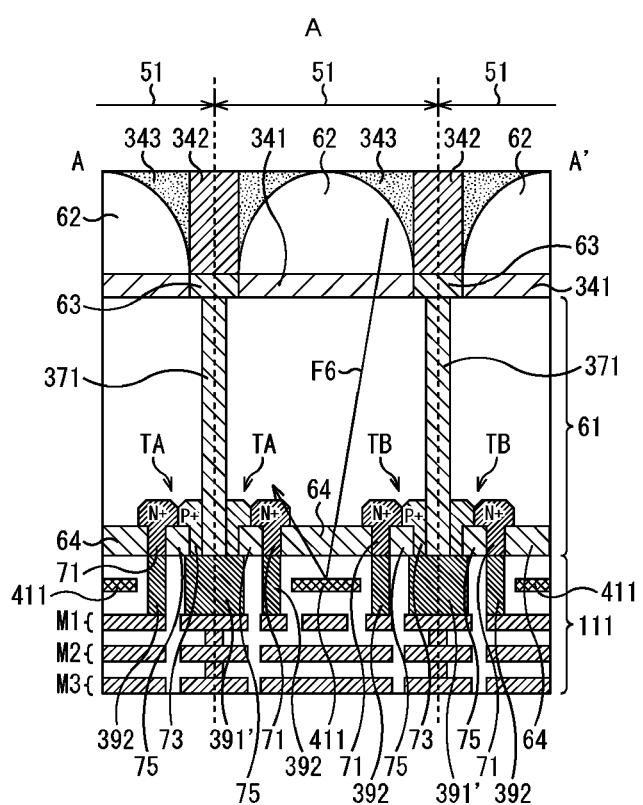
FIG. 43 is a diagram illustrating a twelfth pixel isolation structure of the pixel.

FIG. 43 is a pixel cross-sectional view illustrating a twelfth pixel isolation structure, and is a cross-sectional view corresponding to a broken line portion of A-A' of FIG. 39.

The twelfth pixel isolation structure in FIG. 43 includes the lens isolation portion 342 that isolates the adjacent on-chip lenses 62 from each other, included in the eighth pixel isolation structure illustrated in FIGS. 33A and 33B, the inter-pixel trench portion 371 that penetrates the substrate 61, included in the ninth pixel isolation structure illustrated in FIG. 36, and the contact 391' that is formed to be wide in a direction connecting two taps T, included in the modification of the tenth pixel isolation structure illustrated in FIGS. 40A and 40B.

Furthermore, the twelfth pixel isolation structure in FIG. 43 includes a reflecting member 411 that reflects infrared light between an interface on the front surface side of the substrate 61 and the metal film M1 which is the first layer of the multilayer wiring layer 111. The reflecting member 411 may form a structure that reflects or shields light with polysilicon, an oxide film, or the like in addition to a metal material such as tungsten (W), aluminum (Al), copper (Cu), or titanium (Ti). The reflecting member 411 may be formed using the same material (for example, polysilicon) as the gate electrode of each of the plurality of pixel transistors Tr that controls the first tap TA or the second tap TB at the same substrate depth position as the gate electrode.

According to the twelfth pixel isolation structure, by forming the lens isolation portion 342 and the inter-pixel trench portion 371 at the pixel boundary portion, it is possible to prevent light incident on the pixel 51 from leaking to an adjacent pixel.

Furthermore, by forming the contact 391' linearly formed along the pixel boundary line at the depth position between the interface on the front surface side of the substrate 61 and the metal film M1, it is possible to prevent light from leaking to an adjacent pixel in the multilayer wiring layer 111.

While incident light is confined in the substrate 61 with high efficiency by the lens isolation portion 342, the inter-pixel trench portion 371, and the contact 391', reflection is enhanced by the reflecting member 411 of the multilayer wiring layer 111 like incident light F6 illustrated in FIG. 43, and sensitivity can be thereby further improved.

In the multilayer wiring layer 111, by disposing the dedicated reflecting member 411 separately from the five layers of metal films M1 to M5, a wiring layout of the five layers of metal films M1 to M5 can be freely determined.

Note that the inter-pixel trench portion 371 may be replaced with a combination of the inter-pixel trench portion 371 and the groove portion 381 as in the modification of the ninth pixel isolation structure illustrated in FIGS. 37A and 37B.

(Thirteenth Pixel Isolation Structure)

Figure 44A:
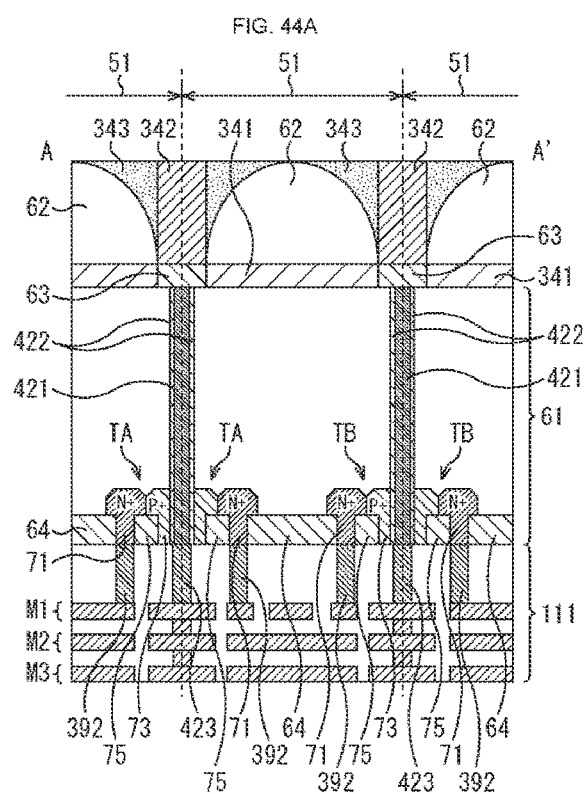
FIGS. 44A and 44B are diagrams illustrating a thirteenth pixel isolation structure of the pixel.
Figure 45:
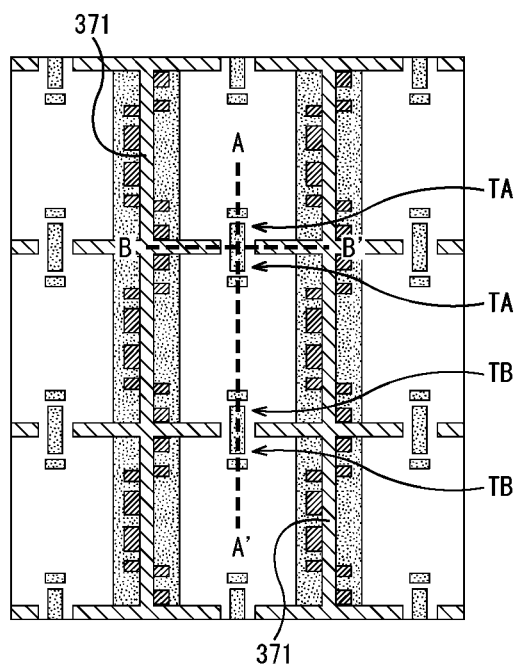
FIG. 45 is a plan view illustrating a planar arrangement of an inter-pixel trench portion in the thirteenth pixel isolation structure.

FIG. 44A is a pixel cross-sectional view illustrating a thirteenth pixel isolation structure, and is a cross-sectional view corresponding to a broken line portion of A-A' of FIG. 45.

Figure 44B:
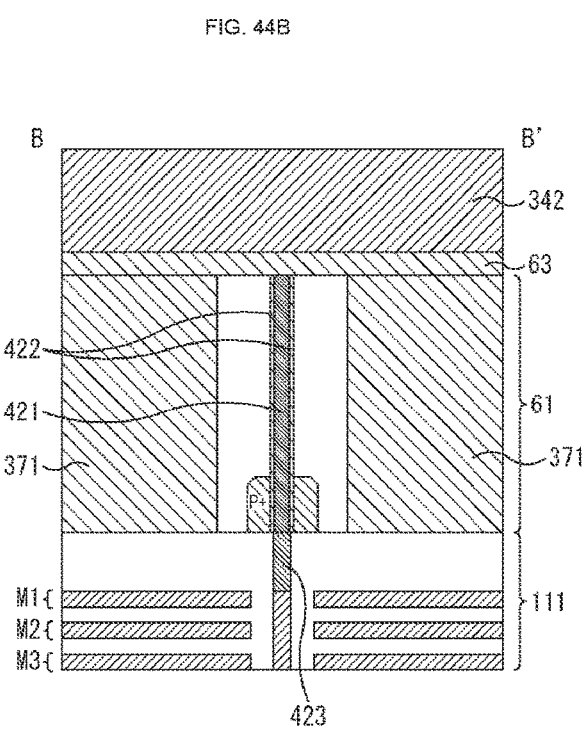

FIG. 44B is a pixel cross-sectional view illustrating the thirteenth pixel isolation structure, and is a cross-sectional view corresponding to a broken line portion of B-B' of FIG. 45.

The thirteenth pixel isolation structure in FIGS. 44A and 44B has a structure in which the DTI 301 formed at the pixel boundary portion in the tenth pixel isolation structure illustrated in FIGS. 38A and 38B are replaced with a conductive material 421 penetrating the substrate 61 from a back surface side or a front surface side of the substrate 61 to a substrate surface on the opposite side, and insulating films 422 formed on both outer sides thereof. The conductive material 421 and the insulating film 422 are pixel isolation portions that electrically isolate pixels of the substrate 61 from each other completely. The conductive material 421 is constituted by, for example, a metal material such as polysilicon or tungsten (W). The insulating film 422 includes, for example, SiO2. A contact 423 that connects the metal film M1 as the first layer and the conductive material 421 to each other is connected to the conductive material 421.

The contact 423, the conductive material 421, and the insulating film 422 configured as described above have the same structure as a gate electrode of a vertical pixel transistor Tr in which the gate electrode is embedded in a substrate depth direction, and the voltage MIX_A or MIX_B is applied from the contact 423 directly connected to the conductive material 421. That is, as the tap drive unit 21 applies the voltage MIX_A to the P+ semiconductor region 73-1 of the first tap TA and applies the voltage MIX_B to the P+ semiconductor region 73-2 of the second tap TB, the voltage MIX_A is applied to the conductive material 421 on the first tap TA side and the voltage MIX_B is applied to the conductive material 421 on the second tap TB side. Therefore, an electric field is generated in the substrate 61, and electrons generated by photoelectric conversion move to the P+ semiconductor region 73-1 or the P+ semiconductor region 73-2.

According to the above-described thirteenth pixel isolation structure, since the conductive material 421 and the insulating film 422 penetrating the substrate 61 electrically isolate the pixels of the substrate 61 from each other completely, it is possible to prevent incident light from traveling into an adjacent pixel 10, and to suppress occurrence of crosstalk. Furthermore, by applying an electric field to the back surface side of the substrate 61 by applying the predetermined voltage MIX_A or MIX_B from the contact 423 to the conductive material 421, a modulation degree can be increased, and sensitivity can be improved.

FIG. 45 is a plan view illustrating a planar arrangement of the inter-pixel trench portion 371 illustrated in FIG. 44B.

In the thirteenth pixel isolation structure, the inter-pixel trench portion 371 is not formed in the vicinity of the conductive material 421 and the insulating film 422 to which the voltage MIX_A or MIX_B is applied. Therefore, as illustrated in FIG. 44B and FIG. 45, the inter-pixel trench portion 371 is formed at a pixel boundary portion excluding the vicinity of the tap T of each pixel 51.

(Fourteenth Pixel Isolation Structure)

FIG. 46A is a pixel cross-sectional view illustrating a fourteenth pixel isolation structure, and is a cross-sectional view corresponding to a broken line portion of A-A' of FIG. 39.

In the fourteenth pixel isolation structure in FIG. 46A, as compared with the tenth pixel isolation structure illustrated in FIGS. 38A and 38B, the contact 391 that applies the voltage MIX_A or MIX_B to the P+ semiconductor region 73 is changed to the contact 401, the polysilicon 402, and the gate insulating film 403 which are a gate electrode structure of a planar pixel transistor Tr, and the DTI 301 formed at the pixel boundary portion in the substrate 61 is changed to the inter-pixel trench portion 371 penetrating the substrate 61. Other structures are similar to those of the tenth pixel isolation structure in FIGS. 38A and 38B. The planar arrangement of the inter-pixel trench portion 371 is similar to the planar arrangement of the DTI 301 illustrated in FIG. 39.

According to the fourteenth pixel isolation structure, since the inter-pixel trench portions 371 electrically isolates the pixels of the substrate 61 from each other completely, it is possible to prevent incident light from traveling into an adjacent pixel 10, to suppress occurrence of crosstalk, and to improve sensitivity.

Furthermore, a control terminal that applies the voltage MIX_A or MIX_B to the P+ semiconductor region 73 has the gate electrode structure of the planar pixel transistor Tr. As a result, a current flowing between the P+ semiconductor region 73-1 and the P+ semiconductor region 73-2 can be suppressed, and therefore current consumption can be reduced.

(Modification of Fourteenth Pixel Isolation Structure)

FIG. 46B is a pixel cross-sectional view illustrating a modification of the fourteenth pixel isolation structure, and is a cross-sectional view corresponding to a broken line portion of A-A' of FIG. 39.

The modification in FIG. 46B has a structure in which the contact 423 connecting the metal film M1 as the first layer and the conductive material 421 of the thirteenth pixel isolation structure illustrated in FIG. 44A to each other is replaced with the contact 401, the polysilicon 402, and the gate insulating film 403 which are a gate electrode structure of a planar pixel transistor Tr. The polysilicon 402 is connected to the conductive material 421 in the substrate 61, and has a gate electrode structure of a vertical pixel transistor Tr in which a gate electrode is embedded in a substrate depth direction. Other structures are similar to those of the thirteenth pixel isolation structure illustrated in FIGS. 44A and 44B.

Note that, similarly to the thirteenth pixel isolation structure illustrated in FIGS. 44A and 44B, the inter-pixel trench portion 371 is formed at a pixel boundary portion of each pixel 51 except the vicinity of the tap T, and the planar arrangement of the inter-pixel trench portion 371 is similar to the planar arrangement in FIG. 45.

According to the modification of the fourteenth pixel isolation structure, since the conductive material 421 and the insulating film 422 penetrating the substrate 61 electrically isolate the pixels of the substrate 61 from each other completely, it is possible to prevent incident light from traveling into an adjacent pixel 10, and to suppress occurrence of crosstalk.

Furthermore, a control terminal that applies the voltage MIX_A or MIX_B to the P+ semiconductor region 73 has the gate electrode structure of the vertical pixel transistor Tr. As a result, a current flowing between the P+ semiconductor region 73-1 and the P+ semiconductor region 73-2 can be suppressed, and therefore current consumption can be reduced.

Furthermore, since the predetermined voltage MIX_A or MIX_B is applied to the back surface side of the substrate 61 by the conductive material 421 and the insulating film 422 penetrating the substrate 61, the potential can be modulated to the back surface side of the substrate 61, and modulation efficiency can be enhanced.

Each of configurations of the eighth to fourteenth pixel isolation structures described with reference to FIGS. 33A, 33B, 34A, 34B, 35A, 35B, 36, 37A, 37B, 38A, 38B, 39, 40A, 40B, 41A, 41B, 42, 43, 44A, 44B, 45, 46A, and 46B can adopt an arbitrarily combined pixel structure.

<9. Method for Manufacturing On-Chip Lens and Lens Isolation Portion>

Next, a method for manufacturing the on-chip lens 62 and the lens isolation portion 342, adopted in the eighth pixel isolation structure in FIGS. 33A and 33B and the like, will be described with reference to FIGS. 47A, 47B, 47C, 47D, 48A, 48B, 48C, 48D, 49A, 49B, 49C, 49D, 50A, 50B, 50C, 50D, 51A, 51B, 51C, 51D, and 51E.

(First Method for Manufacturing Lens Isolation Portion)

First, a first method for manufacturing the on-chip lens 62 and the lens isolation portion 342 will be described with reference to FIGS. 47A, 47B, 47C, 47D, 48A, 48B, 48C, and 48D.

Figure 47A:
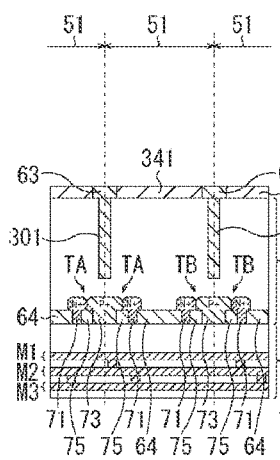
FIGS. 47A, 47B, 47C, and 47D are diagrams for describing a first method for manufacturing an on-chip lens and a lens isolation portion.

As illustrated in FIG. 47A, the DTI 301 is formed from a back surface side at the pixel boundary portion of the substrate 61, the N+ semiconductor region 71 and the P+ semiconductor region 73 to be the tap T (the first tap TA or the second tap TB), the isolation portion 75, the oxide film 64, and the like are formed on a front surface side of the substrate 61, and then the multilayer wiring layer 111 (including the five layers of metal films M1 to M5, contacts, and the like) is formed. Thereafter, the inter-pixel light shielding film 63 and the flattening film 341 are formed on an upper surface on the back surface side of the substrate 61.

Figure 47B:
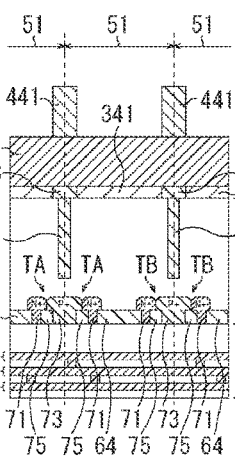

Next, as illustrated in FIG. 47B, a film of an isolation portion material 342A for forming the lens isolation portion 342 is formed on an upper side of the inter-pixel light shielding film 63 and the flattening film 341, and then a photoresist 441 is formed and patterned according to the formation position of the lens isolation portion 342. As described above, the isolation portion material 342A can be, for example, a metal material that is advantageous for shielding light having a long wavelength, such as tungsten (W), aluminum (Al), copper (Cu), or titanium (Ti).

Figure 47C:
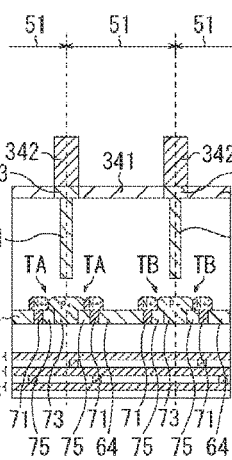

Next, as illustrated in FIG. 47C, the isolation portion material 342A is etched according to the patterned photoresist 441 to form the lens isolation portion 342.

Figure 47D:
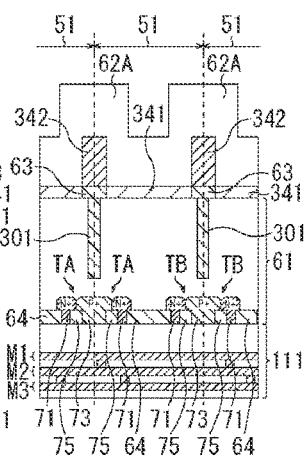

Next, as illustrated in FIG. 47D, a film of a lens material 62A for forming the on-chip lens 62 is conformally formed on an upper surface of the lens isolation portion 342.

Figure 48A:
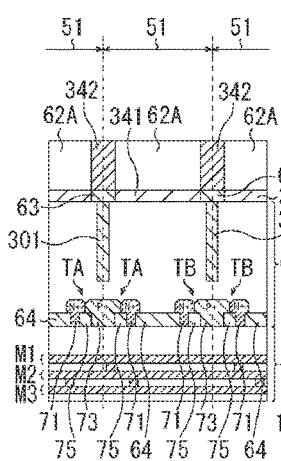
FIGS. 48A, 48B, 48C, and 48D are diagrams for describing the first method for manufacturing an on-chip lens and a lens isolation portion.
Figure 48B:
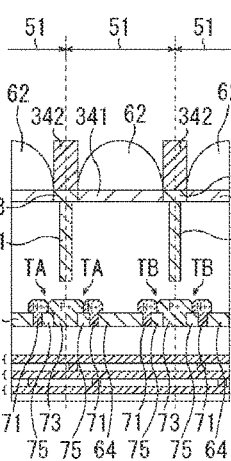

Next, as illustrated in FIG. 48A, the lens material 62A is flattened by chemical mechanical polishing (CMP), and then subjected to heat treatment (reflow) to form the spherical on-chip lens 62 as illustrated in FIG. 48B.

Figure 48C:
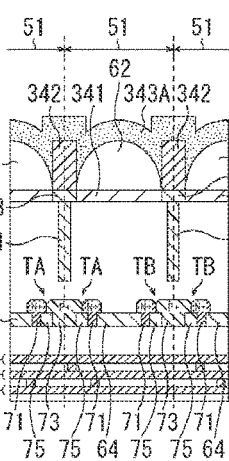
Figure 48D:
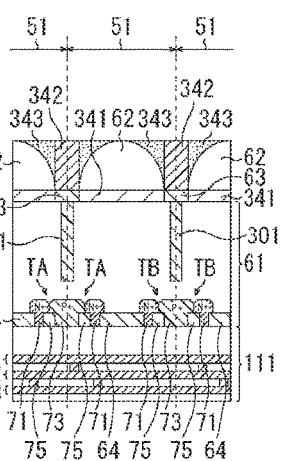

Next, as illustrated in FIG. 48C, a material 343A of the flattening film 343 is formed so as to cover the on-chip lens 62 and the lens isolation portion 342, and flattened by CMP. As a result, the eighth pixel isolation structure illustrated in FIGS. 33A and 33B is completed as illustrated in FIG. 48D.

(Modification of First Manufacturing Method)

In the step of forming the spherical on-chip lens 62 described in FIGS. 47D, FIG. 48A, and FIG. 48B, the following method can also be adopted.

Figure 49A:
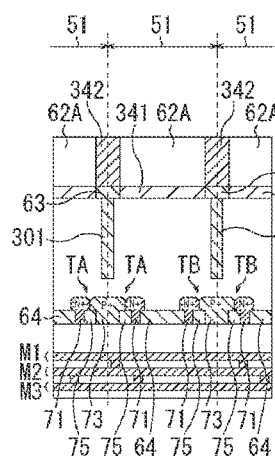
FIGS. 49A, 49B, 49C, and 49D are diagrams for describing a modification of the first manufacturing method.
Figure 49B:
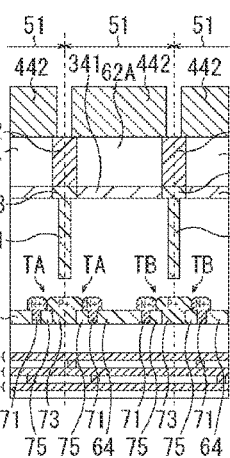
Figure 49C:
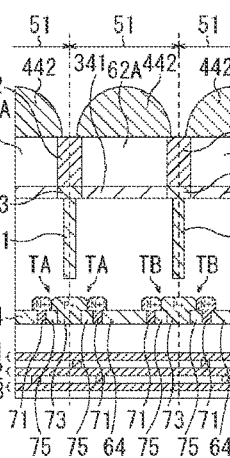

For example, as illustrated in FIG. 49A, the lens material 62A is flattened to the same thickness as the lens isolation portion 342, and then, as illustrated in FIG. 49B, a photoresist 442 is formed on an upper surface of the lens material 62A and subjected to heat treatment. As a result, the photoresist 442 is formed in a spherical shape as illustrated in FIG. 48C.

Figure 49D:
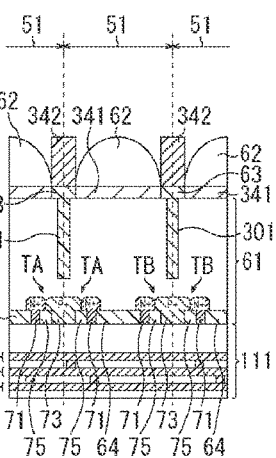

Then, by selectively etching the photoresist 442 formed in a spherical shape, as illustrated in FIG. 49D, the spherical shape of the photoresist 442 is transferred to the lens material 62A, and the on-chip lens 62 is formed.

According to the lens forming method described with reference to FIGS. 49A, 49B, 49C, and 49D, since the lens shape of the on-chip lens 62 is formed with the photoresist 442, the on-chip lens 62 can be formed at a lower temperature.

Alternatively, the spherical on-chip lens 62 may be formed as follows.

As illustrated in FIG. 50A, the lens material 62A is formed so as to be flat with a film thickness thicker than the lens isolation portion 342, then a photoresist 451 is patterned on an upper surface of the lens material 62A at a planar position not overlapping the lens isolation portion 342, and the lens material 62A is etched until the lens isolation portion 342 is exposed as illustrated in FIG. 50B.

Thereafter, by performing heat treatment, the lens material 62A is formed in a spherical shape as illustrated in FIG. 50C, and the lens material 62A formed in a spherical shape is selectively etched. As a result, the on-chip lens 62 is formed as illustrated in FIG. 50D.

According to the lens forming method described with reference to FIGS. 50A, 50B, 50C, and 50D, since the on-chip lens 62 is formed by etching the lens material 62A, stability of the lens shape can be enhanced as compared with a case where the lens shape of the on-chip lens 62 is formed with the photoresist 442 as illustrated in FIGS. 49A, 49B, 49C, and 49D.

(Second Method for Manufacturing Lens Isolation Portion)

Next, a second method for manufacturing the on-chip lens 62 and the lens isolation portion 342 will be described with reference to FIGS. 51A, 51B, 51C, 51D, and 51E.

First, as illustrated in FIG. 51A, the on-chip lens 62 is formed on an upper side of the inter-pixel light shielding film 63 and the flattening film 341 formed on a back surface side of the substrate 61 by film formation of the lens material 62A, patterning according to the lens formation position, and formation of a spherical shape by heat treatment.

Next, as illustrated in FIG. 51B, the material 343A of the flattening film 343 is formed so as to have the same thickness as the on-chip lens 62, and flattened by CMP.

Next, as illustrated in FIG. 51C, in the material 343A of the flattening film 343 formed so as to be flat, the portion where the lens isolation portion 342 is formed is removed by etching. As a result, the flattening film 343 is completed.

Next, as illustrated in FIG. 51D, a film of the isolation portion material 342A such as tungsten (W) or aluminum (Al) is formed in an opened portion of the flattening film 343 by an atomic layer deposition (ALD) method or the like having good embeddability. Then, as illustrated in FIG. 51E, the isolation portion material 342A is flattened by CMP, and the lens isolation portion 342 is thereby formed. As a result, the eighth pixel isolation structure illustrated in FIGS. 33A and 33B is completed. In a case where copper (Cu) is adopted as the material of the lens isolation portion 342, the lens isolation portion 342 can be formed by a plating process.

The on-chip lens 62 and the lens isolation portion 342 can be formed as described above.

<10. Substrate Configuration Example of Light Receiving Device>

Figure 52A:
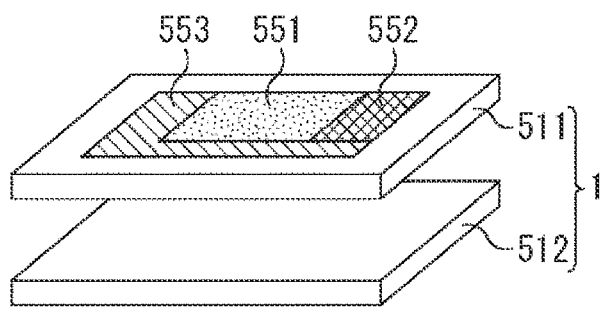
FIGS. 52A, 52B, and 52C are diagrams for describing a substrate configuration of a light receiving device.
Figure 52B:
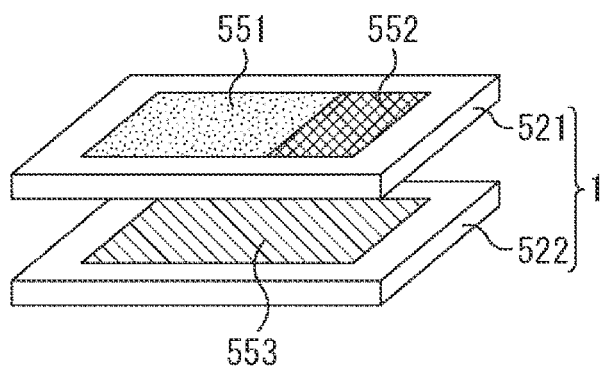
Figure 52C:
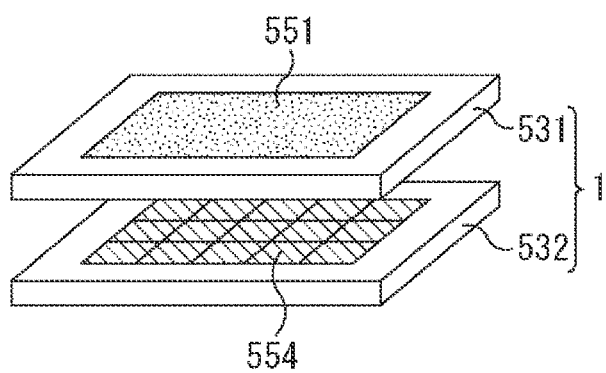

The light receiving device 1 of FIG. 1 can adopt any one of substrate configurations FIGS. 52A, 52B, and 52C.

FIG. 52A illustrates an example in which the light receiving device 1 includes one semiconductor substrate 511 and a support substrate 512 below the semiconductor substrate 511.

In this case, on the upper semiconductor substrate 511, a pixel array region 551 corresponding to the above-described pixel array unit 20, a control circuit 552 that controls each pixel of the pixel array region 551, and a logic circuit 553 including a signal processing circuit of a detection signal are formed.

The control circuit 552 includes the vertical drive unit 22, the horizontal drive unit 24, and the like described above. The logic circuit 553 includes the column processing unit 23 that performs AD conversion processing of a detection signal and the like, and the signal processing unit 31 that performs distance calculation processing of calculating a distance from a ratio between detection signals acquired by two or more taps T in a pixel, calibration processing, and the like.

Alternatively, as illustrated in FIG. 52B, the light receiving device 1 may have a configuration in which a first semiconductor substrate 521 on which the pixel array region 551 and the control circuit 552 are formed, and a second semiconductor substrate 522 on which the logic circuit 553 is formed are stacked. Note that the first semiconductor substrate 521 and the second semiconductor substrate 522 are electrically connected to each other by, for example, a through via or Cu—Cu metal bonding.

Alternatively, as illustrated in FIG. 52C, the light receiving device 1 may have a configuration in which a first semiconductor substrate 531 on which only the pixel array region 551 is formed, and a second semiconductor substrate 532 on which an area control circuit 554 in which a control circuit that controls each pixel and a signal processing circuit that processes a detection signal are disposed in units of one pixel or in units of areas of a plurality of pixels are formed are stacked. The first semiconductor substrate 531 and the second semiconductor substrate 532 are electrically connected to each other by, for example, a through via or Cu—Cu metal bonding.

According to the configuration in which the control circuit and the signal processing circuit are disposed in units of one pixel or in units of areas as in the light receiving device 1 in FIG. 52C, an optimum drive timing and gain can be set for each divided control unit, and optimized distance information can be acquired regardless of a distance and a reflectance. Furthermore, since the distance information can be calculated by driving not the entire surface of the pixel array region 551 but only a part of the region, it is also possible to suppress power consumption according to an operation mode.

<11. Configuration Example of Distance Measuring Module>

Figure 53:
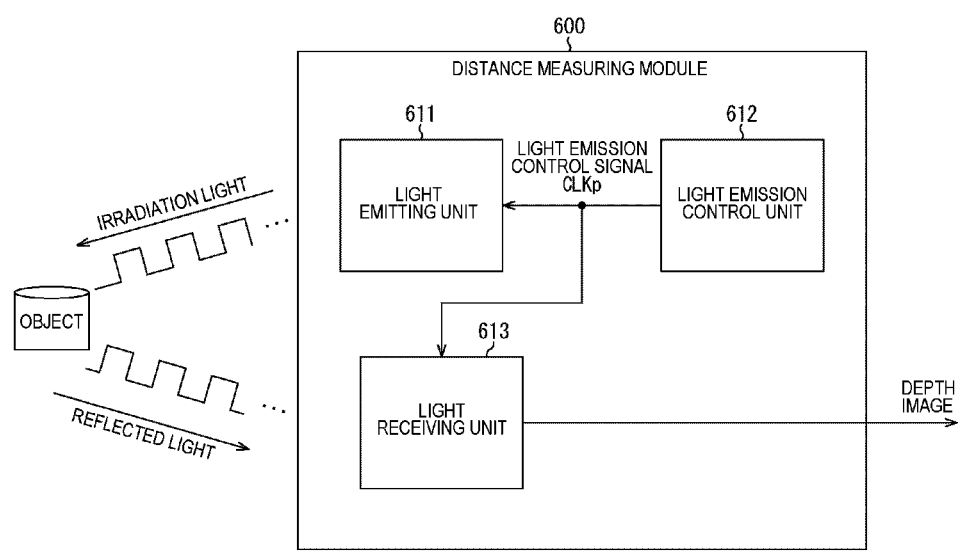

FIG. 53 is a block diagram illustrating a configuration example of a distance measuring module that outputs distance measurement information using the light receiving device 1.

A distance measuring module 600 includes a light emitting unit 611, a light emission control unit 612, and a light receiving unit 613.

The light emitting unit 611 includes a light source that emits light having a predetermined wavelength, and emits irradiation light whose brightness varies periodically to irradiate an object with the light. For example, the light emitting unit 611 includes a light emitting diode that emits infrared light having a wavelength in a range of 780 nm to 1000 nm as a light source, and generates irradiation light in synchronization with a rectangular wave light emission control signal CLKp supplied from the light emission control unit 612.

Note that the light emission control signal CLKp is not limited to a rectangular wave as long as the light emission control signal CLKp is a periodic signal. For example, the light emission control signal CLKp may be a sine wave.

The light emission control unit 612 supplies the light emission control signal CLKp to the light emitting unit 611 and the light receiving unit 613 and controls an irradiation timing of irradiation light. The light emission control signal CLKp has a frequency of, for example, 20 megahertz (MHz). Note that the frequency of the light emission control signal CLKp is not limited to 20 megahertz (MHz), and may be 5 megahertz (MHz) or the like.

The light receiving unit 613 receives reflected light reflected from an object, calculates distance information for each pixel according to a light reception result, generates a depth image in which a distance to the object is represented by a gradation value for each pixel, and outputs the depth image.

The light receiving device 1 described above is used as the light receiving unit 613, and the light receiving device 1 as the light receiving unit 613 calculates distance information for each pixel from a signal intensity detected by a charge detection unit (N+ semiconductor region 71) of each of the first tap TA and the second tap TB of each pixel 51 of the pixel array unit 20, for example, on the basis of the light emission control signal CLKp.

As described above, the light receiving device 1 of FIG. 1 can be incorporated as the light receiving unit 613 of the distance measuring module 600 that obtains and outputs distance information to a subject by an indirect ToF method. By adopting, as the light receiving unit 613 of the distance measuring module 600, each configuration example of the light receiving device 1 described above, for example, a light receiving device in which four vertical signal lines VSL are wired for each pixel column, the resolution and the reading speed as the distance measuring module 600 can be improved.

As described above, according to the present technology, distance measuring characteristics of a light receiving device as a CAPD sensor can be improved.

Note that, in the present technology, the tap structure described above and the wiring of the vertical signal line VSL can be arbitrarily combined. For example, the light receiving device 1 may adopt either a shared tap structure or a non-shared tap structure for a configuration in which four vertical signal lines VSL are disposed for each pixel column. Furthermore, a pixel having the shared tap structure or the non-shared tap structure can be arbitrarily combined with the first to seventh pixel isolation structures.

Furthermore, an example of using electrons as signal carriers has been described above. However, holes generated by photoelectric conversion may be used as signal carriers. In such a case, it is only required to constitute a charge detection unit for detecting signal carriers by a P+ semiconductor region, to constitute a voltage application unit for generating an electric field in a substrate by an N+ semiconductor region, and to detect holes as signal carriers in the charge detection unit disposed in a tap T.

<12. Application Example to Mobile Body>

The technology according to the present disclosure (present technology) can be applied to various products. For example, the technology according to the present disclosure may be implemented as an apparatus mounted on any type of mobile body such as an automobile, an electric vehicle, a hybrid electric vehicle, a motorcycle, a bicycle, a personal mobility, an airplane, a drone, a ship, or a robot.

Figure 54:
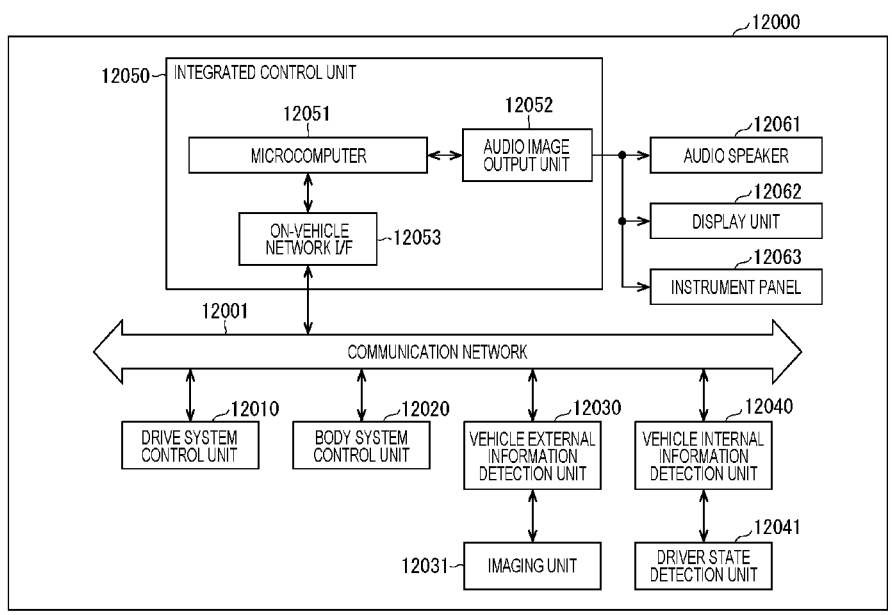

FIG. 54 is a block diagram illustrating a schematic configuration example of a vehicle control system which is an example of a mobile body control system to which the technology according to the present disclosure can be applied.

A vehicle control system 12000 includes a plurality of electronic control units connected to one another via a communication network 12001. In the example illustrated in FIG. 54, the vehicle control system 12000 includes a drive system control unit 12010, a body system control unit 12020, a vehicle external information detection unit 12030, a vehicle internal information detection unit 12040, and an integrated control unit 12050. Furthermore, as a functional configuration of the integrated control unit 12050, a microcomputer 12051, an audio image output unit 12052, and an on-vehicle network interface (I/F) 12053 are illustrated.

The drive system control unit 12010 controls an operation of a device related to a drive system of a vehicle according to various programs. For example, the drive system control unit 12010 functions as a control device of a driving force generating device for generating a driving force of a vehicle such as an internal combustion engine or a driving motor, a driving force transmitting mechanism for transmitting a driving force to wheels, a steering mechanism for adjusting a rudder angle of a vehicle, a braking device for generating a braking force of a vehicle, or the like.

The body system control unit 12020 controls operations of various devices mounted on a vehicle body according to various programs. For example, the body system control unit 12020 functions as a control device of a keyless entry system, a smart key system, a power window device, or various lamps such as a head lamp, a back lamp, a brake lamp, a turn indicator, and a fog lamp. In this case, to the body system control unit 12020, a radio wave transmitted from a portable device substituted for a key or signals of various switches can be input. The body system control unit 12020 receives input of the radio wave or signals and controls a door lock device, a power window device, a lamp, and the like of a vehicle.

The vehicle external information detection unit 12030 detects information outside a vehicle on which the vehicle control system 12000 is mounted. For example, to the vehicle external information detection unit 12030, an imaging unit 12031 is connected. The vehicle external information detection unit 12030 causes the imaging unit 12031 to image an image outside a vehicle and receives an imaged image. The vehicle external information detection unit 12030 may perform object detection processing or distance detection processing of a person, a car, an obstacle, a sign, a character on a road surface, or the like on the basis of the received image.

The imaging unit 12031 is a light sensor for receiving light and outputting an electric signal corresponding to the amount of light received. The imaging unit 12031 can output an electric signal as an image or output the electric signal as distance measurement information. Furthermore, the light received by the imaging unit 12031 may be visible light or invisible light such as infrared light.

The vehicle internal information detection unit 12040 detects information inside a vehicle. To the vehicle internal information detection unit 12040, for example, a driver state detection unit 12041 for detecting the state of a driver is connected. The driver state detection unit 12041 includes, for example, a camera for imaging a driver. The vehicle internal information detection unit 12040 may calculate the degree of fatigue or the degree of concentration of a driver or may determine whether or not the driver is dozing off on the basis of detection information input from the driver state detection unit 12041.

The microcomputer 12051 can calculate a control target value of a driving force generating device, a steering mechanism, or a braking device on the basis of information inside and outside a vehicle, acquired by the vehicle external information detection unit 12030 or the vehicle internal information detection unit 12040, and can output a control command to the drive system control unit 12010. For example, the microcomputer 12051 can perform cooperative control aiming at realizing a function of advanced driver assistance system (ADAS) including collision avoidance or impact mitigation of a vehicle, following travel based on inter-vehicle distance, vehicle speed maintenance travel, vehicle collision warning, vehicle lane departure warning, and the like.

Furthermore, the microcomputer 12051 can perform cooperative control aiming at, for example, automatic driving that autonomously travels without depending on driver's operation by controlling a driving force generating device, a steering mechanism, a braking device, or the like on the basis of information around a vehicle, acquired by the vehicle external information detection unit 12030 or the vehicle internal information detection unit 12040.

Furthermore, the microcomputer 12051 can output a control command to the body system control unit 12020 on the basis of vehicle external information acquired by the vehicle external information detection unit 12030. For example, the microcomputer 12051 can perform cooperative control aiming at antiglare such as switching from high beam to low beam by controlling a headlamp according to the position of a preceding vehicle or an oncoming vehicle detected by the vehicle external information detection unit 12030.

The audio image output unit 12052 transmits at least one of an audio output signal or an image output signal to an output device capable of visually or audibly notifying a passenger of a vehicle or the outside of the vehicle of information. In the example of FIG. 54, as the output device, an audio speaker 12061, a display unit 12062, and an instrument panel 12063 are illustrated. The display unit 12062 may include at least an on-board display and/or a head-up display, for example.

Figure 55:
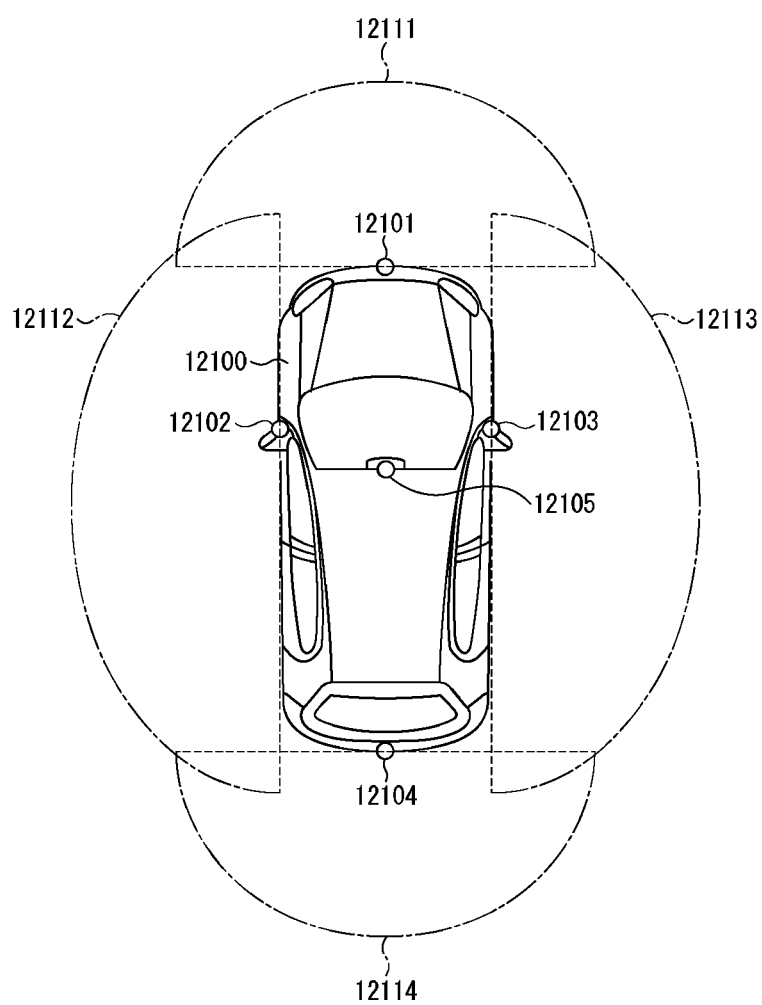

FIG. 55 is a diagram illustrating an example of an installation position of the imaging unit 12031.

In FIG. 55, the vehicle 12100 includes imaging units 12101, 12102, 12103, 12104, and 12105 as the imaging unit 12031.

The imaging units 12101, 12102, 12103, 12104, and 12105 are provided, for example, in a front nose, a side mirror, a rear bumper, and a back door of the vehicle 12100, in an upper portion of a windshield in a passenger compartment, and the like. The imaging unit 12101 provided in a front nose and the imaging unit 12105 provided in an upper portion of a windshield in a passenger compartment mainly acquire images in front of the vehicle 12100. The imaging units 12102 and 12103 provided in side mirrors mainly acquire images on sides of the vehicle 12100. The imaging unit 12104 provided in a rear bumper or a back door mainly acquires an image behind the vehicle 12100. The front images acquired by the imaging units 12101 and 12105 are mainly used for detecting a preceding vehicle, a pedestrian, an obstacle, a traffic signal, a traffic sign, a lane, or the like.

Note that FIG. 55 illustrates examples of imaging ranges of the imaging units 12101 to 12104. An imaging range 12111 indicates an imaging range of the imaging unit 12101 provided in a front nose. Imaging ranges 12112 and 12113 indicate imaging ranges of the imaging units 12102 and 12103 provided in side mirrors, respectively. An imaging range 12114 indicates an imaging range of the imaging unit 12104 provided in a rear bumper or a back door. For example, by superimposing image data imaged by the imaging units 12101 to 12104 on one another, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 determines a distance to each three-dimensional object in the imaging range 12111 to 12114 and a temporal change (relative speed with respect to the vehicle 12100) of the distance on the basis of the distance information obtained from the imaging units 12101 to 12104, and can thereby particularly extract a three-dimensional object which is the nearest three-dimensional object on a traveling path of the vehicle 12100 and is traveling at a predetermined speed (for example, 0 km/h or more) in substantially the same direction as the vehicle 12100 as a preceding vehicle. Moreover, the microcomputer 12051 can set an inter-vehicle distance to be secured in advance in front of the preceding vehicle, and can perform automatic brake control (including following stop control), automatic acceleration control (including following start control), and the like. In this way, it is possible to perform cooperative control aiming at, for example, automatic driving that autonomously travels without depending on driver's operation.

For example, the microcomputer 12051 classifies three-dimensional object data related to a three-dimensional object into a two-wheeled vehicle, a regular vehicle, a large vehicle, a pedestrian, and another three-dimensional object such as a telegraph pole on the basis of the distance information obtained from the imaging units 12101 to 12104 and extracts data, and can use the extracted data for automatic avoidance of an obstacle. For example, the microcomputer 12051 identifies an obstacle around the vehicle 12100 as an obstacle that a driver of the vehicle 12100 can see and an obstacle that is difficult to see. Then, the microcomputer 12051 judges a collision risk indicating a risk of collision with each obstacle. When the collision risk is higher than a set value and there is a possibility of collision, the microcomputer 12051 can perform driving assistance for avoiding collision by outputting an alarm to a driver via the audio speaker 12061 or the display unit 12062, or performing forced deceleration or avoiding steering via the drive system control unit 12010.

At least one of the imaging units 12101 to 12104 may be an infrared camera for detecting an infrared ray. For example, the microcomputer 12051 can recognize a pedestrian by determining whether or not a pedestrian exists in imaged images of the imaging units 12101 to 12104. Such recognition of a pedestrian is performed by, for example, a procedure of extracting characteristic points in imaged images of the imaging units 12101 to 12104 as infrared cameras and a procedure of performing pattern matching processing on a series of characteristic points indicating an outline of an object and determining whether or not a pedestrian exists. If the microcomputer 12051 determines that a pedestrian exists in imaged images of the imaging units 12101 to 12104 and recognizes a pedestrian, the audio image output unit 12052 controls the display unit 12062 such that the display unit 12062 superimposes and displays a rectangular contour line for emphasis on the recognized pedestrian. Furthermore, the audio image output unit 12052 may control the display unit 12062 such that the display unit 12062 displays an icon or the like indicating a pedestrian at a desired position.

An example of the vehicle control system to which the technology according to the present disclosure can be applied has been described above. The technology according to the present disclosure can be applied to the imaging unit 12031 in the above-described configurations. Specifically, for example, by applying the light receiving device 1 illustrated in FIG. 1 to the imaging unit 12031, characteristics such as resolution and reading speed can be improved.

Furthermore, the embodiment of the present technology is not limited to the above-described embodiment, and various modifications can be made to the above-described embodiment without departing from the scope of the present technology.

Furthermore, the effects described here are merely examples, and the effects of the present technology are not limited thereto, and may include other effects.

Note that the present technology can have the following configurations.

(1)

A light receiving device including:
  a pixel array unit in which pixels each including a first tap that detects charges photoelectrically converted by a photoelectric conversion unit and a second tap that detects charges photoelectrically converted by the photoelectric conversion unit are two-dimensionally arranged in a matrix;
  an on-chip lens disposed for each pixel on a light incident surface side of a substrate; and
  a lens isolation portion that is formed in the same layer as the on-chip lens and isolates the on-chip lenses from each other.

(2)

The light receiving device according to (1), in which
  the first tap and the second tap each include a voltage application unit that applies a voltage, and
  the voltage application unit is shared by two adjacent pixels.

(3)

The light receiving device according to (2), in which
  the pixel array unit includes a groove portion formed by digging the substrate from a light incident surface side of the substrate to a predetermined depth, and
  the groove portion is formed so as to overlap at least a part of the voltage application unit in plan view.

(4)

The light receiving device according to any one of (1) to (3), in which
  a reflection suppressing film that suppresses reflection of incident light is formed on an upper surface of the lens isolation portion.

(5)
The light receiving device according to any one of (1) to (4), in which
a side wall of the lens isolation portion is inclined so as to face an incident surface side.

(6)
The light receiving device according to (3), in which
the groove portion is formed so as to penetrate the substrate.

(7)
The light receiving device according to any one of (1) to (6), further including a contact configured to apply a predetermined voltage to the first tap or the second tap, in which
the contact is formed linearly along a pixel boundary line.

(8)
The light receiving device according to (7), in which
the contact has a gate electrode structure of a transistor.

(9)
The light receiving device according to any one of (1) to (8), further including a reflecting member that reflects light between a back surface side interface of the substrate and a metal film as a first layer.

(10)
The light receiving device according to any one of (1), (2), (4), (5), and (9), further including a pixel isolation portion that is disposed at a pixel boundary portion of the substrate and electrically isolates pixels of the substrate from each other, in which
the pixel isolation portion has a gate electrode structure of a vertical transistor.

(11)
The light receiving device according to any one of (1) to (10), further including a gate electrode structure of a transistor that applies a predetermined voltage to the first tap or the second tap.

(12)
A method for manufacturing a light receiving device, the method including:
forming, for each pixel of a pixel array unit, a first tap that detects charges photoelectrically converted by a photoelectric conversion unit and a second tap that detects charges photoelectrically converted by the photoelectric conversion unit;
forming an on-chip lens for each pixel on a light incident surface side of a substrate; and
forming, in the same layer as the on-chip lens, a lens isolation portion that isolates the on-chip lenses from each other.

(13)
A distance measuring module including a light receiving device including:
a pixel array unit in which pixels each including a first tap that detects charges photoelectrically converted by a photoelectric conversion unit and a second tap that detects charges photoelectrically converted by the photoelectric conversion unit are two-dimensionally arranged in a matrix;
an on-chip lens disposed for each pixel on a light incident surface side of a substrate; and
a lens isolation portion that is formed in the same layer as the on-chip lens and isolates the on-chip lenses from each other.

REFERENCE SIGNS LIST

1 Light receiving device
20 Pixel array unit
21 Tap drive unit
51 Pixel
TA First tap
TB Second tap
VSL (VSL0 to VSL3) Vertical signal line
61 Substrate
62 On-chip lens
71 N+ semiconductor region
73 P+ semiconductor region
111 Multilayer wiring layer
M1 to M5 Metal film
121 Transfer transistor
122 FD
123 Reset transistor
124 Amplification transistor
125 Selection transistor
127 Additional capacitor
128 Switching transistor
301 to 304 DTI
311, 312 DTI
321 Uneven portion
331 DTI
342 Lens isolation portion
343 Flattening film
351 Reflection suppressing film
371 Inter-pixel trench portion
381 Groove portion
391, 391', 392, 401 Contact
402 Polysilicon
403 Gate insulating film
411 Reflecting member
421 Conductive material
422 Insulating film
423 Contact
600 Distance measuring module
613 Light receiving unit

The invention claimed is:
1. A light receiving device, comprising:
a substrate configured to generate, by photoelectric conversion of light, first charges and second charges;
a pixel array unit that includes a plurality of pixels in a matrix, wherein
each pixel of the plurality of pixels includes:
a first tap configured to detect the first charges; and
a second tap configured to detect the second charges,
each of the first tap and the second tap includes a voltage application unit configured to apply a voltage to the substrate, and
the voltage application unit is one of a p-type semiconductor region or an n-type semiconductor region;
a plurality of on-chip lenses on a light incident surface side of the substrate,
wherein each on-chip lens of the plurality of on-chip lenses is for a corresponding pixel of the plurality of pixels; and
a lens isolation portion in a same layer as the plurality of on-chip lenses,
wherein the lens isolation portion isolates a first on-chip lens of the plurality of on-chip lenses from a second on-chip lens of the plurality of on-chip lenses.
2. The light receiving device according to claim 1, wherein the voltage application unit is shared by two adjacent pixels of the plurality of pixels.

3. The light receiving device according to claim 2, wherein
- the substrate includes a groove portion on the light incident surface side,
- the groove portion has a specific depth from the light incident surface side, and
- the groove portion overlaps at least a part of the voltage application unit in plan view.

4. The light receiving device according to claim 1, further comprising a reflection suppressing film on an upper surface of the lens isolation portion,
- wherein the reflection suppressing film is configured to suppress reflection of incident light on the lens isolation portion.

5. The light receiving device according to claim 1, wherein a side wall of the lens isolation portion is inclined so as to face the light incident surface side.

6. The light receiving device according to claim 3, wherein the groove portion penetrates an entire thickness of the substrate.

7. The light receiving device according to claim 1, further comprising a contact configured to apply the voltage to one of the first tap or the second tap,
- wherein the contact is linearly along a pixel boundary line in the pixel array unit.

8. The light receiving device according to claim 7, wherein the contact has a gate electrode structure of a transistor.

9. The light receiving device according to claim 1, further comprising:
- a metal film; and
- a reflecting member between the substrate and the metal film.

10. The light receiving device according to claim 1, further comprising a pixel isolation portion at a pixel boundary portion of the substrate, wherein
- the pixel isolation portion electrically isolates a first pixel of the plurality of pixels from a second pixel of the plurality of pixels, and
- the pixel isolation portion has a gate electrode structure of a vertical transistor.

11. The light receiving device according to claim 1, further comprising a gate electrode structure of a transistor,
- wherein the gate electrode structure is configured to apply the voltage to one of the first tap or the second tap.

12. A method for manufacturing a light receiving device, the method comprising:
- forming, for each pixel of a plurality of pixels in a pixel array unit, a first tap that detects first charges generated by a substrate, and a second tap that detects second charges generated by the substrate, wherein
  - each of the first tap and the second tap includes a voltage application unit configured to apply a voltage to the substrate, and
  - the voltage application unit is one of a p-type semiconductor region or an n-type semiconductor region;
- forming a plurality of on-chip lenses on a light incident surface side of the substrate,
  - wherein each on-chip lens of the plurality of on-chip lenses is for a corresponding pixel of the plurality of pixels; and
- forming, in a same layer as the plurality of on-chip lenses, a lens isolation portion,
  - wherein the lens isolation portion isolates a first on-chip lens of the plurality of on-chip lenses from a second on-chip lens of the plurality of on-chip lenses.

13. A distance measuring module, comprising:
a light receiving device including:
- a substrate configured to generate, by photoelectric conversion of light, first charges and second charges;
- a pixel array unit that includes a plurality of pixels in a matrix, wherein
  - each pixel of the plurality of pixels includes:
    - a first tap configured to detect the first charges; and
    - a second tap configured to detect the second charges,
  - each of the first tap and the second tap includes a voltage application unit configured to apply a voltage to the substrate, and
  - the voltage application unit is one of a p-type semiconductor region or an n-type semiconductor region;
- a plurality of on-chip lenses on a light incident surface side of the substrate,
  - wherein each on-chip lens of the plurality of on-chip lenses is for a corresponding pixel of the plurality of pixels; and
- a lens isolation portion in a same layer as the plurality of on-chip lenses,
  - wherein the lens isolation portion isolates a first on-chip lens of the plurality of on-chip lenses from a second on-chip lens of the plurality of on-chip lenses.

* * * * *